(12) United States Patent
Jedrzejowski et al.

(10) Patent No.: US 12,441,977 B2
(45) Date of Patent: Oct. 14, 2025

(54) LACTIC ACID BACTERIA

(71) Applicant: International N&H Denmark APS, Kongens Lyngby (DK)

(72) Inventors: Anais Jedrzejowski, Dangé-Saint-Romain (FR); Christophe Fremaux, Dangé-Saint-Romain (FR); Sabine Van Dillen, Dangé-Saint-Romain (FR); Thomas Desfougeres, Dangé-Saint-Romain (FR); Max Charles Jodeau, Dangé-Saint-Romain (FR); Damien Lugand, Dangé-Saint-Romain (FR)

(73) Assignee: International N&H Denmark ApS, Kongens Lyngby (DK)

( * ) Notice: Subject to any disclaimer, the term of this patent is extended or adjusted under 35 U.S.C. 154(b) by 1033 days.

(21) Appl. No.: 17/437,255

(22) PCT Filed: Mar. 13, 2020

(86) PCT No.: PCT/EP2020/056766
§ 371 (c)(1),
(2) Date: Sep. 8, 2021

(87) PCT Pub. No.: WO2020/182976
PCT Pub. Date: Sep. 17, 2020

(65) Prior Publication Data
US 2022/0169974 A1    Jun. 2, 2022

(30) Foreign Application Priority Data

Mar. 14, 2019   (EP) .................................. 19162856
May 16, 2019   (CN) ....................... 201910406044.7
Dec. 6, 2019    (EP) .................................. 19214119

(51) Int. Cl.
| | | |
|---|---|---|
| C12N 1/20 | (2006.01) |
| A23C 9/123 | (2006.01) |
| A23L 13/74 | (2023.01) |
| C12N 15/74 | (2006.01) |
| C12P 1/04 | (2006.01) |
| G01N 33/50 | (2006.01) |

(52) U.S. Cl.
CPC .............. *C12N 1/20* (2013.01); *A23C 9/1238* (2013.01); *A23L 13/74* (2016.08); *C12N 15/746* (2013.01); *C12P 1/04* (2013.01); *G01N 33/5038* (2013.01); *A23V 2400/249* (2023.08)

(58) Field of Classification Search
CPC .... C12N 9/2471; C12N 15/70; C12N 9/1051; C12N 15/1037; C12N 15/00; C12N 15/746; C12Y 302/01023; C12Y 204/01022; C12P 19/18
USPC ...................................................... 435/91.1
See application file for complete search history.

(56) References Cited

U.S. PATENT DOCUMENTS

| | | |
|---|---|---|
| 4,683,202 A | 7/1987 | Mullis |
| 2016/0165910 A1 | 6/2016 | Horvath et al. |
| 2017/0135360 A1 | 5/2017 | Garrigues et al. |

FOREIGN PATENT DOCUMENTS

| | | |
|---|---|---|
| CN | 1068017 A | 1/1993 |
| CN | 106755313 A | 5/2017 |
| CN | 109337846 A | 2/2019 |
| EP | 1078074 B2 | 2/2001 |
| WO | 90/05459 | 5/1990 |
| WO | 2010/139765 A2 | 12/2010 |
| WO | 2015/193459 A1 | 12/2015 |
| WO | 2018/130630 A1 | 7/2018 |

OTHER PUBLICATIONS

Kisselev L., (Structure, 2002, vol. 10: 8-9.*
Kwiatkowski et al., (Biochemistry 38:11643-11650, 1999.*
Wristlock et al., (Quarterly Reviews of Biophysics 2003, vol. 36 (3): 307-340.*
Davos et al., (Proteins: Structure, Function and Genetics, 2000, vol. 41: 98-107.*
Caruthers et al., "New chemical methods for synthesizing polynucleotides", Nucleic Acids Research, Symposium Series No. 7, 1980, pp. 215-223.
Horn et al., "Synthesis of olignonucleotides on cellulose. Part II: design and synthetic strategy to the synthesis of 22 oligodeoxynucleotides coding for Gastric Inhibitory Polypeptide (GIP)", Nucleic Acids Research, Symposium Series No. 7, 1980, pp. 225-232.
Database UniProt, Jul. 24, 2013 (Jul. 24, 2013), "RecName: Full= Beta-galactosidase, {EC0:0000256:RuleBase:RU361154, EC0:0000256:SAAS:SAAS01166384}; EC=3. 2 .1. 23 {EC0:0000256:RuleBase:RU361154, EC0:0000256:SAAS:SAAS01166384}; AltName:Full =Lactase {EC0:0000256:RuleBase:RU361154};", XP002793052, retrieved from EBI accession No. Uniprot:R6PHJ8 Database accession No. R6PHJ8 sequence.
Database UniProt, Dec. 20, 2017 (Dec. 20, 2017), "RecName: Full=Beta-galactosidase {EC0:0000256:RuleBase:RU361154, EC0:0000256:SAAS:SAAS01166384}; EC=3. 2 .1. 23 {EC0:0000256:RuleBase:RU361154, EC0:0000256:SAAS:SAAS01166384}; AltName: Full =Lactase {EC0:0000256:RuleBase:RU361154};" XP002793053, retrieved from EBI accession No. Uniprot: AOA2A7PZQ6 Database accession No. AOA2A7PZQ6 sequence.
Database UniProt, Nov. 22, 2017 (Nov. 22, 2017), "RecName: Full=Beta-galactosidase {EC0:0000256:SAAS: SAAS01166384};EC= 3. 2 .1. 23 {EC0:0000256:SAAS:SAAS01166384};", XP002793054, retrieved from EBI accession No. Uniprot: AOA1G8Y9F2 Database accession No. AOA1G8Y9F2 sequence.

(Continued)

*Primary Examiner* — Tekchand Saidha
*Assistant Examiner* — Mohammad Y Meah

(57) ABSTRACT

The invention relates to a polynucleotide comprising a lacZ gene (lacZ$^{FS}$) encoding a β-galactosidase characterized by a particular profile regarding its efficiency of hydrolysis of lactose. The invention is also directed to a *Streptococcus thermophilus* strain comprising a lacZ$^{FS}$ allele and bacterial composition thereof, and their use to obtain fermented milk not undergoing post-acidification.

16 Claims, 10 Drawing Sheets

Specification includes a Sequence Listing.

(56) References Cited

OTHER PUBLICATIONS

Schroeder, et al., Analysis of the lacZ sequences from two *Streptococcus thermophilus* strains: comparison with the *Escherichia coli* and Lactobacillus bulgaricus B-galactosidase sequences, J Gen Microbiol., Feb. 1991., 137(2):369-380.
Matthes, et al., Simultaneous rapid chemical synthesis of over one hundred oligonucleotides on a microscale, Apr. 1984, EMBO J., 3(4):801-805.
Dandoy, et al., The fast milk acidifying phenotype of *Streptococcus thermophilus* can be acquired by natural transformation of the genomic island encoding the cell-envelope proteinase PrtS, Microbial Cell Factories, Aug. 2011, vol. 10(1):S21, 1-9.
Beaucage, et al., Deoxynucleoside Phosphoramidites—A New Class of Key Intermediates for Deoxypolynucleotide Synthesis, Tetrahedron Letters, Jan. 1981, vol. 22, No. 20, 1859-1862.
Saiki, et al., Primer-directed enzymatic amplification of DNA with a thermostable DNA polymerase, Science, Jan. 1988, 239, 487-491.
Van Den Bogaard, et al., Control of Lactose Transport, β-Galactosidase Activity, and Glycolysis by CcpA in *Streptococcus thermophilus*: Evidence for Carbon Catabolite Repression by a Non-Phosphoenolpyruvate-Dependent Phosphotransferase System Sugar, Journal of Bacteriology, Nov. 2000, vol. 182, No. 21, 5982-5989.
Vaughan, et al., Activation of Silent gal Genes in the lac-gal Regulon of *Streptococcus thermophilus*, Journal of Bacteriology, Feb. 2001, vol. 183, No. 4, 1184-1194.
Tetrahedron Letters 22:1859-1869.
Higgins, Desmond G. et al., Clustal: a package for performing multiple sequence alignment on a microcomputer, Gene, 1988, pp. 237-244, vol. 73(1).
Sambrook, J., et al., 1989, Molecular Cloning: A Laboratory Manual, Second Edition, Books 1-3, Cold Spring Harbor Laboratory Press—Book not included.
Ausubel, F. M. et al. (1995 and periodic supplements; Current Protocols in Molecular Biology, ch. 9, 13, and 16, John Wiley & Sons, New York, N. Y)—Book not included.
Roe, B et al., 1996, DNA Isolation and Sequencing: Essential Techniques, John Wiley & Sons—Book not included.
Gait, M. J. (Editor), 1984, Oligonucleotide Synthesis: A Practical Approach, Irl Press—Book not included.
Lilley, D. M. J., et al., 1992, Methods of Enzymology: DNA Structure Part A: Synthesis Physical Analysis of DNA Methods in Enzymology, Academic Press—Book not included.
Ausubel F. M., et al., 1999, Short Protocols in Molecular Biology, 4th Ed—Chapter 18—Book not included.

\* cited by examiner

A.

B.

A.

B.

LACTIC ACID BACTERIA

CROSS-REFERENCE TO RELATED APPLICATIONS

This application is a U.S. national stage application under 35 U.S.C. § 371 of International Application No. PCT/EP2020/056766, filed on Mar. 13, 2020, entitled "NEW LACTIC ACID BACTERIA," and claims priority from EP Application No. 19162856.9, filed Mar. 14, 2019, CN Application No. 201910406044.7, filed May 16, 2019, and EP Application No. 19214119.0, filed Dec. 6, 2019, the contents of which are incorporated by reference in their entirety.

INCORPORATION BY REFERENCE OF THE SEQUENCE LISTING

The present application is being filed with a Sequence Listing in electronic format. The Sequence Listing is provided as a file entitled NB41527USPCT_SeqList.txt, created on Sep. 3, 2021, which is 257,245 bytes in size. The information in the electronic format of the Sequence Listing is incorporated by reference in its entirety.

FIELD OF THE INVENTION

The invention relates to a polynucleotide comprising a lacZ gene ($lacZ^{FS}$) encoding a β-galactosidase characterized by a particular profile regarding its efficiency of hydrolysis of lactose. The invention is also directed to a *Streptococcus thermophilus* strain comprising a $lacZ^{FS}$ allele and bacterial composition thereof, and their use to obtain fermented milk not undergoing post-acidification.

BACKGROUND TO THE INVENTION

The food industry uses bacteria in order to improve the taste and the texture of food or feed products. In the case of the dairy industry, lactic acid bacteria are commonly used in order to, for example, bring about the acidification of milk (by fermentation of lactose) and to texturize the product into which they are incorporated. For example, the lactic acid bacteria of the species *Streptococcus thermophilus* (*S. thermophilus*) are used extensively, alone or in combination with other bacteria, in the manufacture of fresh fermented dairy products, such as cheese or yoghurt.

One of the limitations of the use of lactic acid bacteria in dairy technology is post-acidification, i.e. the production of lactic acid by the lactic acid bacteria after the target pH (the one required by the technology) has been obtained. Thus, to avoid this post-acidification phenomenon, dairy product manufacturers are required to rapidly cool the fermented product right after the target pH is obtained. Thus, dairy product manufacturers lack flexibility in the manufacturing process, while having the possibility of keeping the fermented product at the fermentation temperature for some time would be an advantage. Moreover, the cooling step is energy-consuming, such that bypassing the cooling step, would be both an economical and environmental advantage.

WO90/05459 describes *Lactobacillus bulgaricus* mutant strains, selected based on their color phenotype on X-gal-containing medium. The application reports the identification of temperature conditional *L. bulgaricus* mutants (blue at 37° C., but white at 4° C.) and pH sensitive *L. bulgaricus* mutants (blue at pH 7 but white at pH 4.5 or 5). However, WO90/05459 is silent about any mutation in the lacZ gene. Moreover, WO90/05459 describes mutants characterized by enzyme which has an activity of at least 90% the activity of a wild type enzyme in production conditions (processing temperature or processing pH), while having an activity reduced of at least 20% as compared to the activity of a wild type enzyme in storage conditions. However, the teaching of WO90/05459 is insufficient regarding any enzyme activity and in particular regarding the beta-galactosidase activity; indeed, as shown in examples 4 and 5 of the present application, there is neither admitted reference beta-galactosidase activity in strains, at pH 4.5 or pH 6. Therefore, the characterization of the mutants described in WO90/05459 is not possible without any reference value or reference strain.

WO2010/139765 describes a method to manufacture a fermented dairy product using a weakly post-acidifying culture based on specific *Lactobacillus bulgaricus* strains. Because the culture is characterized by a weak production of lactic acid at fermentation temperature, the pH is substantially steady and the cooling step can be avoided. However, WO2010/139765 does not characterize the exemplified *Lactobacillus bulgaricus* strains.

WO2015/193459 proposes other solutions to overcome the post-acidification issue: controlling the concentration of lactose in the milk before fermentation for example by adding lactase, providing lactic acid bacteria which are not able to hydrolyze lactose (lactose-deficient lactic acid bacteria). These solutions are however not satisfactory for dairy product manufacturers, since they require either the addition of exogenous enzyme (such as lactase) in the milk before fermentation rendering the manufacturing process more complex and more expensive, or the addition of a carbohydrate into the milk (such as sucrose) what is not in agreement with the growing demand for healthier products with no additives.

Therefore, there is a need for providing means to dairy product manufacturers, for producing fermented products based on lactic acid bacteria, with both satisfactory results and high flexibility in the manufacturing process.

SUMMARY OF THE INVENTION

Figure 1:
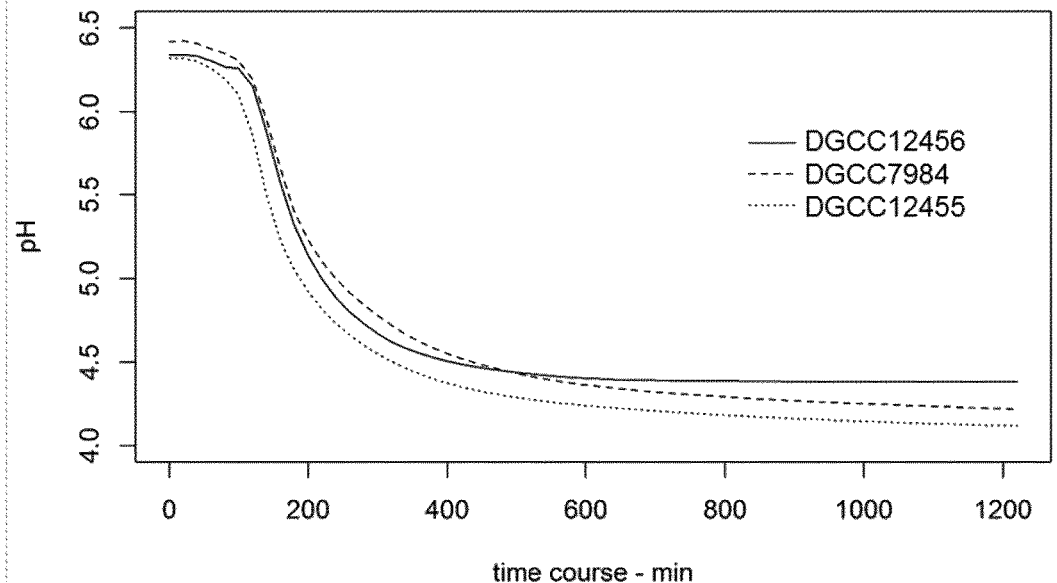
FIG. 1 are graphs representing (A) the acidification profile in milk (pH over time) of DGCC7984 strain and its two subclones DGCC12455 and DGCC12456, and (B) the evolution of the speed of acidification over time (mUpH/min over time) of strain DGCC12456
Figure 1:
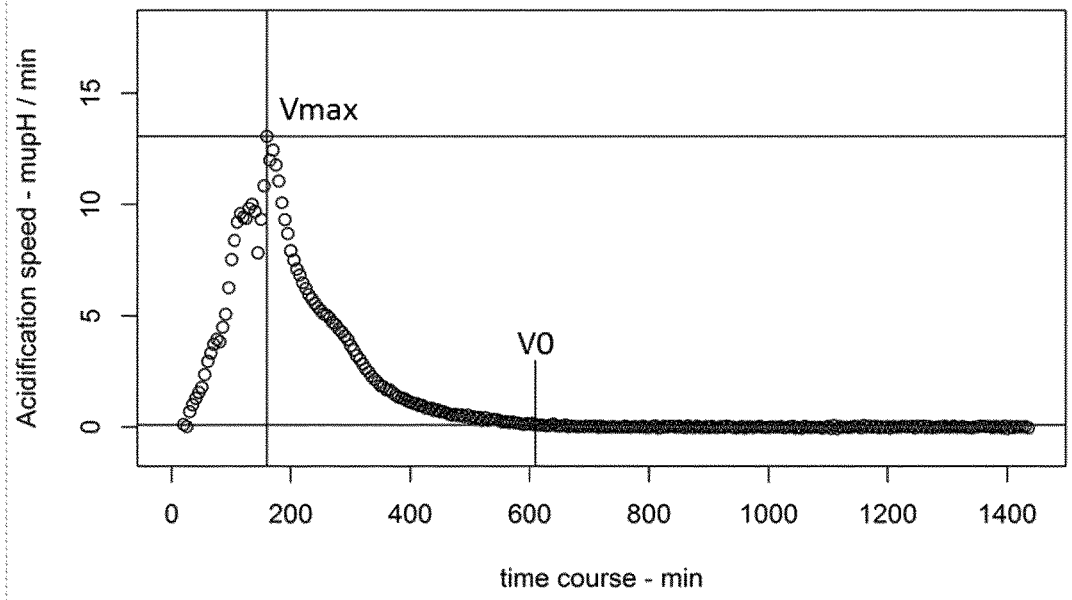
Figure 2:
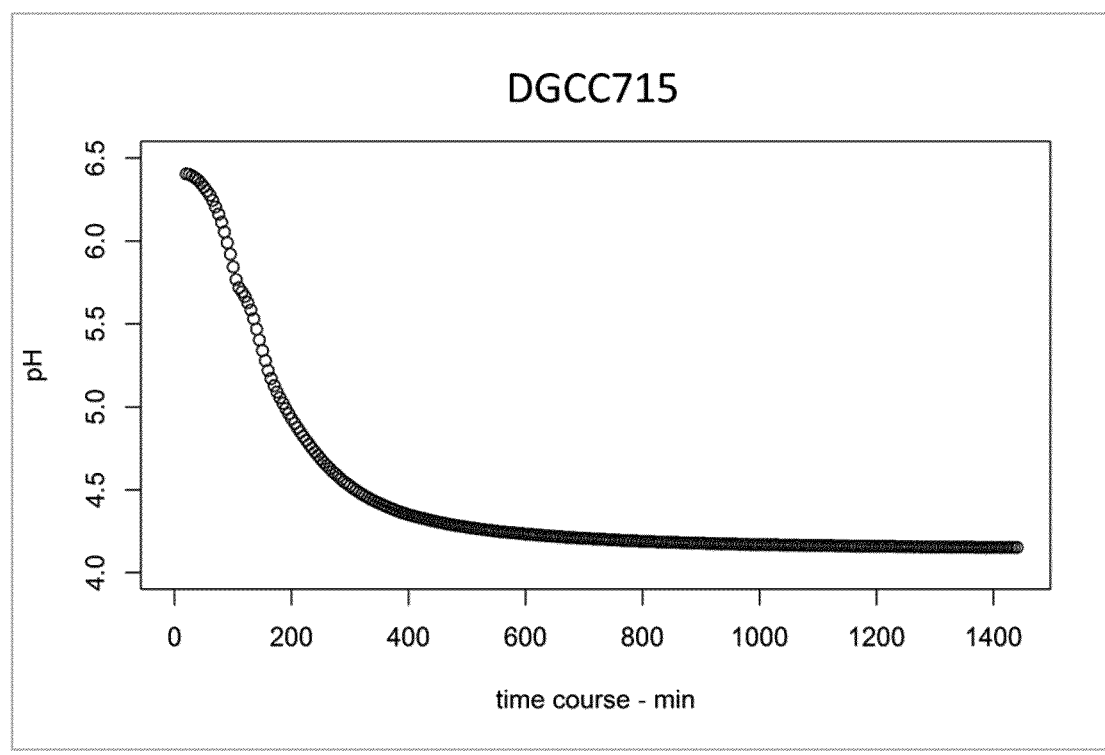
FIG. 2 are graphs representing (A) the acidification profile in milk (pH over time) and (B) the evolution of the speed of acidification over time (mUpH/min over time), of strain DGCC715
Figure 2:
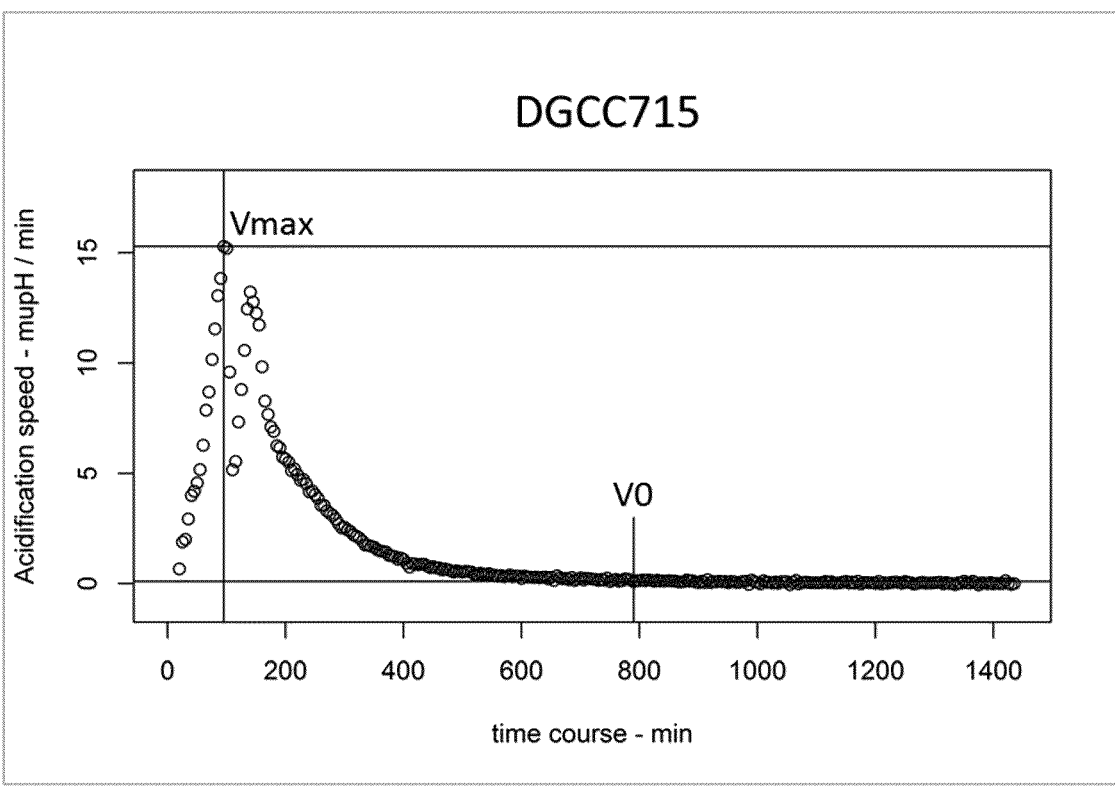
Figure 3:
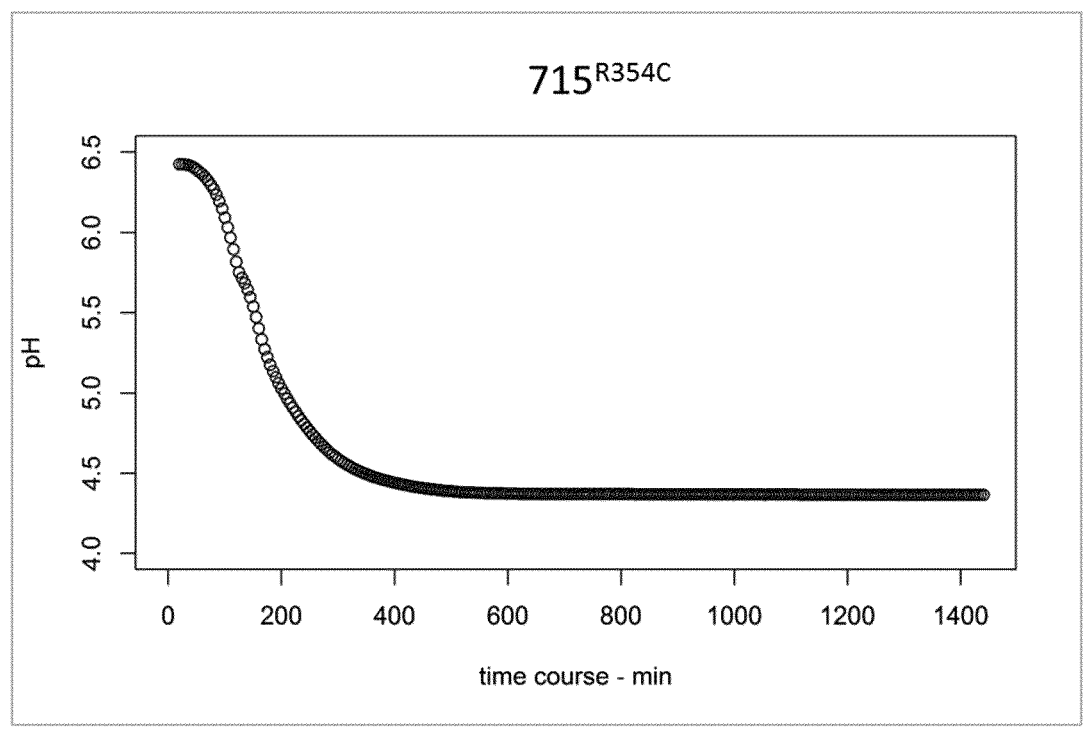
FIG. 3 are graphs representing (A) the acidification profile in milk (pH over time) and (B) the evolution of the speed of acidification over time (mUpH/min over time), of strain $715^{R354C}$ FIG. 4 are graphs representing (A) the acidification profile in milk (pH over time) and (B) the evolution of the speed of acidification over time (mUpH/min over time), of strain DGCC11231
Figure 3:
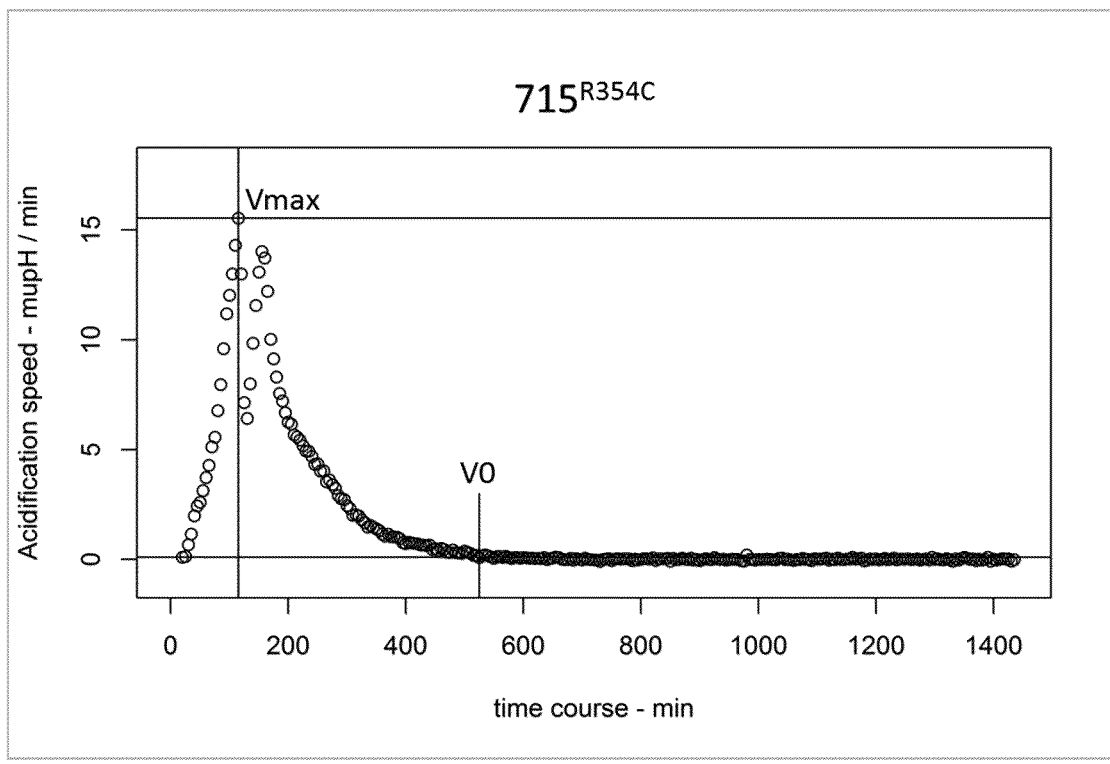
Figure 4:
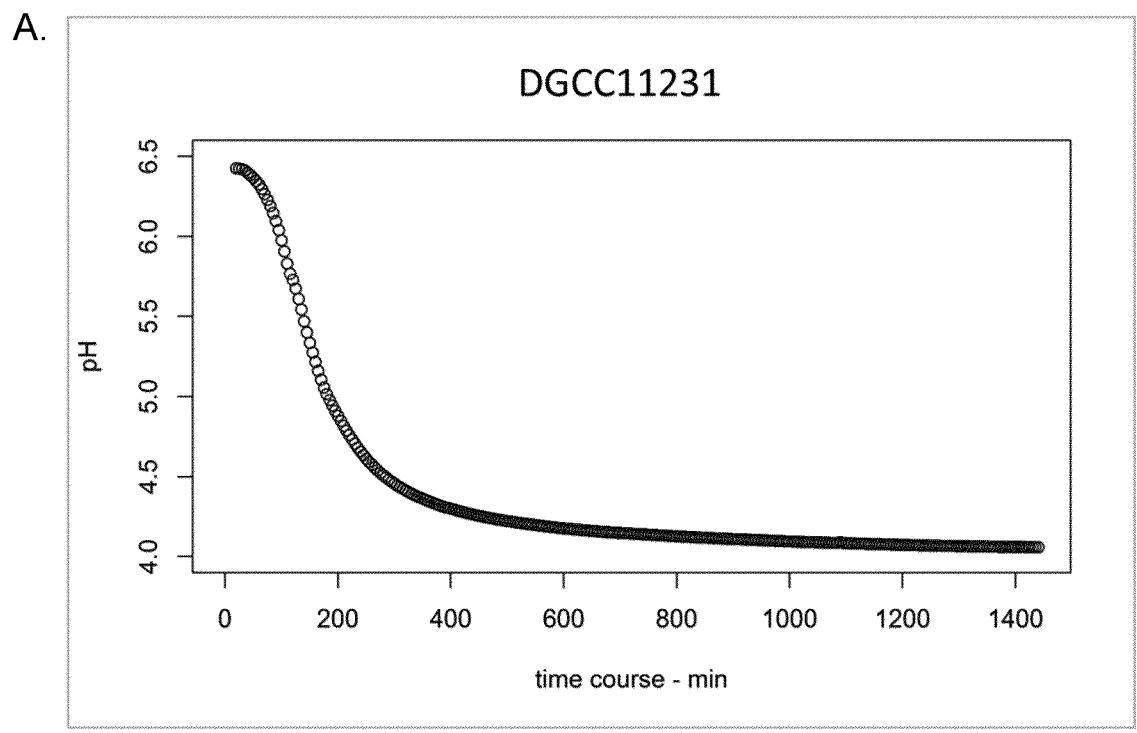
Figure 4:
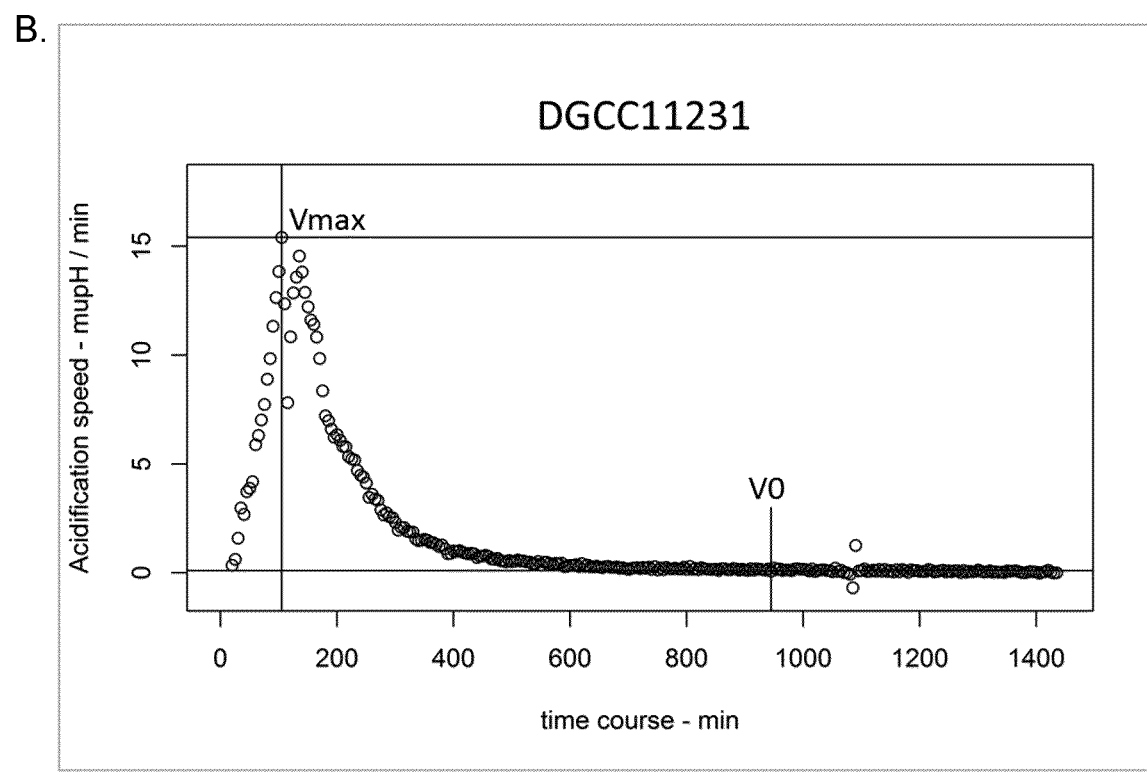
Figure 5:
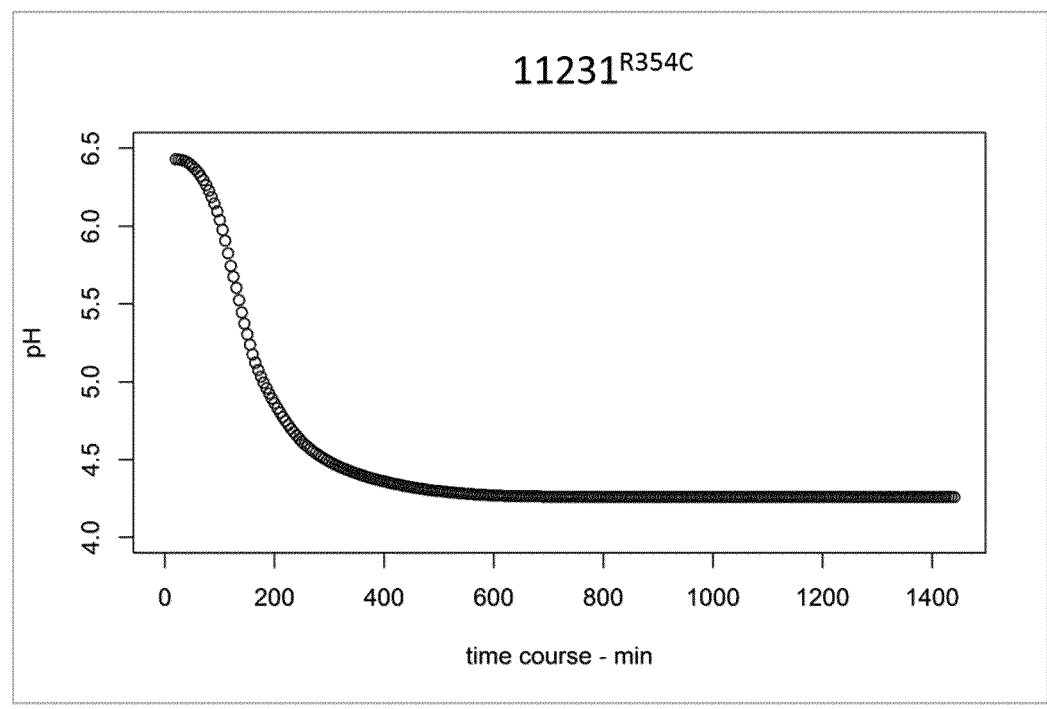
FIG. 5 are graphs representing (A) the acidification profile in milk (pH over time) and (B) the evolution of the speed of acidification overtime (mUpH/min overtime), of strain $11231^{R354C}$
Figure 5:
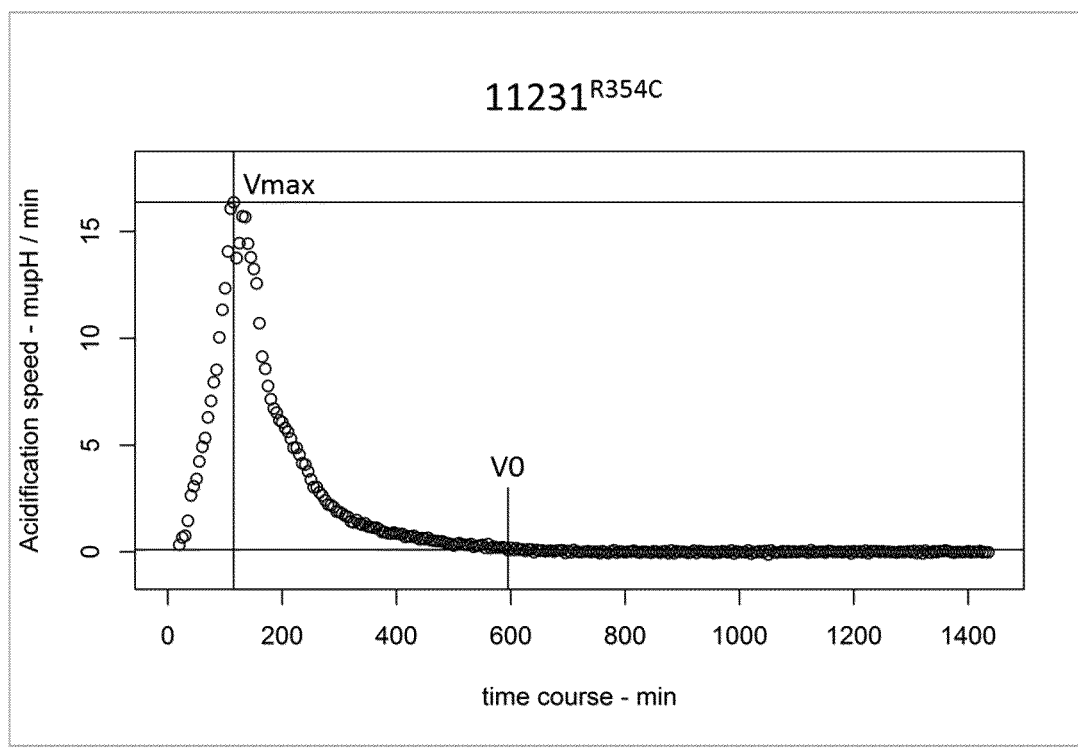

In one aspect, the invention is directed to a polynucleotide encoding a β-galactosidase$^{FS}$ which, when inserted in lieu of the allele of the lacZ gene of strain DGCC715 (deposited at the DSMZ on Feb. 12, 2019 under the accession number DSM33036), leads to a DGCC715-derivative characterized by a ratio LacS$_{pH4.5}$ over LacZ$_{pH4.5}$ which is more than 8, wherein LacS$_{pH4.5}$ represents the activity of lactose importation of the LacS permease calculated by assay A at pH 4.5, and LacZ$_{pH4.5}$ represents the activity of lactose hydrolysis of the beta-galactosidase calculated by assay B at pH 4.5. Thus, the invention is directed to a polynucleotide encoding a β-galactosidase$^{FS}$, which is defined as a lacZ allele which increases the ratio of the activity of lactose importation of the LacS permease calculated by assay A at pH 4.5 over the activity of lactose hydrolysis of the beta-galactosidase calculated by assay B at pH 4.5 (ratio LacS$_{pH4.5}$ over LacZ$_{pH4.5}$) above 8 in a DGCC715 derivative, said DGCC715 derivative being a strain DGCC715 (deposited at the DSMZ on Feb. 12, 2019 under the accession number DSM33036), into which its lacZ gene was replaced by said polynucleotide encoding a β-galactosidase$^{FS}$.

In one aspect, the invention is directed to a polynucleotide comprising a part of at least 100 nucleotides of the polynucleotide encoding a β-galactosidase$^{FS}$, wherein said nucleotide part encompasses the codon corresponding to the residue 354 of said β-galactosidase$^{FS}$.

In one aspect, the invention is directed to a vector comprising a polynucleotide of the invention.

In one aspect, the invention is directed to a *Streptococcus thermophilus* strain comprising an allele of the lacZ gene which is a lacZ$^{FS}$ allele encoding a β-galactosidase$^{FS}$ according to the invention.

In one aspect, the invention is directed to a bacterial composition comprising the *Streptococcus thermophilus* strain of the invention.

In one aspect, the invention is directed to a food or feed product comprising the *Streptococcus thermophilus* strain of the invention or the bacterial composition of the invention.

In one aspect, the invention is directed to a method for manufacturing a fermented product, comprising: a) inoculating a substrate with the *Streptococcus thermophilus* strain of the invention or the bacterial composition of the invention; and b) fermenting the inoculated substrate obtained from step a) to obtain a fermented product, preferably a fermented dairy product.

In one aspect, the invention is directed to the use of the *Streptococcus thermophilus* strain of the invention or the bacterial composition of the invention, to manufacture a food or feed product, preferably a fermented food product, more preferably a fermented dairy product.

In one aspect, the invention is directed to the use of a polynucleotide or vector of the invention, to obtain a *Streptococcus thermophilus* strain with a full STOP phenotype when used to ferment milk by assay C.

In one aspect, the invention is directed to a method to prepare a *Streptococcus thermophilus* strain with a full STOP phenotype, comprising: a) providing a *Streptococcus thermophilus* strain, having a ratio LacS$_{pH4.5}$ over LacZ$_{pH4.5}$ which is less than 5, wherein LacS$_{pH4.5}$ represents the activity of lactose importation of the LacS permease calculated by assay A at pH 4.5, and LacZ$_{pH4.5}$ represents the activity of lactose hydrolysis of the beta-galactosidase calculated by assay B at pH 4.5; b) replacing the allele of the lacZ gene of said *Streptococcus thermophilus* strain of step a) with a polynucleotide of the invention, or replacing a part of the allele of the lacZ gene of said *Streptococcus thermophilus* strain of step a) by the corresponding polynucleotide according to the invention, or modifying the sequence of the lacZ gene of said *Streptococcus thermophilus* strain of step a) to have a lacZ$^{FS}$ allele with the same sequence as a polynucleotide of the invention; and c) recovering the *Streptococcus thermophilus* strain(s) with a full STOP phenotype when used to ferment milk by assay C. Thus, the invention is directed to a method to prepare a *Streptococcus thermophilus* strain with a full STOP phenotype, comprising: a) providing a *Streptococcus thermophilus* strain, having a ratio of the activity of lactose importation of the LacS permease calculated by assay A at pH 4.5 over the activity of lactose hydrolysis of the beta-galactosidase calculated by assay B at pH 4.5 (ratio LacS$_{pH4.5}$ over LacZ$_{pH4.5}$) which is less than 5; b) replacing the allele of the lacZ gene of said *Streptococcus thermophilus* strain of step a) with a polynucleotide of the invention or replacing a part of the allele of the lacZ gene of said *Streptococcus thermophilus* strain of step a) by the corresponding polynucleotide according to the invention, or modifying the sequence of the lacZ gene of said *Streptococcus thermophilus* strain of step a) to have a lacZ$^{FS}$ allele with the same sequence as a polynucleotide of the invention; and c) recovering the *Streptococcus thermophilus* strain(s) with a full STOP phenotype when used to ferment milk by assay C.

In one aspect, the invention is directed to a method to identify a lacZ$^{FS}$ allele encoding a β-galactosidase$^{FS}$, comprising: a) inserting the lacZ allele to be tested in lieu of the allele of the lacZ gene of the strain DGCC715 (deposited at the DSMZ on Feb. 12, 2019 under the accession number DSM33036), to obtain a DGCC715-derivative; and b) determining the activity of lactose importation of the LacS permease by assay A at pH 4.5 (LacS$_{pH4.5}$) and the activity of lactose hydrolysis of the beta-galactosidase by assay B at pH 4.5 (LacZ$_{pH4.5}$); wherein a ratio LacS$_{pH4.5}$ over LacZ$_{pH4.5}$ which is more than 8 is indicative of a lacZ allele which is a lacZ$^{FS}$ allele encoding a β-galactosidase$^{FS}$.

DETAILED DESCRIPTION OF THE INVENTION

General Definitions

Unless defined otherwise, all technical and scientific terms used herein have the same meaning as commonly understood by one of ordinary skill in the art to which this disclosure belongs.

This disclosure is not limited by the exemplary methods and materials disclosed herein, and any methods and materials similar or equivalent to those described herein can be used in the practice or testing of embodiments of this disclosure.

The headings provided herein are not limitations of the various aspects or embodiments of this disclosure which can be used by reference to the specification as a whole. Accordingly, the terms defined immediately below are more fully defined by reference to the specification as a whole.

As used herein, the term "polynucleotide" is synonymous with the term "nucleotide sequence" and/or the term "nucleic acid sequence". Unless otherwise indicated, any nucleic acid sequences are written left to right in 5' to 3' orientation.

The term "protein", as used herein, includes proteins, polypeptides, and peptides. As used herein, the term "amino acid sequence" is synonymous with the term "protein". In the present disclosure and claims, the name of the amino acid, the conventional three-letter code or the conventional one-letter code for amino acid residues is used. It is also understood that a protein may be coded for by more than one nucleotide sequence due to the degeneracy of the genetic code. Unless otherwise indicated, any amino acid sequences are written left to right in amino to carboxy orientation.

In the present invention, a specific numbering of amino acid residue positions in the beta-galactosidase may be employed. By alignment of the amino acid sequence of a sample beta-galactosidase with the beta-galactosidase of SEQ ID NO: 2 it is possible to allot a number to an amino acid residue position in said sample beta-galactosidase which corresponds to the amino acid residue position or numbering of the amino acid sequence shown in SEQ ID NO: 2 of the present invention.

Other definitions of terms may appear throughout the specification. Before the exemplary embodiments are described in more detail, it is to understand that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

It must be noted that as used herein and in the appended claims, the singular forms "a", "an", and "the" include plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The publications discussed herein are provided solely for their disclosure prior to the filing date of the present application. Nothing herein is to be construed as an admission that such publications constitute prior art to the claims appended hereto.

The present invention surprisingly found that mutations modifying the flux of lactose can be used to design *Streptococcus thermophilus* strains, which can be used to produce fermented milk not undergoing post-acidification when stored at fermentation temperature.

In an aspect, the present invention provides a method to identify a lacZ$^{FS}$ allele encoding a β-galactosidase$^{FS}$, comprising:
 a) inserting the lacZ allele to be tested in lieu of the allele of the lacZ gene of the strain DGCC715, to obtain a DGCC715-derivative; and b) determining the activity of lactose importation of the LacS permease by assay A at pH 4.5 (LacS$_{pH4.5}$) and the activity of lactose hydrolysis of the beta-galactosidase by assay B at pH 4.5 (LacZ$_{pH4.5}$) in the DGCC715-derivative of step a);
wherein a ratio LacS$_{pH4.5}$ over LacZ$_{pH4.5}$ which is more than 8 is indicative of a lacZ allele which is a lacZ$^{FS}$ allele encoding a β-galactosidase$^{FS}$.

In an embodiment, the method further comprises determining the activity of lactose hydrolysis of the beta-galactosidase by assay B at pH 6 (LacZ$_{pH6}$) in the DGCC715-derivative, and wherein a ratio LacS$_{pH4.5}$ over LacZ$_{pH4.5}$ which is more than 8 and a LacZ$_{pH6}$ which is at least $7 \cdot 10^{-8}$ mol/(mg of total protein extract·min) are indicative of a lacZ allele which is a lacZ$^{FS}$ allele encoding a β-galactosidase$^{FS}$.

As used herein, the expression "an allele of the lacZ gene" means the version of the lacZ gene found in a particular *Streptococcus thermophilus* strain. As for most of the bacterial genes, the nucleotide sequence of a gene can vary, and alleles represent the different sequences of the same gene.

The lacZ gene of a *Streptococcus thermophilus* strain is understood herein as the nucleotide sequence encoding a beta-galactosidase, located downstream of the lacS gene encoding the lactose permease LacS, within the lac operon [Schroeder C J et al., J Gen Microbiol. 1991 February; 137(2):369-80]. The word "beta-galactosidase" is used herein interchangeably with the word "β-galactosidase".

An example of allele of the lacZ gene of *Streptococcus thermophilus* is the allele of the lacZ gene of the DGCC715 strain (DSM33036) which is as set forth in SEQ ID NO:1. This allele as defined in SEQ ID NO:1 encodes a β-galactosidase as set forth in SEQ ID NO:2.

An example of allele of the lacS gene of *Streptococcus thermophilus* is the allele of the lacS gene of the DGCC715 strain, which is as set forth in SEQ ID NO:30. This allele as defined in SEQ ID NO:30 encodes a lactose permease LacS as set forth in SEQ ID NO:31.

lacZ$^{FS}$ Alleles Encoding β-Galactosidase$^{FS}$

The inventors have shown that some of these lacZ alleles encode a β-galactosidase, the activity of which is largely reduced but not null at pH 4.5 (as determined by assay B), when inserted in lieu of the allele of the lacZ gene (SEQ ID NO:1) of the DGCC715 strain. By "β-galactosidase activity not null at pH 4.5", it is meant that the β-galactosidase activity at pH 4.5 (LacZ$_{pH4.5}$) is detectable when determined by assay B as described herein.

As shown in examples 4 and 5 below, the β-galactosidase activity in *Streptococcus thermophilus* strains is highly variable from a strain to another, such that it is not technically pertinent to refer to β-galactosidase activity without having any reference value or without having any reference strain. Moreover, and as shown in example 6, the reduction of the β-galactosidase activity at pH 4.5 in a DGCC715-derivative strain bearing a lacZ$^{FS}$ allele, as compared to the DGCC715 strain, goes together with an increase of the LacS activity (as determined by assay A). Altogether, these results have led the inventors to characterize the reduction of the β-galactosidase at pH 4.5 by a robust and reproducible parameter, which is the ratio of the activity of lactose importation of the LacS permease calculated by assay A at pH 4.5 over the activity of lactose hydrolysis of the beta-galactosidase calculated by assay B at pH 4.5 (ratio LacS$_{pH4.5}$ over LacZ$_{pH4.5}$). Thus, the inventors have shown that one of these lacZ alleles leads to a ratio LacS$_{pH4.5}$ over LacZ$_{pH4.5}$ of more than 8, when inserted in lieu of the allele of the lacZ gene (SEQ ID NO:1) of the DGCC715 strain. These lacZ alleles are defined herein as "lacZ$^{FS}$ alleles". The protein encoded by these lacZ$^{FS}$ alleles is referred herein as "β-galactosidase$^{FS}$". In other words, a lacZ$^{FS}$ allele increases the ratio of the activity of lactose importation of the LacS permease calculated by assay A at pH 4.5 over the activity of lactose hydrolysis of the beta-galactosidase calculated by assay B at pH 4.5 (ratio LacS$_{pH4.5}$ over LacZ$_{pH4.5}$) above 8 in a DGCC715 derivative, said DGCC715 derivative being a strain DGCC715 (DSM33036), into which its lacZ gene was replaced by said polynucleotide encoding a β-galactosidase$^{FS}$; as defined within this application, the "increase" of the ratio LacS$_{pH4.5}$ over LacZ$_{pH4.5}$ in a DGCC715 derivative is determined compared to the ratio LacS$_{pH4.5}$ over LacZ$_{pH4.5}$ of the strain DGCC715 (DSM33036).

Thus, any lacZ$^{FS}$ allele (encoding a β-galactosidase$^{FS}$) leading to a ratio LacS$_{pH4.5}$ over LacZ$_{pH4.5}$ of more than 8 (as defined herein) in a DGCC715-derivative is part of the invention. Thus, any lacZ$^{FS}$ allele (encoding a β-galactosidase$^{FS}$) increasing the ratio LacS$_{pH4.5}$ over LacZ$_{pH4.5}$ above 8 in a DGCC715-derivative as defined herein is part of the invention. In an embodiment, the lacZ$^{FS}$ allele of the invention (encoding a β-galactosidase$^{FS}$) leads to a ratio LacS$_{pH4.5}$ over LacZ$_{pH4.5}$ which is more than 9 (as defined herein) in a DGCC715-derivative. In an embodiment, the lacZ$^{FS}$ allele of the invention (encoding a β-galactosidase$^{FS}$) leads to a ratio LacS$_{pH4.5}$ over LacZ$_{pH4.5}$ which is more than 10 (as defined herein) in a DGCC715-derivative. In an embodiment, the lacZ$^{FS}$ allele of the invention (encoding a β-galactosidase$^{FS}$) leads to a ratio LacS$_{pH4.5}$ over LacZ$_{pH4.5}$ which is more than 11 (as defined herein) in a DGCC715-derivative. In an embodiment, the lacZ$^{FS}$ allele of the invention (encoding a β-galactosidase$^{FS}$) leads to a ratio LacS$_{pH4.5}$ over LacZ$_{pH4.5}$ which is more than 12 (as defined herein) in a DGCC715-derivative. In an embodiment, the lacZ$^{FS}$ allele of the invention (encoding a β-galactosidase$^{FS}$) leads to a ratio LacS$_{pH4.5}$ over LacZ$_{pH4.5}$ (as defined herein) in a DGCC715-derivative which is selected from the group consisting of more than 9, more than 10, more than 11 and more than 12. Thus, the lacZ$^{FS}$ allele of the invention (encoding a β-galactosidase$^{FS}$) increases the ratio LacS$_{pH4.5}$ over LacZ$_{pH4.5}$, in a DGCC715-derivative as defined herein, above a value selected from the group consisting of above 9, above 10, above 11 and above 12.

As mentioned elsewhere, the β-galactosidase activity at pH 4.5 (LacZ$_{pH4.5}$) is not null, i.e., detectable when determined by assay B; in an embodiment, and in combination with any minimal value regarding the ratio LacS$_{pH4.5}$ over LacZ$_{pH4.5}$ as defined herein, the lacZ$^{FS}$ allele of the invention (encoding a β-galactosidase$^{FS}$) leads to a ratio LacS$_{pH4.5}$ over LacZ$_{pH4.5}$ (as defined herein) in a DGCC715-derivative which is less than 100 (or increases the ratio LacS$_{pH4.5}$ over LacZ$_{pH4.5}$, in a DGCC715-derivative, to less than 100).

In an embodiment, the lacZ$^{FS}$ allele as defined herein is further characterized (in addition to the ratio LacS$_{pH4.5}$ over LacZ$_{pH4.5}$) by the fact that it encodes a β-galactosidase$^{FS}$ the activity of which is at least 7·10$^{-8}$ mol/(mg of total protein extract·min) at pH 6 (as determined by assay B) (LacZ$_{pH6}$), when said lacZ$^{FS}$ allele is inserted in lieu of the allele of the lacZ gene of DGCC715 strain. Thus, the lacZ$^{FS}$ allele as defined herein is further characterized (in addition to the ratio LacS$_{pH4.5}$ over LacZ$_{pH4.5}$) by the fact that it encodes a β-galactosidase$^{FS}$ the activity of which is at least 7·10$^{-8}$ mol/(mg of total protein extract·min) at pH 6 (as determined by assay B) (LacZ$_{pH6}$) in a DGCC715 derivative, said DGCC715 derivative being a strain DGCC715 into which its lacZ gene was replaced by said lacZ$^{FS}$ allele. In an embodiment, the lacZ$^{FS}$ allele encodes a β-galactosidase$^{FS}$ the activity of which is at least 8·10$^{-8}$ mol/(mg of total protein extract·min) at pH 6 (LacZ$_{pH6}$). In an embodiment, the lacZ$^{FS}$ allele encodes β-galactosidase$^{FS}$ the activity of which is at least 9·10$^{-8}$ mol/(mg of total protein extract·min) at pH 6 (LacZ$_{pH6}$). In an embodiment, the lacZ$^{FS}$ allele encodes β-galactosidase$^{FS}$ the activity of which is at least 1·10$^{-7}$ mol/(mg of total protein extract·min) at pH 6 (LacZ$_{pH6}$). In an embodiment, the lacZ$^{FS}$ allele as defined herein is further characterized (in addition to the ratio LacS$_{pH4.5}$ over LacZ$_{pH4.5}$) by the fact that it encodes a β-galactosidase$^{FS}$ the activity of which is selected from the group consisting of at least 7·10$^{-8}$, at least 8·10$^{-8}$, at least 9·10$^{-8}$ and at least 1·10$^{-7}$ mol/(mg of total protein extract·min) at pH 6 (as determined by assay B) (LacZ$_{pH6}$), when said lacZ$^{FS}$ allele is inserted in lieu of the allele of the lacZ gene of DGCC715 strain (i.e., in a DGCC715 derivative, said DGCC715 derivative being a strain DGCC715 into which its lacZ gene was replaced by said lacZ$^{FS}$ allele).

Thus, in an embodiment, any lacZ$^{FS}$ allele (encoding a β-galactosidase$^{FS}$) leading to a ratio LacS$_{pH4.5}$ over LacZ$_{pH4.5}$ of more than 8 (as defined herein) and leading to a LacZ$_{pH6}$ of at least 7·10$^{-8}$ mol/(mg of total protein extract·min) (as defined herein), in a DGCC715-derivative, is part of the invention. In an embodiment, the lacZ$^{FS}$ allele of the invention (encoding a β-galactosidase$^{FS}$) leads to a ratio LacS$_{pH4.5}$ over LacZ$_{pH4.5}$ which is selected from the group consisting of more than 9, more than 10, more than 11 and more than 12 (as defined herein) in a DGCC715-derivative, and leads to a LacZ$_{pH6}$ selected from the group consisting of at least 7·10$^{-8}$, at least 8·10$^{-8}$, at least 9·10$^{-8}$ and at least 1·10$^{-7}$ mol/(mg of total protein extract·min) (as determined by assay B) in said DGCC715-derivative. In an embodiment, the lacZ$^{FS}$ allele of the invention (encoding a β-galactosidase$^{FS}$) leads to a ratio LacS$_{pH4.5}$ over LacZ$_{pH4.5}$ (as defined herein) in a DGCC715-derivative which is less than 100. Thus, any lacZ$^{FS}$ allele (encoding a β-galactosidase$^{FS}$) increasing the ratio LacS$_{pH4.5}$ over LacZ$_{pH4.5}$ above 8 (compared to the ratio LacS$_{pH4.5}$ over LacZ$_{pH4.5}$ of the strain DGCC715) and leading to a LacZ$_{pH6}$ of at least 7·10$^{-8}$ mol/(mg of total protein extract·min) (as defined herein), in a DGCC715-derivative, is part of the invention. In an embodiment, the lacZ$^{FS}$ allele of the invention (encoding a β-galactosidase$^{FS}$) increases the ratio LacS$_{pH4.5}$ over LacZ$_{pH4.5}$ above a value which is selected from the group consisting of above 9, above 10, above 11 and above 12 (as defined herein) in a DGCC715-derivative, and leads to a LacZ$_{pH6}$ selected from the group consisting of at least 7·10$^{-8}$, at least 8·10$^{-8}$, at least 9·10$^{-8}$ and at least 1·10$^{-7}$ mol/(mg of total protein extract·min) (as determined by assay B) in said DGCC715-derivative. In an embodiment, the lacZ$^{FS}$ allele of the invention (encoding a β-galactosidase$^{FS}$) increases the ratio LacS$_{pH4.5}$ over LacZ$_{pH4.5}$ (as defined herein) in a DGCC715-derivative to less than 100.

Non-limitative examples of β-galactosidase$^{FS}$ are disclosed below.

It is noteworthy that in the present invention, the LacS and LacZ activity (at pH 4.5 and at pH 6) are calculated by the assay A and the assay B respectively, as described herein.

A lacZ allele which, when inserted in lieu of the allele of the lacZ gene of DGCC715 strain does not lead to a ratio LacS$_{pH4.5}$ over LacZ$_{pH4.5}$ (as defined herein) of more than 8 is not considered to be a lacZ$^{FS}$ allele according to the invention. In other words, a lacZ allele which, does not increase the ratio LacS$_{pH4.5}$ over LacZ$_{pH4.5}$ (as defined herein) above 8 in a DGCC715 derivative is not considered to be a lacZ$^{FS}$ allele according to the invention, said DGCC715 derivative being a strain DGCC715 into which its lacZ gene was replaced by said lacZ allele.

LacS Activity, LacZ Activity and Ratio

The invention relies on the determination of activity of lactose importation of the LacS permease and/or the determination of the activity of lactose hydrolysis of the beta-galactosidase, at particular pHs (pH 4.5 and/or pH 6). These activities are determined in a particular strain, such as for example in the DGCC715 strain or in a DGCC715-derivative as defined herein.

The activity of lactose importation of the LacS permease at a particular pH (pH X) is referred herein as "$LacS_{pHx}$". In an embodiment, this activity is determined at pH 4.5 ($LacS_{pH4.5}$). In an embodiment, this activity is determined at pH 6 ($LacS_{pH6}$). In a particular embodiment, the activity of lactose importation of the LacS permease is determined at a particular pH (such as pH 4.5 or pH 6) by assay A.

The activity of lactose hydrolysis of the beta-galactosidase at a particular pH (pH X) is referred herein as "$LacZ_{pHx}$". In an embodiment, this activity is determined at pH 4.5 ($LacZ_{pH4.5}$). In an embodiment, this activity is determined at pH 6 ($LacZ_{pH6}$). In a particular embodiment, the activity of lactose hydrolysis of the beta-galactosidase is determined at a particular pH (such as pH 4.5 or pH 6) by assay B.

One way to determine the ratio $LacS_{pH4.5}$ over $LacZ_{pH4.5}$ for the identification of the $lacZ^{FS}$ allele of the invention, is to determine the activity of lactose importation of the LacS permease at pH4.5 in a DGCC715 strain in which the allele of its lacZ gene has been replaced with a lacZ allele to be tested (called herein "DGCC715-derivative") and to determine the activity of lactose hydrolysis of the beta-galactosidase at pH 4.5 in the same DGCC715-derivative, and to calculate the ratio of both activities.

Assay A (LacS Activity)

*Streptococcus thermophilus* strains were grown on M17 media containing 30 g/L of sucrose as sole carbon source overnight at 37° C. When cells reached the stationary phase, they were transferred (at 0.05 uDO/mL) in 1 volume of M17 media containing 30 g/L of lactose as sole carbon source and they were incubated for 2 hours at 42° C. Strain cultures were centrifuged at room temperature (3500 g), the supernatant was removed and cells were resuspended in 0.5 volume of 4% (w/v) glycerophosphate. This washing step was applied twice. 1.8 mL of cell suspension in 4% glycerophosphate were incubated for 2 minutes at 42° C. Then, 0.2 mL of lactose solution (70 g/L of lactose+0.1 M potassium phosphate buffer) was added [the lactose solution pH was previously adjusted at pH 4.5 or at pH 6, depending on the measurement needed]. The mix was incubated for 3 additional minutes at 42° C. The reaction was blocked by filtrating on 0.22 µm filter in order to remove cells. Then, the lactose in the filtrated solution was assayed on an HPLC using the following protocol. The solution was diluted 10-fold in water and 10 µL were injected on an Agilent 1200 HPLC (high-performance-liquid-chromatography). The elution was done in isocratic mode with pure water at 0.6 mL/min. Molecules were separated in 40 min onto a $Pb^{2+}$ ion exchange column (SP-0810 Shodex® 300 mm×8 mm×7 µm) column. Sugars were detected with refractometer. Quantification was performed by external calibration.

The activity of lactose importation of the LacS permease is calculated as follows:

LacS activity=$([lactose]_{initial}-[lactose]_{3\,min})/(DO \times time)$, expressed in µmol/(uDO·min), wherein:
[lactose]$_{initial}$ is the initial concentration in µmol/mL
[lactose]$_{3\,min}$ is the concentration in µmol/mL after 3 minutes at 42° C.
DO is the bacterial density in uDO/mL
time is the experiment duration in minutes (in the present case, 3 minutes).

Assay B (LacZ Activity)

A fresh overnight culture of the *Streptococcus thermophilus* strain to be assayed in M17 containing 30 g/L lactose was obtained and used to inoculate at 1% (v/v) 10 ml of fresh M17 containing 30 g/L lactose. Cells were harvested by centrifugation (6000 g, 10 min, 4° C.) after 3 hours of growth on M17 containing 30 g/L lactose at 42° C., washed in 1.5 ml of cold lysis buffer (KPO4 0.1 M), and resuspended in 300 µl of cold lysis buffer. EDTA-free protease inhibitors "cOmplete™" (Roche, supplier reference 04693132001) was added to the lysis buffer as described by the supplier. Cells were disrupted by the addition of 100 mg glass beads (150-212 µm, Sigma G1145) to 250 µl of resuspended cells and oscillation at a frequency of 30 cycles/s for 6 min in a MM200 oscillating mill (Retsch, Haan, Germany). Cell debris and glass beads were removed by centrifugation (14000 g, 15 min, 4° C.), and the supernatant was transferred into a clean 1.5 mL centrifuge tube kept on ice. Total protein content was determined by using the FLUKA Protein Quantification Kit-Rapid (ref 51254). The beta-galactosidase activity in the cell extracts was determined spectrophotometrically by a monitoring of the hydrolysis of O-nitro-Phenol-Beta-Galactoside (ONPG) into galactose and O-nitro-phenol (ONP). Twenty µL of the cell extract were mixed with 135 µL of React Buffer (NaPO$_4$ 100 mM; KCl 10 mM; MgSO$_4$ 1 mM; ONPG 3 mM+Beta Mercapto Ethanol 60 mM, pH=6). The production of ONP leads to a yellow color into the tube. When the yellow color was appearing, the reaction was blocked by adding 250 µL of Stopping buffer (Na$_2$CO$_3$ 1 M). The optical density at 420 nm was recorded using a Synergy HT multi-detection microplate reader (BIO-TEK). One unit of beta-galactosidase corresponds to the amount of enzyme that catalyzes the production of 1 µmole ONP per minute under the assay conditions. Beta-galactosidase activity was calculated as follows:

LacZ activity=$dOD \times V/[dt \times l \times \epsilon \times Qprot]$, expressed in mol/(mg of total protein extract·min), wherein:
dOD is the variation of optical density (OD) at 420 nm between the blank and the tested sample
V is the volume of the reaction in which the optical density is measured (herein 250 µL)
dt=represent the duration in minutes between the addition of the 20 µL of bacterial extract and the addition of the 250 µL stopping buffer
l=optical path length (herein 0.73 cm)
$\epsilon$=molar attenuation coefficient of ONP (herein 4500 cm$^2$/µmol)
Qprot=quantity of protein in the cuvette (in mg)

Ratio Calculation

Once the LacS and LacZ activities have been calculated as defined herein, the ratio of the activities $LacS_{pHX}$ over $LacZ_{pHX}$, is calculated as follows: [$LacS_{pHX}$ as defined herein/$LacZ_{pHX}$ as defined herein]$\times 10^{-6}$.

It is noteworthy that when a ratio $LacS_{pHX}$ over $LacZ_{pHX}$ is mentioned, both the LacS and LacZ activities are calculated in the same strain, in particular in the same DGCC715-derivative.

lacZ Variant Allele Encoding a β-Galactosidase Variant

A lacZ allele, which 1) encodes β-galactosidase the sequence of which has at least 95% identity with SEQ ID NO:2, and 2) leads to a ratio $LacS_{pH4.5}$ over $LacZ_{pH4.5}$ (as defined herein) of less than 5, when inserted in lieu of the allele of the lacZ gene of DGCC715 strain, is referred herein as a lacZ variant allele (encoding a β-galactosidase variant). In other words, a lacZ allele, which 1) encodes β-galactosidase the sequence of which has at least 95% identity with SEQ ID NO:2, and 2) does not increase the ratio $LacS_{pH4.5}$ over $LacZ_{pH4.5}$ (as defined herein) to 5 or more than 5, in a DGCC715 derivative, is referred herein as a lacZ variant allele (encoding a β-galactosidase variant), said DGCC715 derivative being a strain DGCC715 into which its lacZ gene was replaced by said lacZ variant allele; as previously mentioned, the "increase" of the ratio $LacS_{pH4.5}$ over $LacZ_{pH4.5}$ in a DGCC715 derivative is determined compared to the ratio $LacS_{pH4.5}$ over $LacZ_{pH4.5}$ of the strain DGCC715 (DSM33036). The expression "β-galactosidase variant" is used interchangeably with the expression "β-galactosidase variant having at least 95% identity with SEQ ID NO:2".

In an embodiment, the lacZ variant allele, when inserted in lieu of the allele of the lacZ gene of DGCC715 strain, leads to a ratio $LacS_{pH4.5}$ over $LacZ_{pH4.5}$ (as defined herein) of less than 4 (or does not increase the ratio $LacS_{pH4.5}$ over $LacZ_{pH4.5}$ to 4 or more than 4 in a DGCC715 derivative as defined herein). In an embodiment, the lacZ variant allele, when inserted in lieu of the allele of the lacZ gene of DGCC715 strain, leads to a ratio $LacS_{pH4.5}$ over $LacZ_{pH4.5}$ (as defined herein) of less than 3 (or does not increase the ratio $LacS_{pH4.5}$ over $LacZ_{pH4.5}$ to 3 or more than 3 in a DGCC715 derivative as defined herein).

In combination with any of the embodiments directed to the ratio $LacS_{pH4.5}$ over $LacZ_{pH4.5}$ above, a lacZ variant allele is also defined as encoding a β-galactosidase variant, the sequence of which is at least 95% identical to SEQ ID NO:2. By "at least 95% identical to SEQ ID NO:2", it is meant at least 95%, at least 96%, at least 97%, at least 98% or at least 99%. In an embodiment, a β-galactosidase variant (encoded by a lacZ variant allele) has a sequence which is at least 96% identical to SEQ ID NO:2. In an embodiment, a β-galactosidase variant (encoded by a lacZ variant allele) has a sequence which is at least 97% identical to SEQ ID NO:2. In an embodiment, a β-galactosidase variant (encoded by a lacZ variant allele) has a sequence which is at least 98% identical to SEQ ID NO:2. In an embodiment, a β-galactosidase variant (encoded by a lacZ variant allele) has a sequence which is at least 99% identical to SEQ ID NO:2.

In an embodiment, in combination with the percentage of identity, the size of the β-galactosidase variant is the same as the β-galactosidase protein as defined in SEQ ID NO:2 (1026 amino acid residues); thus, in an embodiment, a lacZ variant allele is additionally defined as encoding a 1026-amino acid β-galactosidase variant.

In an embodiment, a lacZ variant allele is defined herein as:
1) encoding a β-galactosidase variant, the sequence of which is at least 95%, at least 96%, at least 97%, at least 98% or at least 99% identical to SEQ ID NO:2; and
2) when inserted in lieu of the allele of the lacZ gene of the DGCC715 strain, leads to a ratio $LacS_{pH4.5}$ over $LacZ_{pH4.5}$ (as defined herein) which is less than 5, less than 4 or less than 3.

Thus, a lacZ variant allele is defined herein as:
1) encoding a β-galactosidase variant, the sequence of which is at least 95%, at least 96%, at least 97%, at least 98% or at least 99% identical to SEQ ID NO:2; and
2) not increasing the ratio $LacS_{pH4.5}$ over $LacZ_{pH4.5}$ to 5 or more than 5, to 4 or more than 4 or to 3 or more than 3 in a DGCC715 derivative as defined herein.

Non-limitative examples of β-galactosidase variants are disclosed in Table 2, and their sequence is as defined in SEQ ID Nos 6, 9, 12, 15, 18, 21, 24 and 27.

Replacement of the Allele of the lacZ Gene of a *Streptococcus thermophilus* Strain (in Particular of the DGCC715 Strain)

The replacement of the allele of the lacZ gene of a particular *Streptococcus thermophilus* strain by a lacZ allele to be tested is carried out using conventional techniques in molecular biology and is within the capabilities of a person of ordinary skill in the art. Generally speaking, suitable routine methods include replacement via homologous recombination.

The expression "lacZ allele inserted in lieu of the allele of the lacZ gene" is synonymous to the expression "the allele of the lacZ gene is replaced by a lacZ allele to be tested". The expression "$lacZ^{FS}$ allele inserted in lieu of the allele of the lacZ gene" is synonymous to the expression "the allele of the lacZ gene is replaced by a $lacZ^{FS}$ allele".

Replaced (or inserted in lieu) means that the sequence of the β-galactosidase encoded by the lacZ allele to be inserted (the lacZ allele to be tested) is different from the sequence of the β-galactosidase encoded by the allele of the lacZ gene of the *Streptococcus thermophilus* strain. Thus, replaced (or inserted in lieu) means that the coding sequence of the lacZ gene of the *Streptococcus thermophilus* strain (from the 1$^{st}$ nucleotide of the start codon to the last nucleotide of the stop codon) is replaced by the corresponding coding sequence of the lacZ allele to be tested.

In the case of the DGCC715 strain, replaced (or inserted in lieu) means that the sequence of the β-galactosidase protein encoded by the lacZ allele to be inserted (the lacZ allele to be tested) is different from the sequence of the β-galactosidase encoded by the lacZ gene of the DGCC715 strain. Thus, replaced (or inserted in lieu) means that the coding sequence of the lacZ gene of the DGCC715 strain (from the 1$^{st}$ nucleotide of the start codon to the last nucleotide of the stop codon, i.e., nucleotides 1 to 3081 of SEQ ID NO:1) is replaced by the corresponding coding sequence of the lacZ allele to be tested. A DGCC715 strain, the lacZ gene of which has been replaced by a lacZ allele to be tested (such as a $lacZ^{FS}$ allele or a lacZ variant allele), is defined herein as a "DGCC715-derivative".

DGCC715 Strain

The *Streptococcus thermophilus* DGCC715 strain has been deposited by DuPont Nutrition Biosciences ApS under the Budapest Treaty at the Leibniz-Institut DSMZ-Deutsche Sammlung von Mikroorganismen und Zellkulturen, GmbH (Inhoffenstr. 7B, D-38124 Braunschweig), on Feb. 12, 2019 and have received the deposit number DSM33036. Conditions for culturing this strain are provided in the examples part. The applicant requests that a sample of the deposited micro-organism stated herein may only be made available to an expert, until the date on which the patent is granted.

The expressions "DGCC715 strain" and "DGCC715-derivative" are used interchangeably with the expressions "DSM33036 strain" and "DSM33036-derivative" respectively.

To Generate a lacZ Allele to be Tested (Including a $lacZ^{FS}$ Allele)

lacZ alleles to be tested (in particular $lacZ^{FS}$ alleles) can be generated by random or directed mutagenesis, starting from a lacZ allele which is not a $lacZ^{FS}$ allele, in particular starting from a lacZ allele encoding the β-galactosidase as defined in SEQ ID NO:2 (such as SEQ ID NO:1) or starting from a lacZ variant allele as defined herein. In an embodiment, lacZ alleles to be tested (in particular $lacZ^{FS}$ alleles)

are generated by random mutagenesis. In another embodiment, lacZ alleles to be tested (in particular lacZ$^{FS}$ alleles) can be generated by directed mutagenesis. Suitable mutagenesis protocols for random or directed mutagenesis are well known and described in the literature.

The lacZ alleles to be tested thus generated can be screened using the method to identify a lacZ$^{FS}$ allele as defined herein.

Sequences of β-Galactosidase$^{FS}$ Proteins

The lacZ$^{FS}$ allele of the invention—as part of a polynucleotide of the invention or contained in the lactic acid bacterium of the invention—can be defined, in addition to lead to a ratio LacS$_{pH4.5}$ over LacZ$_{pH4.5}$ of more than 8 (as defined herein) (or to increase the ratio LacS$_{pH4.5}$ over LacZ$_{pH4.5}$ to more than 8) and optionally to lead to a LacZ$_{pH6}$ of at least 7·10$^{-8}$ mol/(mg of total protein extract·min) (as defined herein), by its nucleotide sequence or by the amino acid sequence of the β-galactosidase it encodes.

In an embodiment, the lacZ$^{FS}$ allele as defined herein encodes β-galactosidase$^{FS}$, the sequence of which is different from SEQ ID NO:2. In an embodiment, the lacZ$^{FS}$ allele as defined herein—as part of a polynucleotide of the invention or contained in the lactic acid bacterium of the invention—is defined by the fact that it leads to a ratio LacS$_{pH4.5}$ over LacZ$_{pH4.5}$ of more than 8 (as defined herein) (or increases the ratio LacS$_{pH4.5}$ over LacZ$_{pH4.5}$ to more than 8), and optionally to a LacZ$_{pH6}$ of at least 7·10$^{-8}$ mol/(mg of total protein extract·min) (as defined herein), in a DGCC715-derivative, and that it encodes a β-galactosidase$^{FS}$, the sequence of which is different from SEQ ID NO:2. Particular embodiments regarding the ratio LacS$_{pH4.5}$ over LacZ$_{pH4.5}$ and the LacZ$_{pH6}$ described elsewhere in this application apply similarly in the current context.

In an embodiment, the lacZ$^{FS}$ allele encodes β-galactosidase$^{FS}$ comprising an amino-acid suppression (i.e., the suppression of one or more an amino acids), an amino-acid addition (i.e., the addition of one or more an amino acids), an amino-acid substitution (i.e., the substitution of one or more an amino acids) or an amino-acid suppression and addition (i.e., the suppression and addition of one or more an amino acids), relative to a β-galactosidase selected from the group consisting of:
  a) a β-galactosidase having an amino-acid sequence as defined in SEQ ID NO:2; and
  b) a β-galactosidase variant protein as defined herein having at least 95% identity with SEQ ID NO:2. A β-galactosidase variant protein as defined herein is encoded by a lacZ variant allele, which when inserted in lieu of the allele of the lacZ gene of the DGCC715 strain, leads to a ratio LacS$_{pH4.5}$ over LacZ$_{pH4.5}$ which is less than 5 (as defined herein) (or does not increase the ratio LacS$_{pH4.5}$ over LacZ$_{pH4.5}$ to 5 or more than 5 in a in a DGCC715 derivative as defined herein). Particular embodiments regarding the ratio LacS$_{pH4.5}$ over LacZ$_{pH4.5}$, percentage of identity and size described elsewhere in this application within the context of the lacZ variant allele apply similarly in the current context.

In an embodiment, the lacZ$^{FS}$ allele encodes β-galactosidase$^{FS}$ comprising an amino acid suppression, relative to a β-galactosidase selected from the group consisting of a) a β-galactosidase having an amino acid sequence as defined in SEQ ID NO:2 and b) a β-galactosidase variant as defined herein having at least 95% identity with SEQ ID NO:2; in a particular embodiment, the β-galactosidase$^{FS}$ is characterized by the suppression of at least one amino acid, in particular by the suppression of 1, 2, 3, 4 or 5 amino acids.

In a particular embodiment, the β-galactosidase$^{FS}$ is characterized by the suppression of one amino acid. In a particular embodiment, the β-galactosidase$^{FS}$ is characterized by the suppression of 2, 3, 4 or 5 amino acids. In a particular embodiment, the β-galactosidase$^{FS}$ is characterized by the suppression of 2, 3, 4 or 5 consecutive amino acids.

In an embodiment, the lacZ$^{FS}$ allele encodes β-galactosidase$^{FS}$ comprising an amino acid addition, relative to a β-galactosidase selected from the group consisting of a) a β-galactosidase having an amino acid sequence as defined in SEQ ID NO:2 and b) a β-galactosidase variant as defined herein having at least 95% identity with SEQ ID NO:2; in a particular embodiment, the β-galactosidase$^{FS}$ is characterized by the addition of at least one amino acid, in particular by the addition of 1, 2, 3, 4 or 5 amino acids. In a particular embodiment, the β-galactosidase$^{FS}$ is characterized by the addition of one amino acid. In a particular embodiment, the β-galactosidase$^{FS}$ is characterized by the addition of 2, 3, 4 or 5 amino acids. In a particular embodiment, the β-galactosidase$^{FS}$ is characterized by the addition of 2, 3, 4 or 5 consecutive amino acids.

In an embodiment, the lacZ$^{FS}$ allele encodes β-galactosidase$^{FS}$ comprising an amino acid substitution relative to a β-galactosidase selected from the group consisting of a) a β-galactosidase having an amino acid sequence as defined in SEQ ID NO:2 and b) a β-galactosidase variant as defined herein having at least 95% identity with SEQ ID NO:2; in a particular embodiment, the β-galactosidase$^{FS}$ is characterized by the substitution of at least one amino acid, in particular by the substitution of 1, 2, 3, 4 or 5 amino acids. In a particular embodiment, the β-galactosidase$^{FS}$ is characterized by the substitution of one amino acid. In a particular embodiment, the β-galactosidase$^{FS}$ is characterized by the substitution of 2, 3, 4 or 5 amino acids. In a particular embodiment, the β-galactosidase$^{FS}$ is 1026 amino acids in length.

In an embodiment, the lacZ$^{FS}$ allele encodes β-galactosidase$^{FS}$, wherein the sequence of said β-galactosidase$^{FS}$ does not comprise an arginine at position 354, wherein the amino acid sequence set forth in SEQ ID NO:2 is used for numbering.

In an embodiment, the lacZ$^{FS}$ allele encodes β-galactosidase$^{FS}$, wherein the sequence of said β-galactosidase$^{FS}$ does not comprise an amino acid residue selected from the group consisting of arginine, histidine, glutamine and lysine at position 354, wherein the amino acid sequence set forth in SEQ ID NO:2 is used for numbering. In an embodiment, the lacZ$^{FS}$ allele encodes a β-galactosidase$^{FS}$, wherein the sequence of said β-galactosidase$^{FS}$ does not comprise an amino acid residue selected from the group consisting of arginine, histidine, glutamine, lysine, glutamic acid and asparagine at position 354, wherein the amino acid sequence set forth in SEQ ID NO:2 is used for numbering In an embodiment, the lacZ$^{FS}$ allele encodes β-galactosidase$^{FS}$ comprising a cysteine or an equivalent amino acid thereof at position 354, wherein the amino acid sequence set forth in SEQ ID NO:2 is used for numbering. By "equivalent amino acid thereof", it is meant any amino acid having similarity in polarity, charge, solubility, hydrophobicity, hydrophilicity, and/or the amphipathic nature of the residues, as long as the lacZ$^{FS}$ allele encoding this β-galactosidase$^{FS}$, leads to a ratio LacS$_{pH4.5}$ over LacZ$_{pH4.5}$ of more than 8 (as defined herein) and optionally leads to a LacZ$_{pH6}$ of at least 7·10$^{-8}$ mol/(mg of total protein extract·min) (as defined herein), when inserted in lieu of the allele of the lacZ gene of the DGCC715 strain. In an embodiment, the lacZ$^{FS}$ allele encodes β-galactosidase$^{FS}$ comprising an amino acid residue selected from the group consisting of cysteine, alanine and serine at position 354, wherein the amino acid sequence set forth in SEQ ID NO:2 is used for numbering In an embodiment, the lacZ$^{FS}$ allele encodes β-galactosidase$^{FS}$ comprising a cysteine at position 354, wherein the amino acid sequence set forth in SEQ ID NO:2 is used for numbering. In a particular embodiment of any of these embodiments, the β-galactosidase$^{FS}$ is 1026 amino acids in length.

In an embodiment, the lacZ$^{FS}$ allele of the invention encodes a β-galactosidase$^{FS}$, the sequence of which is at least 95% identical to, but different from, SEQ ID NO:2.

In an embodiment, the lacZ$^{FS}$ allele encodes β-galactosidase$^{FS}$, the sequence of which is at least 95% identical to, but different from, SEQ ID NO:2, and does not comprise an arginine at position 354, wherein the amino acid sequence set forth in SEQ ID NO:2 is used for numbering.

In an embodiment, the lacZ$^{FS}$ allele encodes β-galactosidase$^{FS}$, the sequence of which is at least 95% identical to, but different from, SEQ ID NO:2, and does not comprise an amino acid residue selected from the group consisting of arginine, histidine, glutamine and lysine at position 354, wherein the amino acid sequence set forth in SEQ ID NO:2 is used for numbering.

In an embodiment, the lacZ$^{FS}$ allele encodes β-galactosidase$^{FS}$, the sequence of which is at least 95% identical to, but different from, SEQ ID NO:2, and does not comprise an amino acid residue selected from the group consisting of arginine, histidine, glutamine, lysine, glutamic acid and asparagine at position 354, wherein the amino acid sequence set forth in SEQ ID NO:2 is used for numbering In an embodiment, the lacZ$^{FS}$ allele encodes β-galactosidase$^{FS}$, the sequence of which is at least 95% identical to, but different from, SEQ ID NO:2, and comprises a cysteine or an equivalent amino acid thereof at position 354, wherein the amino acid sequence set forth in SEQ ID NO:2 is used for numbering.

In an embodiment, the lacZ$^{FS}$ allele encodes β-galactosidase$^{FS}$, the sequence of which is at least 95% identical to, but different from, SEQ ID NO:2, and comprises an amino acid residue selected from the group consisting of cysteine, alanine and serine at position 354, wherein the amino acid sequence set forth in SEQ ID NO:2 is used for numbering In an embodiment, the lacZ$^{FS}$ allele encodes β-galactosidase$^{FS}$, the sequence of which is at least 95% identical to, but different from, SEQ ID NO:2, and comprises a cysteine at position 354, wherein the amino acid sequence set forth in SEQ ID NO:2 is used for numbering. In a particular embodiment of any of these embodiments, the β-galactosidase$^{FS}$ is 1026 amino acids in length.

In an embodiment, the lacZ$^{FS}$ allele encodes β-galactosidase$^{FS}$ comprising:
a) an amino acid sequence which is otherwise as defined in SEQ ID NO:2, but which does not comprise an arginine at position 354 (SEQ ID NO:5, wherein position 354 is not an arginine); or
b) an amino acid sequence which is otherwise the one of a β-galactosidase variant having at least 95% identity with SEQ ID NO:2 (β-galactosidase variant as defined herein), but which does not comprise an arginine at position 354. Non-limitative examples of β-galactosidase$^{FS}$ are as defined in SEQ ID Nos 7, 10, 13, 16, 19, 22, 25 and 28, wherein position 354 is not an arginine.

In an embodiment, the lacZ$^{FS}$ allele encodes β-galactosidase$^{FS}$ comprising:
a) an amino acid sequence which is otherwise as defined in SEQ ID NO:2, but which does not comprise an amino acid residue selected from the group consisting of arginine, histidine, glutamine and lysine at position 354 (SEQ ID NO:5, wherein position 354 is not an amino acid residue selected from the group consisting of arginine, histidine, glutamine and lysine); or
b) an amino acid sequence which is otherwise the one of a β-galactosidase variant having at least 95% identity with SEQ ID NO:2 (β-galactosidase variant as defined herein), but which does not comprise an amino acid residue selected from the group consisting of arginine, histidine, glutamine and lysine at position 354. Non-limitative examples of β-galactosidase$^{FS}$ Non-limitative examples of β-galactosidase$^{FS}$ are as defined in SEQ ID Nos 7, 10, 13, 16, 19, 22, 25 and 28, wherein position 354 is not an amino acid residue selected from the group consisting of arginine, histidine, glutamine and lysine.

In an embodiment, the lacZ$^{FS}$ allele encodes β-galactosidase$^{FS}$ comprising:
a) an amino acid sequence which is otherwise as defined in SEQ ID NO:2, but which does not comprise an amino acid residue selected from the group consisting of arginine, histidine, glutamine, lysine, glutamic acid and asparagine at position 354 (SEQ ID NO:5, wherein position 354 is not an amino acid residue selected from the group consisting of arginine, histidine, glutamine, lysine, glutamic acid and asparagine); or
b) an amino acid sequence which is otherwise the one of a β-galactosidase variant having at least 95% identity with SEQ ID NO:2 (β-galactosidase variant as defined herein), but which does not comprise an amino acid residue selected from the group consisting of arginine, histidine, glutamine, lysine, glutamic acid and asparagine at position 354. Non-limitative examples of β-galactosidase$^{FS}$ are as defined in SEQ ID Nos 7, 10, 13, 16, 19, 22, 25 and 28, wherein position 354 is not an amino acid residue selected from the group consisting of arginine, histidine, glutamine, lysine, glutamic acid and asparagine.

In an embodiment, the lacZ$^{FS}$ allele encodes β-galactosidase$^{FS}$ comprising:
a) an amino acid sequence which is otherwise as defined in SEQ ID NO:2, but which comprises a cysteine or an equivalent amino acid thereof at position 354 (SEQ ID NO:5, wherein position 354 is a cysteine or an equivalent amino acid thereof); or
b) an amino acid sequence which is otherwise the one of a β-galactosidase variant having at least 95% identity with SEQ ID NO:2 (β-galactosidase variant as defined herein), but which comprises a cysteine or an equivalent amino acid thereof at position 354. Non-limitative examples of β-galactosidase$^{FS}$ are as defined in SEQ ID Nos 7, 10, 13, 16, 19, 22, 25 and 28, wherein position 354 is a cysteine or an equivalent amino acid thereof.

In an embodiment, the lacZ$^{FS}$ allele encodes β-galactosidase$^{FS}$ comprising:
a) an amino acid sequence which is otherwise as defined in SEQ ID NO:2, but which comprises an amino acid residue selected from the group consisting of cysteine, alanine and serine at position 354 (SEQ ID NO:5, wherein position 354 is selected from the group consisting of cysteine, alanine and serine); or
b) an amino acid sequence which is otherwise the one of a β-galactosidase variant having at least 95% identity with SEQ ID NO:2 (β-galactosidase variant as defined herein), but which comprises an amino acid residue selected from the group consisting of cysteine, alanine and serine at position 354. Non-limitative examples of β-galactosidase$^{FS}$ are as defined in SEQ ID Nos 7, 10, 13, 16, 19, 22, 25 and 28, wherein position 354 is an amino acid residue selected from the group consisting of cysteine, alanine and serine.

In an embodiment, the lacZ$^{FS}$ allele encodes β-galactosidase$^{FS}$ comprising:
  a) an amino acid sequence which is otherwise as defined in SEQ ID NO:2, but which comprises a cysteine at position 354 (SEQ ID NO:4); in an embodiment, the lacZ$^{FS}$ allele is as set forth in SEQ ID NO:3; or
  b) an amino acid sequence which is otherwise the one of a β-galactosidase variant having at least 95% identity with SEQ ID NO:2 (β-galactosidase variant as defined herein), but which comprises a cysteine at position 354. Non-limitative examples of β-galactosidase$^{FS}$ are as defined in SEQ ID NOs: 8, 11, 14, 17, 20, 23, 26 and 29.

In an embodiment, the lacZ$^{FS}$ allele encodes β-galactosidase$^{FS}$ which is obtained from a β-galactosidase having a sequence as set forth in SEQ ID NO:2, by the substitution of the arginine by a cysteine at position 354 (R354C).

In an embodiment, the lacZ$^{FS}$ allele encodes β-galactosidase$^{FS}$ which is obtained from a β-galactosidase variant having at least 95% identity with SEQ ID NO:2 (β-galactosidase variant as defined herein), by the substitution of the arginine by a cysteine at position 354 (R354C). In an embodiment, the lacZ$^{FS}$ allele encodes β-galactosidase$^{FS}$ which is obtained from a β-galactosidase variant as set forth in SEQ ID NO: 6, 9, 12, 15, 18, 21, 24 or 27, by the substitution of the arginine by a cysteine at position 354 (R354C).

In a particular embodiment of any of these embodiments, the β-galactosidase$^{FS}$ is 1026 amino acids in length.

Amino Acid Numbering

In the present application, a specific numbering of amino acid residue positions is used for the characterization of the β-galactosidase. By alignment of the amino acid sequence of a β-galactosidase$^{FS}$ protein or of a β-galactosidase variant, with the β-galactosidase protein defined in SEQ ID NO:2, it is possible to allot a number to an amino acid residue position in said β-galactosidase$^{FS}$ or said β-galactosidase variant respectively, which corresponds with the amino acid residue position or numbering of the amino acid sequence shown in SEQ ID NO:2.

An alternative way of describing the amino acid numbering used in this application is to say that amino acid positions are identified by those 'corresponding' to a particular position in the amino acid sequence shown in SEQ ID NO:2. This is not to be interpreted as meaning the sequences of the present invention must include the amino acid sequence shown in SEQ ID NO:2. A skilled person will readily appreciate that β-galactosidase sequences vary among different bacterial strains. Reference to the amino acid sequence shown in SEQ ID NO:2 is used merely to enable identification of a particular amino acid location within any particular β-galactosidase. Such amino acid locations can be routinely identified using sequence alignment programs, the use of which are well known in the art.

Polynucleotide of the Invention

In an aspect, the present invention provides a polynucleotide comprising or consisting of a lacZ$^{FS}$ allele [encoding a β-galactosidase$^{FS}$ of the invention. In an embodiment, the polynucleotide is a lacZ$^{FS}$ allele [encoding a β-galactosidase$^{FS}$] of the invention. In an embodiment, the polynucleotide of the invention encodes a β-galactosidase$^{FS}$ as defined herein. In an embodiment, the size of the polynucleotide of the invention is at least 3063 nucleotides, at least 3066 nucleotides, at least 3069 nucleotides, at least 3072 nucleotides, at least 3075 nucleotides, at least 3078 nucleotides or at least 3081 nucleotides. In an embodiment, the size of the polynucleotide of the invention is less than 5 kb or less than 4 kb. In an embodiment, the size of the polynucleotide ranges from a minimal size selected from the group consisting of at least 3063 nucleotides, at least 3066 nucleotides, at least 3069 nucleotides, at least 3072 nucleotides, at least 3075 nucleotides, at least 3078 nucleotides or at least 3081 nucleotides to a maximal size selected from the group consisting of 4 kb and 5 kb. In an embodiment, the size of the polynucleotide is 3078 or 3081 nucleotides.

In an embodiment, the polynucleotide of the invention consists of a lacZ$^{FS}$ allele as defined herein, independently flanked on one side (in 5' and in 3') or on both sides of a nucleotide region ranging from 500 bp to 1 kb.

In an aspect, the present invention provides a polynucleotide comprising or consisting of a part of at least 100 nucleotides of the polynucleotide encoding a β-galactosidase$^{FS}$ as defined herein, wherein said nucleotide part encompasses the codon corresponding to the residue 354 of said β-galactosidase$^{FS}$. The expression "codon corresponding to the residue 354 of said β-galactosidase$^{FS}$" means the codon 354 of the lacZ$^{FS}$ allele as defined herein, wherein said codon corresponds to the residue 354 of the β-galactosidase$^{FS}$, wherein the amino acid sequence set forth in SEQ ID NO:2 is used for numbering. The position of the codon 354 of the lacZ$^{FS}$ allele and the position of the residue 354 of the β-galactosidase$^{FS}$ can easily be determined by the person skilled in the art, by aligning the part of at least 100 nucleotides or the β-galactosidase peptide coded by this part of at least 100 nucleotides with SEQ ID NO:1 or SEQ ID NO:2 respectively. In an embodiment, the polynucleotide comprises a part of the polynucleotide consisting of a lacZ$^{FS}$ allele, wherein said nucleotide part encompasses the codon corresponding to the residue 354 of the encoded β-galactosidase$^{FS}$.

In an embodiment, the nucleotide part comprises or consists of at least 100 consecutive nucleotides of the polynucleotide comprising or consisting of a lacZ$^{FS}$ allele as defined herein. In an embodiment, the nucleotide part comprises or consists of at least 200 consecutive nucleotides of the polynucleotide comprising or consisting of a lacZ$^{FS}$ allele. In an embodiment, the nucleotide part comprises or consists of at least 300 consecutive nucleotides of the polynucleotide comprising or consisting of a lacZ$^{FS}$ allele. In an embodiment, the nucleotide part comprises or consists of at least 400 consecutive nucleotides of the polynucleotide comprising or consisting of a lacZ$^{FS}$ allele. In an embodiment, the nucleotide part comprises or consists of at least 500 consecutive nucleotides of the polynucleotide comprising or consisting of a lacZ$^{FS}$ allele. In an embodiment, the nucleotide part comprises or consists of at least 1000 consecutive nucleotides of the polynucleotide comprising or consisting of a lacZ$^{FS}$ allele. In an embodiment, the nucleotide part comprises or consists of at least 1500 consecutive nucleotides of the polynucleotide comprising or consisting of a lacZ$^{FS}$ allele. In an embodiment, the nucleotide part comprises or consists of at least 2000 consecutive nucleotides of the polynucleotide comprising or consisting of a lacZ$^{FS}$ allele.

In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, wherein the residue corresponding to residue 354 is not an arginine. In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$, wherein the residue corresponding to residue 354 is not an amino acid residue selected from the group consisting of arginine, histidine, glutamine and lysine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, wherein the residue corresponding to residue 354 is not an amino acid residue selected from the group consisting of arginine, histidine, glutamine, lysine, glutamic acid and asparagine. In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$, wherein the residue corresponding to the residue 354 is a cysteine or an equivalent amino acid thereof. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, wherein the residue corresponding to the residue 354 is a cysteine, alanine and serine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, wherein the residue corresponding to the residue 354 is a cysteine.

In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the sequence of which is at least 95% identical to, but different from, SEQ ID NO:2. In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$, the sequence of which is at least 95% identical to, but different from, SEQ ID NO:2 and wherein the residue corresponding to residue 354 is not an arginine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the sequence of which is at least 95% identical to, but different from, SEQ ID NO:2 and wherein the residue corresponding to residue 354 is not an amino acid residue selected from the group consisting of arginine, histidine, glutamine and lysine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the sequence of which is at least 95% identical to, but different from, SEQ ID NO:2 and wherein the residue corresponding to residue 354 is not an amino acid residue selected from the group consisting of arginine, histidine, glutamine, lysine, glutamic acid and asparagine. In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$, the sequence of which is at least 95% identical to, but different from, SEQ ID NO:2 and wherein the residue corresponding to the residue 354 is a cysteine or an equivalent amino acid thereof. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the sequence of which is at least 95% identical to, but different from, SEQ ID NO:2 and wherein the residue corresponding to the residue 354 is a cysteine, alanine and serine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the sequence of which is at least 95% identical to, but different from, SEQ ID NO:2 and wherein the residue corresponding to the residue 354 is a cysteine.

In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the amino acid sequence of which is a) an amino acid sequence which is otherwise as defined in SEQ ID NO:2, but which does not comprise an arginine at position 354 (SEQ ID NO:5, wherein position 354 is not an arginine); or b) an amino acid sequence which is otherwise the one of a β-galactosidase variant having at least 95% identity with SEQ ID NO:2 (β-galactosidase variant as defined herein), but which does not comprise an arginine at position 354; in an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$ as defined in SEQ ID Nos 7, 10, 13, 16, 19, 22, 25 or 28, wherein position 354 is not an arginine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the amino acid sequence of which is a) an amino acid sequence which is otherwise as defined in SEQ ID NO:2, but which does not comprise an amino acid residue selected from the group consisting of arginine, histidine, glutamine and lysine at position 354 (SEQ ID NO:5, wherein position 354 is not an amino acid residue selected from the group consisting of arginine, histidine, glutamine and lysine); or b) an amino acid sequence which is otherwise the one of a β-galactosidase variant having at least 95% identity with SEQ ID NO:2 (β-galactosidase variant as defined herein), but which does not comprise an amino acid residue selected from the group consisting of arginine, histidine, glutamine and lysine at position 354; in an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$ as defined in SEQ ID Nos 7, 10, 13, 16, 19, 22, 25 or 28, wherein position 354 is not an amino acid residue selected from the group consisting of arginine, histidine, glutamine and lysine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the amino acid sequence of which is a) an amino acid sequence which is otherwise as defined in SEQ ID NO:2, but which does not comprise an amino acid residue selected from the group consisting of arginine, histidine, glutamine, lysine, glutamic acid and asparagine at position 354 (SEQ ID NO:5, wherein position 354 is not an amino acid residue selected from the group consisting of arginine, histidine, glutamine, lysine, glutamic acid and asparagine); or b) an amino acid sequence which is otherwise the one of a β-galactosidase variant having at least 95% identity with SEQ ID NO:2 (β-galactosidase variant as defined herein), but which does not comprise an amino acid residue selected from the group consisting of arginine, histidine, glutamine, lysine, glutamic acid and asparagine at position 354; in an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$ as defined in SEQ ID Nos 7, 10, 13, 16, 19, 22, 25 or 28, wherein position 354 is not an amino acid residue selected from the group consisting of arginine, histidine, glutamine, lysine, glutamic acid and asparagine. In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$, the amino acid sequence of which is a) an amino acid sequence which is otherwise as defined in SEQ ID NO:2, but which comprises a cysteine or an equivalent amino acid thereof at position 354 (SEQ ID NO:5, wherein position 354 is a cysteine or an equivalent amino acid thereof); or b) an amino acid sequence which is otherwise the one of a β-galactosidase variant having at least 95% identity with SEQ ID NO:2 (β-galactosidase variant as defined herein), but which comprises a cysteine or an equivalent amino acid thereof at position 354; in an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$ as defined in SEQ ID Nos 7, 10, 13, 16, 19, 22, 25 or 28, wherein position 354 is a cysteine or an equivalent amino acid thereof. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the amino acid sequence of which is a) an amino acid sequence which is otherwise as defined in SEQ ID NO:2, but which comprises an amino acid residue selected from the group consisting of cysteine, alanine and serine at position 354 (SEQ ID NO:5, wherein position 354 is selected from the group consisting of cysteine, alanine and serine); or b) an amino acid sequence which is otherwise the one of a β-galactosidase variant having at least 95% identity with SEQ ID NO:2 (β-galactosidase variant as defined herein), but which comprises an amino acid residue selected from the group consisting of cysteine, alanine and serine at position 354; in an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$ as defined in SEQ ID Nos 7, 10, 13, 16, 19, 22, 25 or 28, wherein position 354 is an amino acid residue selected from the group consisting of cysteine, alanine and serine. In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$, the amino acid sequence of which is a) an amino acid sequence which is otherwise as defined in SEQ ID NO:2, but which comprises a cysteine at position 354 (SEQ ID NO:4); or b) an amino acid sequence which is otherwise the one of a β-galactosidase variant having at least 95% identity with SEQ ID NO:2 (β-galactosidase variant as defined herein), but which comprises a cysteine at position 354; in an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$ as defined in SEQ ID NOs: 8, 11, 14, 17, 20, 23, 26 and 29.

In an embodiment, the nucleotide part, encompassing the codon corresponding to the residue 354 of said β-galactosidase$^{FS}$, comprises or consists of a part of at least 100 nucleotides of the polynucleotide encoding a β-galactosidase$^{FS}$ which is obtained from β-galactosidase having a sequence as set forth in SEQ ID NO:2, by the substitution of the arginine by a cysteine at position 354 (R354C). In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$ which is obtained from a β-galactosidase variant having at least 95% identity with SEQ ID NO:2 (β-galactosidase variant as defined herein), by the substitution of the arginine by a cysteine at position 354 (R354C). In an embodiment, the nucleotide part, encompassing the codon corresponding to the residue 354 of said β-galactosidase$^{FS}$ comprises or consists of a part of at least 100 nucleotides of the polynucleotide encoding a β-galactosidase$^{FS}$ which is obtained from a β-galactosidase variant as set forth in SEQ ID NO: 6, 9, 12, 15, 18, 21, 24 or 27, by the substitution of the arginine by a cysteine at position 354 (R354C).

Typically, the polynucleotide encompassed by the scope of the present invention is prepared using recombinant DNA techniques (i.e. recombinant DNA), as described herein.

However, in an alternative embodiment of the invention, the polynucleotide could be synthesized, in whole or in part, using chemical methods well known in the art (see Caruthers M H et al., (1980) Nuc Acids Res Symp Ser 215-23 and Horn T et al., (1980) Nuc Acids Res Symp Ser 225-232).

A polynucleotide encoding a lacZ$^{FS}$ protein as defined herein may be identified and/or isolated and/or purified from any lactic acid bacterium. Various methods are well known within the art for the identification and/or isolation and/or purification of polynucleotides.

By way of example, PCR amplification techniques to prepare more copies of a polynucleotide may be used once a suitable polynucleotide has been identified and/or isolated and/or purified.

By way of further example, a genomic DNA library may be constructed using chromosomal DNA from the lactic acid bacteria producing the β-galactosidase$^{FS}$. Based on the sequence of the β-galactosidase$^{FS}$, oligonucleotide probes may be synthesised and used to identify protein-encoding clones from the genomic library prepared from the lactic acid bacteria.

Alternatively, the polynucleotide of the invention may be prepared synthetically by established standard methods, e.g. the phosphoroamidite method described by Beucage S. L. et al., 1981, Tetrahedron Letters 22:1859-1869, or the method described by Matthes et al., 1984, EMBO J., 3:801-805. In the phosphoroamidite method, oligonucleotides are synthesised, e.g. in an automatic DNA synthesiser, purified, annealed, ligated and cloned in appropriate vectors.

The polynucleotide may be prepared by polymerase chain reaction (PCR) using specific primers, for instance as described in U.S. Pat. No. 4,683,202 or in Saiki R K et al., 1988, Science, 239:487-491.

The polynucleotide and the nucleic acids encompassed by the present invention may be isolated or substantially purified. By "isolated" or "substantially purified" is intended that the polynucleotides are substantially or essentially free from components normally found in association with the polynucleotide in its natural state. Such components include other cellular material, culture media from recombinant production, and various chemicals used in chemically synthesising the nucleic acids.

An "isolated" polynucleotide or nucleic acid is typically free of nucleic acid sequences that flank the nucleic acid of interest in the genomic DNA of the organism from which the nucleic acid was derived (such as coding sequences present at the 5' or 3' ends). However, the molecule may include some additional bases or moieties that do not deleteriously affect the basic characteristics of the composition.

Vector

The invention is also directed to a vector comprising the polynucleotide of the invention. In an embodiment, this vector is a plasmid.

In an embodiment, the vector contains one or more selectable marker genes, such as a gene which confers antibiotic resistance e.g. ampicillin, kanamycin, chloramphenicol or tetracycline resistance. In an embodiment, the vector comprises a nucleotide sequence enabling the vector to replicate in the host cell in question. Examples of such sequences are the origins of replication of plasmids pUC19, pACYC177, pUBI 10, pE194, pAMBI and pIJ702.

A vector of the invention can be used to engineer a lactic acid bacterium of the invention.

Streptococcus thermophilus Strain Comprising a Polynucleotide of the Invention

The invention is directed to a Streptococcus thermophilus strain comprising a polynucleotide comprising or consisting of a lacZ$^{FS}$ allele [encoding β-galactosidase$^{FS}$] of the invention. In an embodiment, the Streptococcus thermophilus strain comprises a lacZ$^{FS}$ allele [encoding a β-galactosidase$^{FS}$] of the invention.

For the avoidance of doubt, the Streptococcus thermophilus species is to be understood as a Streptococcus salivarius subsp. thermophilus strain.

In an embodiment, the Streptococcus thermophilus strain of the invention is a galactose-negative Streptococcus thermophilus strain. By the expression "galactose-negative", it is meant a Streptococcus thermophilus strain which is not able to grow on galactose as a sole source of carbohydrate, in particular on a M17 medium supplemented with 2% galactose. In a particular embodiment, the "galactose-negative" phenotype is assayed by inoculating—into a M17 broth containing 2% galactose—an overnight culture of the S. thermophilus strain to be tested at 1% and incubating for 20 hours at 37° C., and wherein a pH of 6 or above at the end of incubation is indicative of a galactose-negative phenotype.

As described herein, "comprising a polynucleotide comprising or consisting of a lacZ$^{FS}$ allele" or "comprising a lacZ$^{FS}$ allele" means that the sole allele of the lacZ gene contained in the genome of the Streptococcus thermophilus strain is a lacZ$^{FS}$ allele. In an embodiment, the Streptococcus thermophilus strain of the invention comprises, as the sole allele of its lacZ gene, a polynucleotide comprising or consisting of a lacZ$^{FS}$ allele of the invention. It is not contemplated that the Streptococcus thermophilus strain of the invention comprises several alleles of the lacZ gene.

Such Streptococcus thermophilus strain may be engineered by:

a) replacing the allele of its lacZ gene by a polynucleotide comprising or consisting of a lacZ$^{FS}$ allele of the invention; or b) replacing a part of the allele of its lacZ gene by a corresponding polynucleotide comprising or consisting of a part of at least 100 nucleotides of the polynucleotide encoding a β-galactosidase$^{FS}$ as defined herein, wherein said nucleotide part encompasses the codon corresponding to the residue 354 of said β-galactosidase$^{FS}$. By "corresponding polynucleotide", it is meant the same portion of the lacZ allele encompassing the codon corresponding to the residue 354 of said β-galactosidase$^{FS}$.

The replacement can be done using conventional techniques as defined herein.

In an embodiment, the Streptococcus thermophilus of the invention (comprising a lacZ$^{FS}$ allele) is further characterized by its ability when tested by assay C, to lead to a slope of acidification between pH 6 and 5.3 of at least −0.005 UpH/min. In an embodiment, the slope of acidification between pH 6 and 5.3 is at least −0.006 UpH/min. In an embodiment, the slope of acidification between pH 6 and 5.3 is at least −0.007 UpH/min. In an embodiment, the slope of acidification between pH 6 and 5.3 is at least −0.008 UpH/min. In an embodiment, the slope of acidification between pH 6 and 5.3 is at least −0.009 UpH/min. In an embodiment, the slope of acidification between pH 6 and 5.3 is at least −0.01 UpH/min. In an embodiment, the slope of acidification between pH 6 and 5.3 is at least −0.02 UpH/min. In an embodiment, the slope of acidification between pH 6 and 5.3 is at least −0.03 UpH/min. In an embodiment, the slope of acidification between pH 6 and 5.3 is at least −0.04 UpH/min. In an embodiment, the slope of acidification between pH 6 and 5.3 is at least −0.05 UpH/min. In an embodiment, the slope of acidification between pH 6 and 5.3 is selected from the group of at least −0.005, −0.006, −0.007, −0.008, −0.009, −0.01, −0.02, −0.03, −0.04 and −0.05 UpH/min.

Assay C (Acidification Kinetics in Milk)

UHT semi-skimmed milk "Le Petit Vendéen ("yoghurt milk") containing 3% (w/v) milk powder (BBA, Lactalis), previously pasteurized 10 min at 90° C., is inoculated at 1% (v/v, about $10^7$ CFU/ml) with a culture of the S. thermophilus strain to be assayed (M17-carbohydrate-free resuspended cells from overnight culture grown in M17 supplemented with 3% sucrose). The inoculated milk flasks are statically incubated in a water bath at 43° C. (start of fermentation experiment) during 24 h, to obtain fermented milk. The acidifying properties of S. thermophilus strains were evaluated by recording the pH over time, during milk fermentation. The pH was monitored for 24 hours using the CINAC system (Alliance Instruments, France; pH electrode Mettler 405 DPAS SC, Toledo, Spain) as previously described. The pH was measured and recorded every 5 minutes. Using the CINAC v2.07 software, the following descriptors have been calculated:

the slope between pH 6.0 and pH 5.3 (UpH/minute) [Slope pH6-5.3];

the time corresponding to Vmax (with $V_{max}$ is the maximal velocity obtained during the fermentation experiment; $T_{Vmax}$), time (in minutes) calculated as from the start of fermentation experiment;

the $pH_{STOP}$ corresponding to the pH value at V0, with V0 corresponding to a velocity which definitively becomes non-detectable, i.e., below 0.1 mupH/minutes (0.0001 UpH/min); by "definitively becomes", it is meant that the velocity stays less than 0.1 mUpH/min for the remaining time of the assay C (i.e. up to 24 h at fermentation temperature); and the time corresponding to the $pH_{STOP}$ ($TpH_{STOP}$) [so, the time corresponding to V0, calculated as from the start of fermentation experiment].

In an embodiment, together with or independently from the slope of acidification determined by assay C, the *Streptococcus thermophilus* of the invention (comprising a lacZ$^{FS}$ allele) is further characterized by its texturizing properties. Thus, the *Streptococcus thermophilus* of the invention can be characterized by the shear stress value it generates when use to obtain a fermented milk, as determined by assay D (i.e., at a shear rate of 350 s$^{-1}$).

In an embodiment, the shear stress value generated in a fermented milk obtained with a *Streptococcus thermophilus* of the invention, as determined by assay D, is at least 60, at least 120, at least 180 or at least 240 Pa. In an embodiment, the shear stress value generated in a fermented milk obtained with a *Streptococcus thermophilus* of the invention, as determined by assay D, is less than 60, less than 120, less than 180 or less than 240 Pa. In an embodiment, the shear stress value generated in a fermented milk obtained with a *Streptococcus thermophilus* of the invention, as determined by assay D, is both at least 60 or at least 120 and less than 180 or less than 240 Pa.

In an embodiment, the shear stress value generated in a fermented milk obtained with a *Streptococcus thermophilus* of the invention, as determined by assay D, is within a range selected from the group consisting of 0 to 59 Pa, 60 to 119 Pa, 120 to 179 Pa, 180 to 239 Pa and 240 to 300 Pa.

As a reference, the shear stress value generated in a fermented milk obtained with strain DGCC715 (DSM33036) was determined by assay D and was shown to be within the range 0-59 Pa. As another reference, the shear stress value generated in a fermented milk obtained with strain DGCC7710 (deposited as DSM28255) was determined by assay D and was shown to be within the range 120-179 Pa, more specifically to be about 150±15 Pa. The *Streptococcus thermophilus* DGCC7710 strain has been deposited by Danisco Deutschland GmbH under the Budapest Treaty at the Leibniz-Institut DSMZ-Deutsche Sammlung von Mikroorganismen und Zellkulturen, GmbH (Inhoffenstr. 7B, D-38124 Braunschweig), on Jan. 14, 2014 and have received the accession number DSM28255. We hereby confirm that the depositor, Danisco Deutschland GmbH (of Busch-Johannsen-Strasse 1, D-25899 Niebüll, Germany) has authorised the Applicant (DuPont Nutrition Biosciences ApS) to refer to the deposited biological material in this application. The applicant requests that a sample of the deposited microorganism stated herein may only be made available to an expert, until the date on which the patent is granted.

Assay D

Strain inoculum preparation: 1.8 ml of a stock culture preserved at −80° C. is inoculated into 100 ml of a bulk starter medium in 250-ml flask and incubated for 18 h at 37° C. The bulk starter medium is obtained by adding into water 10% of high heat skimmed milk powder (BBA Lactalis), and agitating 30 minutes at room temperature; then, the medium is heat-treated 20 min at 120° C.

Milk preparation: 93% (w/w) of a commercial fresh milk [Candia, lait frais de montagne Grand Lait entier: 3.6% fat, 3.2% protein] and 7% (w/w) saccharose are mixed; the mixture is heat-treated at 90° C. for 10 min in water bath. Just before strain inoculation, 1 g/100 L (w/v) of sodium formiate is added.

Fermentation: the strain inoculum is added at 1% (v/v) into the milk and the inoculated milk is poured into 125 ml yogurt pot, and incubated at 43° C. until a pH of 4.6 is reached (pH is followed using a CINAC system; Alliance Instruments, France; pH electrode Mettler 405 DPAS SC, Toledo, Spain). Then, the fermented milk is slowly cooled in a well-ventilated cold incubator down to 6° C. The samples are stored for 7 days at 6° C.

Before shear stress determination, the samples are brought to 8° C. and stirred 5 times/5 s (1 turn=1 s) by using a spoon. A resting time of 5 min is applied (equilibration time) just before measurement. The shear stress of the sample is assessed using a rheometer (MCR Modular Compact Rheometer type 302, Anton Paar GmbH, Germany) equipped with the CC27 coaxial measuring system (Standard DIN 53019 and ISO 3219) and Peltier system C-PTD200-SN81154777. The viscometry test is done with a shear rate ramp varying from 0.1 s$^{-1}$ to 350 s$^{-1}$ in 31 points and from 350 s$^{-1}$ to 0.1 s$^{-1}$ in 31 points. The shear stress is continuously recorded. A logarithmic variable measuring point duration setting is used, with Up-curve initial value set at 10 s and final value set at 3 s, and Down-curve initial value set at 3 s and final value set at 10 s. The shear stress value at 350 s$^{-1}$ on the up-curve is selected to characterize the texturing properties of the *S. thermophilus* strain of the invention.

The inventors have shown that the *Streptococcus thermophilus* strains comprising a lacZ$^{FS}$ allele of the invention can be used not only to ferment milk with an acceptable industrial time but also to have a fermented milk which does not undergo post acidification at fermentation temperature. The inventors have nicely shown that these *Streptococcus thermophilus* strains (comprising a lacZ$^{FS}$ allele of the invention) can be defined by both the ratio LacS$_{pH4.5}$ over LacZ$_{pH4.5}$ as defined herein, and the ratio LacS$_{pH6}$ over LacZ$_{pH6}$ as defined herein in this strain. Indeed, the ratio LacS$_{pH6}$ over LacZ$_{pH6}$ represents the ability of the strain of the invention to utilize lactose and thus to acidify milk (lactic acid production) at the beginning of the manufacturing process down to the target pH, whereas the ratio LacS$_{pH4.5}$ over LacZ$_{pH4.5}$ represents the ability of this same strain to utilize lactose less efficiently and thus not to produce lactic acid when the target pH is reached. Thus, the inventors have shown that the formula (I) described herein can be used to characterize strains presenting an acidification kinetics in milk without post-acidification. In an embodiment, the *Streptococcus thermophilus* of the invention (comprising a lacZ$^{FS}$ allele) is further characterized by a difference of efficiency of hydrolysis of the imported lactose (EH$_{pH6}$−EH$_{pH4.5}$) which is less than −0.5 calculated by the following formula (I):

$$\Delta EH = \ln\left[\frac{LacS_{pH6}}{LacZ_{pH6}}\right] - \ln\left[\frac{LacS_{pH4.5}}{LacZ_{pH4.5}}\right] \tag{I}$$

in which formula (I), LacS$_{pH6}$ and LacS$_{pH4.5}$ represent the activity of lactose importation of the LacS permease calculated by assay A at pH 6 and at pH 4.5 respectively, and LacZ$_{pH6}$ and LacZ$_{pH4.5}$ represent the activity of lactose hydrolysis of the beta-galactosidase calculated by assay B at pH 6 and at pH 4.5 respectively.

Thus, a ΔEH as defined herein which is less than −0.5 means that the efficiency of hydrolysis of imported lactose at pH 4.5 (EH$_{pH4.5}$) [(i.e., importation of lactose into the bacteria by the LacS permease followed by the hydrolysis of the lactose by the beta-galactosidase)] is largely reduced as compared to the one at pH 6 (EH$_{pH6}$). In an embodiment, the *Streptococcus thermophilus* of the invention (comprising a lacZ$^{FS}$ allele) is characterized by a ΔEH [as calculated by formula (I)] which is selected in the group consisting of less than −0.6, less than −0.7, less than −0.8, less than −0.9, less than −1, less than −1.1, less than −1.2, less than −1.3, less than −1.4 and less than −1.5.

In contrast, a ΔEH which is slightly positive, around 0 or slightly negative means that the efficiency of hydrolysis of imported lactose is as efficient in pH 4.5 as in pH 6. Such a ΔEH is characteristic of *Streptococcus thermophilus* strains which when used to ferment milk lead to a fermented milk undergoing post acidification.

It is also part of the invention that the *Streptococcus thermophilus* strain defined herein (comprising a lacZ$^{FS}$ allele according to the invention) is further characterized by its ability to ferment milk with an acceptable industrial time followed by a fermented milk which does not undergo post acidification at fermentation temperature. This ability is defined herein as a "full STOP" phenotype and can be determined by the assay C as defined herein.

Thus, the full STOP phenotype is characterized by the fact that when the strain of the invention is inoculated to milk substrate and fermented according to assay C, the milk is fermented such that the pH of the fermented milk stops between 4 and 4.8 (pH$_{STOP}$), and the time between T$_{Vmax}$ and TpH$_{STOP}$ is less than 600 minutes. In an embodiment, the time between T$_{Vmax}$ and TpH$_{STOP}$ is less than 550 minutes. In an embodiment, the time between T$_{Vmax}$ and TpH$_{STOP}$ is less than 500 minutes.

In an embodiment, individually or in combination with the time between the Vmax and V0, the pH$_{STOP}$ obtained using a strain of the invention by assay C is comprised between 4 and 4.6. In an embodiment, the pH$_{STOP}$ obtained using a strain of the invention by assay C is comprised between 4 and 4.5. In an embodiment, the pH$_{STOP}$ obtained using a strain of the invention by assay C is comprised between 4 and 4.4.

In an embodiment, the full STOP phenotype is characterized by the fact that when the strain of the invention is inoculated to milk substrate and fermented according to assay C, the milk is fermented such that the pH of the fermented milk stops between a range selected from the group consisting of between 4 and 4.8, between 4 and 4.6, between 4 and 4.5 and between 4 and 4.4, and the time between T$_{Vmax}$ and TpH$_{STOP}$ is selected from the group consisting of less than 600 minutes, less than 550 minutes and less than 500 minutes.

Thus, once the pH is stopped significantly quickly, the fermented dairy product can be kept at fermentation temperature for at least 24 hours, without the pH of the fermented product decreases (what gives high flexibility within the manufacturing process).

In a particular embodiment, the *Streptococcus thermophilus* strain of the invention as defined herein bears, as its lacZ gene, a lacZ$^{FS}$ allele encoding a β-galactosidase$^{FS}$ as defined in SEQ ID NO:4, in particular a lacZ$^{FS}$ allele as defined in SEQ ID NO:3.

In a particular embodiment, the *Streptococcus thermophilus* strain of the invention as defined herein bears, as its lacZ gene, a lacZ$^{FS}$ allele encoding a β-galactosidase$^{FS}$ having at least 95% identity with SEQ ID NO:2, but which comprises a cysteine at position 354.

In a particular embodiment, the *Streptococcus thermophilus* strain of the invention as defined herein bears, as its lacZ gene, a lacZ$^{FS}$ allele encoding a β-galactosidase$^{FS}$, the amino acid sequence of which is otherwise the one of a β-galactosidase variant having at least 95% identity with SEQ ID NO:2 (β-galactosidase variant as defined herein), but which comprises a cysteine at position 354. In a particular embodiment, the *Streptococcus thermophilus* strain of the invention bears, as its lacZ gene, a lacZ$^{FS}$ allele encoding a β-galactosidase$^{FS}$ as defined in SEQ ID NOs: 8, 11, 14, 17, 20, 23, 26 or 29.

In a particular embodiment, the invention is directed to a *Streptococcus thermophilus* strain corresponding to the *Streptococcus thermophilus* strain DGCC7984, the lacZ gene of which has been replaced by a lacZ$^{FS}$ allele encoding a β-galactosidase$^{FS}$ as defined in SEQ ID NO:4, in particular by a lacZ$^{FS}$ allele as defined in SEQ ID NO:3. The *Streptococcus thermophilus* DGCC7984 strain has been deposited by Danisco Deutschland GmbH under the Budapest Treaty at the Leibniz-Institut DSMZ-Deutsche Sammlung von Mikroorganismen und Zellkulturen, GmbH (Inhoffenstr. 7B, D-38124 Braunschweig), on Jan. 14, 2014 and have received the accession number DSM28257. We hereby confirm that the depositor, Danisco Deutschland GmbH (of Busch-Johannsen-Strasse 1, D-25899 Niebüll, Germany) has authorised the Applicant (DuPont Nutrition Biosciences ApS) to refer to the deposited biological material in this application. The applicant requests that a sample of the deposited microorganism stated herein may only be made available to an expert, until the date on which the patent is granted. The expressions "DGCC7984 strain" is used interchangeably with the expression "DSM28257 strain"

Use and Methods Based on the Polynucleotide or Vector of the Invention

In an embodiment, the invention is directed to the use of a polynucleotide or vector of the invention to obtain a *Streptococcus thermophilus* strain with a full STOP phenotype when used to ferment milk by assay C.

Thus, the polynucleotide or vector is used such that the resulting *Streptococcus thermophilus* strain comprises a lacZ$^{FS}$ allele as the sole lacZ gene in its genome. In an embodiment, the polynucleotide or vector is used such that the allele of the lacZ gene or part thereof of the *Streptococcus thermophilus* strain is replaced by the polynucleotide of the invention; the replacement can be done using conventional techniques as defined herein.

In an aspect, the invention is directed to a method to prepare a *Streptococcus thermophilus* strain with a full STOP phenotype, comprising:

a) providing a *Streptococcus thermophilus* strain having a ratio of the activity of lactose importation of the LacS permease calculated by assay A at pH 4.5 over the activity of lactose hydrolysis of the beta-galactosidase calculated by assay B at pH 4.5 (LacS$_{pH4.5}$ over LacZ$_{pH4.5}$) which is less than 5;

b) replacing the lacZ gene of said *Streptococcus thermophilus* strain with a polynucleotide (comprising or consisting of a lacZ$^{FS}$ allele) of the invention; and c) recovering the *Streptococcus thermophilus* strain(s) with a full STOP phenotype when used to ferment milk by assay C.

In an embodiment, step b) consists in replacing the lacZ gene of said *Streptococcus thermophilus* strain with a polynucleotide consisting of a lacZ$^{FS}$ allele of the invention.

In an aspect, the invention is directed to a method to prepare a *Streptococcus thermophilus* strain with a full STOP phenotype, comprising:

a) providing a *Streptococcus thermophilus* strain having a ratio of the activity of lactose importation of the LacS permease calculated by assay A at pH 4.5 over the activity of lactose hydrolysis of the beta-galactosidase calculated by assay B at pH 4.5 (LacS$_{pH4.5}$ over LacZ$_{pH4.5}$) which is less than 5;

b) replacing a part of the lacZ gene of said *Streptococcus thermophilus* strain by a corresponding polynucleotide comprising or consisting of a part of at least 100 nucleotides of the polynucleotide encoding a β-galactosidase$^{FS}$ as defined herein, wherein said nucleotide part encompasses the codon corresponding to the residue 354 of said β-galactosidase$^{FS}$. By "corresponding polynucleotide", it is meant the same portion of the lacZ allele encompassing the codon corresponding to the residue 354 of said β-galactosidase$^{FS}$; and c) recovering the *Streptococcus thermophilus* strain(s) with a full STOP phenotype when used to ferment milk by assay C.

In an aspect, the invention is directed to a method to prepare a *Streptococcus thermophilus* strain with a full STOP phenotype, comprising:
   a) providing a *Streptococcus thermophilus* strain having a ratio of the activity of lactose importation of the LacS permease calculated by assay A at pH 4.5 over the activity of lactose hydrolysis of the beta-galactosidase calculated by assay B at pH 4.5 (LacS$_{pH4.5}$ over LacZ$_{pH4.5}$) which is less than 5;
   b) modifying the lacZ gene of said *Streptococcus thermophilus* strain to have the same sequence as a lacZ$^{FS}$ allele of the invention; and
   c) recovering the lactic *Streptococcus thermophilus* strain(s) with a full STOP phenotype when used to ferment milk by assay C.

In an embodiment, any of the methods described herein to prepare a *Streptococcus thermophilus* strain with a full STOP phenotype is implemented on a medium containing lactose as the sole source of carbohydrate.

Within the use or methods of the invention, the ratio LacS$_{pH4.5}$ over LacZ$_{pH4.5}$ is determined as described herein. In an embodiment, the *Streptococcus thermophilus* strain of step a) has a ratio LacS$_{pH4.5}$ over LacZ$_{pH4.5}$ which is less than 5. In an embodiment, the *Streptococcus thermophilus* strain of step a) has a ratio LacS$_{pH4.5}$ over LacZ$_{pH4.5}$ which is less than 4. In an embodiment, the *Streptococcus thermophilus* strain of step a) has a ratio LacS$_{pH4.5}$ over LacZ$_{pH4.5}$ which is less than 3.

In an embodiment, the *Streptococcus thermophilus* strain of step a) is further characterized by its ability when tested by assay C, to lead to a slope of acidification between pH 6 and 5.3 of at least −0.005 UpH/min. In an embodiment, the slope of acidification between pH 6 and 5.3 is at least −0.006 UpH/min. In an embodiment, the slope of acidification between pH 6 and 5.3 is at least −0.007 UpH/min. In an embodiment, the slope of acidification between pH 6 and 5.3 is at least −0.008 UpH/min. In an embodiment, the slope of acidification between pH 6 and 5.3 is at least −0.009 UpH/min. In an embodiment, the slope of acidification between pH 6 and 5.3 is at least −0.01 UpH/min. In an embodiment, the slope of acidification between pH 6 and 5.3 is at least −0.02 UpH/min. In an embodiment, the slope of acidification between pH 6 and 5.3 is at least −0.03 UpH/min. In an embodiment, the slope of acidification between pH 6 and 5.3 is at least −0.04 UpH/min. In an embodiment, the slope of acidification between pH 6 and 5.3 is at least −0.05 UpH/min. In an embodiment, the *Streptococcus thermophilus* strain of step a) is further characterized by its ability when tested by assay C, to lead to slope of acidification between pH 6 and pH 4.5 which is selected from the group of at least −0.005, −0.006, −0.007, −0.008, −0.009, −0.01, −0.02, −0.03, −0.04 and −0.05 UpH/min.

In a further aspect, the invention is directed to a *Streptococcus thermophilus* strain obtained by the use or the method of the invention.

In a yet further aspect, the invention provides a *Streptococcus thermophilus* strain according to the invention produced by the method of the invention.

Bacterial Composition

The invention is also directed to a bacterial composition comprising or consisting of at least one, preferably one, *Streptococcus thermophilus* strain of the invention. In one embodiment, the bacterial composition is a pure culture, i.e., comprises or consists of a single *Streptococcus thermophilus* strain of the invention. In another embodiment, the bacterial composition is a mixed culture, i.e. comprises or consists of the *Streptococcus thermophilus* strain(s) of the invention and at least one other microorganism, in particular at least one other bacterial strain. In one embodiment, the bacterial composition is a pure culture, i.e., comprises or consists of a single *Streptococcus thermophilus* strain of the invention. In another embodiment, the bacterial composition is a mixed culture, i.e. comprises or consists of the *Streptococcus thermophilus* strain(s) of the invention and at least one other bacterial strain. By "at least" one other bacteria strain, it is meant 1 or more, and in particular 1, 2, 3, 4 or 5 strains.

In an embodiment of any bacterial composition defined herein, either as a pure or mixed culture, the bacterial composition further comprises a food acceptable component, such as sugars (saccharose, trehalose), maltodextrin or minerals. In a particular embodiment, the bacterial composition defined herein does not comprise lactose.

In one embodiment, a bacterial composition of the invention comprises or consists of the *Streptococcus thermophilus* strain(s) of the invention, and one or more further lactic acid bacterium of the species selected from the group consisting of a *Lactococcus* species, a *Streptococcus* species, a *Lactobacillus* species including *Lactobacillus acidophilus*, an *Enterococcus* species, a *Pediococcus* species, a *Leuconostoc* species, a *Bifidobacterium* species and an *Oenococcus* species or any combination thereof. *Lactococcus* species include *Lactococcus lactis*, including *Lactococcus lactis* subsp. *lactis*, *Lactococcus lactis* subsp. *cremoris* and *Lactococcus lactis* subsp. *lactis* biovar diacetylactis. *Bifidobacterium* species includes *Bifidobacterium animalis*, in particular *Bifidobacterium animalis* subsp *lactis*. Other lactic acid bacteria species include *Leuconostoc* sp., *Streptococcus thermophilus*, *Lactobacillus delbrueckii* subsp. *bulgaricus*, and *Lactobacillus helveticus*.

In one embodiment, the bacterial composition comprises or consists of *Streptococcus thermophilus* strain(s) of the invention, and at least one *Streptococcus thermophilus* strain, different from the *Streptococcus thermophilus* strain(s) of the invention and/or at least one strain of the *Lactobacillus* species, and/or any combination thereof. In a particular embodiment, the bacterial composition comprises or consists of the *Streptococcus thermophilus* strain(s) of the invention, one or several strain(s) of the species *Lactobacillus delbrueckii* subsp. *bulgaricus* and/or one or several strain(s) of the species *Lactobacillus helveticus* and/or any combination thereof, and optionally at least one *Streptococcus thermophilus* strain, different from the *Streptococcus thermophilus* strain(s) of the invention. In a particular embodiment, the bacterial composition comprises or consists of the *Streptococcus thermophilus* strain(s) of the invention, at least one strain of species *Streptococcus thermophilus*, different from the *Streptococcus thermophilus* strain(s) of the invention, and a strain of the species *Lactobacillus delbrueckii* subsp. *bulgaricus*. In another particular embodiment, the bacterial composition comprises or consists of the *Streptococcus thermophilus* strain(s) of the invention, and a strain of the species *Lactobacillus delbrueckii* subsp. *bulgaricus*.

In one embodiment, the bacterial composition comprises or consists of the *Streptococcus thermophilus* strain(s) of the invention, a *Lactococcus lactis* subsp. *lactis* and/or a *Lactococcus lactis* subsp. *cremoris*.

In a particular embodiment of any bacterial composition defined herein, either as a pure or mixed culture, the bacterial composition further comprises at least one probiotic strain such as *Bifidobacterium animalis* subsp. *lactis, Lactobacillus acidophilus, Lactobacillus paracasei*, or *Lactobacillus casei*.

In a particular embodiment, the bacterial composition, either as a pure or mixed culture as defined above is in frozen, dried, freeze-dried, liquid or solid format, in the form of pellets or frozen pellets, or in a powder or dried powder. In a particular embodiment, the bacterial composition of the invention is in a frozen format or in the form of pellets or frozen pellets, in particular contained into one or more boxes or sachets. In another embodiment, the bacterial composition as defined herein is in a powder form, such as a dried or freeze-dried powder, in particular contained into one or more boxes or sachets.

In a particular embodiment, the bacterial composition of the invention, either as a pure culture or mixed culture as defined above, and whatever the format (frozen, dried, freeze-dried, liquid or solid format, in the form of pellets or frozen pellets, or in a powder or dried powder) comprises the *Streptococcus thermophilus* strain(s) of the invention in a concentration comprised in the range of 105 to $10^{12}$ cfu (colony forming units) per gram (cfu/g) of the bacterial composition. In a particular embodiment, the concentration of the *Streptococcus thermophilus* strain(s) within the bacterial composition of the invention is in the range of $10^7$ to $10^{12}$ cfu per gram of the bacterial composition, and in particular at least $10^7$, at least $10^8$, at least 109, at least $10^{10}$ or at least $10^{11}$ cfu/g of the bacterial composition. In a particular embodiment, when in the form of frozen or dried concentrate, the concentration of the *Streptococcus thermophilus* strain(s) of the invention—as pure culture or as a mixed culture—within the bacterial composition is in the range of $10^8$ to $10^{12}$ cfu/g of frozen concentrate or dried concentrate, and more preferably at least $10^8$, at least 109, at least $10^{10}$, at least $10^{11}$ or at least $10^{12}$ cfu/g of frozen concentrate or dried concentrate.

Manufacture of Product Using the *Streptococcus thermophilus* Strain of the Invention In a further aspect, there is provided a method for manufacturing a fermented product comprising a) inoculating a substrate with the *Streptococcus thermophilus* strain or bacterial composition according to the invention and b) fermenting the inoculated substrate to obtain a fermented product. In a particular embodiment, the *Streptococcus thermophilus* strain(s) of the invention is inoculated as a bacterial composition as defined herein, such as a pure culture or a mixed culture. Preferably, the substrate is a milk substrate, more preferably milk. By "milk substrate", it is meant milk of animal and/or plant origin. In a particular embodiment, the milk substrate is of animal origin, in particular of any mammals, such as cow, goat, sheep, buffalo, zebra, horse, donkey, or camel, and the like. The milk may be in the native state, a reconstituted milk, a skimmed milk, or a milk supplemented with compounds necessary for the growth of the bacteria or for the subsequent processing of fermented milk. Preferably, the milk substrate comprises solid items. Preferably, the solid items comprise or consist of fruits, chocolate products, or cereals. Preferably, the fermented product is a fermented dairy product.

The present invention also provides in a further aspect the use of the *Streptococcus thermophilus* strain or bacterial composition according to the present invention to manufacture a food or feed product, preferably a fermented dairy product.

The invention is also directed to a fermented dairy product, which is obtained using the lactic acid bacteria strain(s) or bacterial composition of the invention, in particular obtained or obtainable by the method of the invention. Thus, the invention is directed to a fermented dairy product comprising the *Streptococcus thermophilus* strain(s) of the invention. In a particular embodiment, the fermented dairy food product of the invention is fresh fermented milk.

The *Streptococcus thermophilus* strain or bacterial composition according to the invention finds an advantageous use in various dairy applications (as particular embodiments of a method for manufacturing a fermented product described herein).

In an aspect, the *Streptococcus thermophilus* strain or bacterial composition according to the invention finds use in the manufacture of stirred yoghurt. The manufacture of stirred yogurt comprises fermenting a milk substrate previously inoculated with the *Streptococcus thermophilus* strain or bacterial composition according to the invention, optionally storing the stirred yoghurt in a storage tank, and finally packing the stirred yoghurt into packages. This process involves cooling the stirred yoghurt between the end of the fermentation (i.e., once the target pH has been reached) and the packing step in order to stop further acidification of the stirred yoghurt, such that the stirred yoghurt is packed at a temperature between 15 and 22° C. Because this cooling step is time- and resource- (energy) consuming, yoghurt manufacturers look for packing the stirred yoghurt at a higher temperature; packing at a higher temperature also has the advantage of improving the texture of the stirred yoghurt in the packages (see example 8); however, packing at a higher temperature is not acceptable for yoghurt manufacturers with the bacterial compositions currently on the market, since the stirred yoghurt has been shown to be too acidic. The *Streptococcus thermophilus* strain or bacterial composition according to the invention solves this issue, enabling the yoghurt manufacturers to pack the stirred yoghurt at a higher temperature while obtaining a product with an acceptable pH. This can be achieved by either cooling the stirred yoghurt at a temperature higher than 22° C. or by bypassing the cooling step. Thus, the invention is also directed to the use of the *Streptococcus thermophilus* strain or bacterial composition according to the invention in the manufacture of stirred yoghurt. In a particular embodiment, the invention is also directed to the use of the *Streptococcus thermophilus* strain or bacterial composition according to the invention in the manufacture of stirred yoghurt, wherein the packing step of the stirred yoghurt is carried out at a temperature which is at least 23° C. The invention is also directed to a process to manufacture stirred yoghurt comprising (a) fermenting a milk substrate, in particular milk, inoculated with the *Streptococcus thermophilus* strain or bacterial composition according to the invention, to obtain a stirred yoghurt (with a pH from 4.2 to 4.7, more preferably from 4.45 to 4.6), (b) cooling the stirred yoghurt and (c) packing the stirred yoghurt, wherein the temperature of cooling and packing is at least 23° C. (the temperature of cooling and packing being one temperature). By "at least 23° C." in the context of the temperature of cooling and packing, it is meant at least 24° C., at least 25°

C., at least 26° C., at least 27° C., at least 28° C., at least 29° C., at least 30° C., at least 31° C., at least 32° C., at least 33° C., at least 34° C., at least 35° C., at least 36° C., at least 37° C., at least 38° C., at least 39° C. and at least 40° C. In a particular embodiment, the temperature of cooling and packing is equals to or less than the fermentation temperature (i.e., typically less than 43° C.). In a particular embodiment, the cooling and packing temperature is at least 23° C. and equals to or less than 43° C. As shown in example 8, packing at a temperature of 35° C. gives a pH over time similar to the one of a stirred yoghurt packed at 20° C., while at the same time improving the texture of the stirred yoghurt. The invention is also directed to a process to manufacture stirred yoghurt comprising (a) fermenting a milk substrate, in particular milk, with the *Streptococcus thermophilus* strain or bacterial composition according to the invention, to obtain a stirred yoghurt (with a pH from 4.2 to 4.7, more preferably from 4.45 to 4.6), and (b) packing this stirred yoghurt, wherein the process does not comprise any cooling step between end of fermentation and packing. In this embodiment, the temperature of cooling and packing is equal to the fermentation temperature (i.e., typically 42-43° C.). In an embodiment, the process to manufacture stirred yoghurt as described herein further comprises transferring the packages into a storage cold room (i.e., less than 8° C.).

In another aspect, the *Streptococcus thermophilus* strain or bacterial composition according to the invention finds use in the manufacture of set yoghurt. The manufacture of set yogurt involves cooling the packages containing the set yoghurt once the desired pH is obtained (with a pH from 4.2 to 4.7, more preferably from 4.45 to 4.6; considered as the end of the fermentation), to stop further acidification of the product. This cooling step is carried out in a cooling room (also called cooling chamber or cooling tunnel), before transfer of the packages into a storage cold room (i.e., less than 8° C.). With conventional starter cultures, it is important to stop further growth quickly after fermentation, which means that a temperature of about 35° C. should be reached within 30 minutes after end of fermentation, and 18-20° C. after another 30-40 minutes. Typically, the total cooling time is about 65-70 minutes for small packages and about 80-90 minutes for large packages. Because this cooling step is time- and resource- (energy) consuming, yoghurt manufacturers look for reducing the time spent in the cooling room; however, reducing this time is not acceptable for yoghurt manufacturers with the bacterial compositions currently on the market, since the yoghurt products have been shown to be too acidic. The *Streptococcus thermophilus* strain or bacterial composition according to the invention solves this issue, by enabling the yoghurt manufacturers to play with the period of time to reach a temperature of 18-20° C., while obtaining a product with an acceptable pH. In a particular embodiment, the invention is directed to the use of the *Streptococcus thermophilus* strain or bacterial composition according to the invention in the manufacture of set yoghurt, wherein the time needed for a set yoghurt contained in a package to reach a temperature of 18-20° C. (starting from the end of the fermentation) is increased as compared to a time of 65-70 minutes for small packages (herein defined as a size from 0.1 to 0.2 kg) and a time of 80-90 minutes for large packages (herein defined as a size from 0.4 to 0.6 kg). In a particular embodiment, the time needed for a set yoghurt contained in a package to reach a temperature of 18-20° C. is at least 100 minutes, at least 120 minutes, at least 180 minutes or at least 240 minutes. This can be achieved by several ways giving high flexibility to the dairy manufacturers, e.g., by bypassing the cooling step (i.e., bypassing the step in the cooling room) or by delaying the time between the end of fermentation and the time of entry into the cooling room. The invention is directed to a process to manufacture set yoghurt comprising a) packing a milk substrate, in particular milk, inoculated with the *Streptococcus thermophilus* strain or bacterial composition according to the invention into packages, (b) fermenting the inoculated milk substrate (contained in the packages) to obtain a set yoghurt (with a pH from 4.2 to 4.7, more preferably from 4.45 to 4.6), and c) handling the packages such that the time needed for the set yoghurt in the packages to reach a temperature of 18-20° C. is at least 100 minutes, at least 120 minutes, at least 180 minutes or at least 240 minutes. In a particular embodiment, the process to manufacture set yoghurt as described herein further comprises d) transferring the packages into a storage cold room (i.e., less than 8° C.). In an embodiment, the invention is directed to a process to manufacture set yoghurt comprising a) packing a milk substrate, in particular milk, inoculated with the *Streptococcus thermophilus* strain or bacterial composition according to the invention into packages, and b) fermenting the inoculated milk substrate to obtain a set yoghurt (with a pH from 4.2 to 4.7, more preferably from 4.45 to 4.6), wherein said process does not comprise a cooling step in a cooling room. In a particular embodiment, the process to manufacture set yoghurt as described herein further comprises c) transferring the packages into a storage cold room (i.e., less than 8° C.). In an embodiment, the invention is directed to a process to manufacture set yoghurt comprising a) packing a milk substrate, in particular milk, inoculated with the *Streptococcus thermophilus* strain or bacterial composition according to the invention into packages, b) fermenting the inoculated milk substrate to obtain a set yoghurt (with a pH from 4.2 to 4.7, more preferably from 4.45 to 4.6), c) keeping the set yoghurt in the packages at room temperature (i.e., higher than 20° C.) for at least 30 minutes, at least 45 minutes or at least 60 minutes after the end of fermentation; and d) incubating the packages in a cooling chamber in order the set yoghurt contained in the package reaches a temperature of 18-20° C.

In another aspect, the *Streptococcus thermophilus* strain or bacterial composition according to the invention finds use in the storage of fermented milk, such as stirred yoghurt and set yoghurt. At the end of the process of manufacture (including the packing and cooling), the fermented milks are stored in storage cold room at a temperature which is typically less than 8° C., until distribution. As shown in example 9, a yoghurt manufactured with a strain of the invention stored at 10° C. keeps a stable pH until 45 days (by stable, it is meant a variation of pH with is less than 0.1 unit). Thus, the invention is also directed to a process to manufacture and store a fermented milk, comprising a) fermenting a milk substrate, in particular milk, with the *Streptococcus thermophilus* strain or bacterial composition according to the invention, to obtain a fermented milk (with a pH from 4.2 to 4.7, more preferably from 4.45 to 4.6), b) optionally cooling the fermented milk to a temperature of 18-20° C., and c) storing the packages containing the fermented milk, the packing step occurring either before or after the fermentation step, but before the optional cooling step, wherein the storage is carried out at a temperature higher than 8° C.; in an embodiment, the storage is carried out at a temperature equals to or higher than 10° C., and optionally less than 20° C., preferably less than 15° C. In a particular embodiment, the time of storage at a temperature higher than 8° C.

(preferably at a temperature equals to or higher than 10° C., and optionally less than 20° C., preferably less than 15° C.) is less than 24 hours.

Product

Any product, which is prepared from, contains or comprises a *Streptococcus thermophilus* strain or bacterial composition of the invention is contemplated in accordance with the present invention.

Suitable products include, but are not limited to a food or a feed product.

These include, but are not limited to, fruits, legumes, fodder crops and vegetables including derived products, grain and grain-derived products, dairy foods and dairy food-derived products, meat, poultry and seafood. Preferably, the food or feed product is a dairy, meat or cereal product.

The term "food" is used in a broad sense and includes feeds, foodstuffs, food ingredients, food supplements, and functional foods. Here, the term "food" is used in a broad sense—and covers food for humans as well as food for animals (i.e., a feed). In a preferred aspect, the food is for human consumption.

As used herein the term "food ingredient" includes a formulation, which is or can be added to foods and includes formulations which can be used at low levels in a wide variety of products that require, for example, acidification or emulsification.

As used herein, the term "functional food" means a food which is capable of providing not only a nutritional effect and/or a taste satisfaction, but is also capable of delivering a further beneficial effect to consumers. Although there is no legal definition of a functional food, most of the parties with an interest in this area agree that there are foods marketed as having specific health effects.

The *Streptococcus thermophilus* strain of the present invention may be—or may be added to—a food ingredient, a food supplement, or a functional food.

The food may be in the form of a solution or as a solid—depending on the use and/or the mode of application and/or the mode of administration.

The *Streptococcus thermophilus* strain of the present invention can be used in the preparation of food products such as confectionery products, dairy products, meat products, poultry products, fish products or bakery products.

By way of example, the *Streptococcus thermophilus* strain can be used as an ingredient to prepare soft drinks, a fruit juice or a beverage comprising whey protein, teas, cocoa drinks, milk drinks and lactic acid bacteria drinks, yoghurt, drinking yoghurt and wine.

Preferably a food as described herein is a dairy product. More preferably, a dairy product as described herein is one or more of the following: a yoghurt, a cheese (such as an acid curd cheese, a hard cheese, a semi-hard cheese, a cottage cheese), a buttermilk, a quark, a sour cream, kefir, a fermented whey-based beverage, a koumiss, a milk beverage, a yoghurt drink, a fermented milk, a matured cream, a cheese, a fromage frais, a milk, a dairy product retentate, a process cheese, a cream dessert, or an infant milk.

Preferably, a food as described herein is a fermented food product. More preferably, a food as described herein is a fermented dairy product—such as a fermented milk, a yoghurt, a cream, a matured cream, a cheese, a fromage frais, a milk beverage, a processed cheese, a cream dessert, a cottage cheese, a yoghurt drink, a dairy product retentate, or an infant milk.

Preferably the dairy product according to the invention comprises milk of animal and/or plant origin.

Milk is understood to mean that of animal origin, in particular of any mammals such as cow, goat, sheep, buffalo, zebra, horse, donkey, or camel, and the like. The term milk also applies to what is commonly called vegetable milk, that is to say extracts of plant material which have been treated or otherwise, such as leguminous plants (soya bean, chick pea, lentil and the like) or oilseeds (colza, soya bean, sesame, cotton and the like), which extract contains proteins in solution or in colloidal suspension, which are coagulable by chemical action, by acid fermentation and/or by heat. Finally, the word milk also denotes mixtures of animal milks and of vegetable milks.

In one embodiment, the term "milk" means commercial UHT milk supplemented with 3% (w/w) of semi-skimmed milk powder pasteurized by heating during 10 min+/−1 min. at 90° C.+/−0.2° C.

In the field of dairy applications, the use of a fermented milk, such as a yoghurt, manufactured with the *Streptococcus thermophilus* strain or bacterial composition according to the invention is advantageous when mixed with warm flavors (such as coffee or chocolate flavors); indeed, not only the high pH of the yoghurt obtained with the strain of the invention but also the stability of this pH (no post-acidification) suppress the acidic perception in the final product and improves its mildness; these advantages render the use of warm flavors, like coffee or chocolate flavors, compatible with flavored-yoghurt manufacture. In another embodiment, the *Streptococcus thermophilus* strain or bacterial composition according to the invention is advantageous when used for the manufacture of Ryazhenka-type products (eastern Europe), also called "Brown-yogurts" (Asian countries) (fermentation of over-cooked milks developing caramel aromatic notes); indeed, conventional starter cultures developing yoghurt acidic note are not compatible with this type of fermented milk products.

Percentage of Identity of a β-Galactosidase

A percentage of identity of at least 95% to SEQ ID NO:2 means a percentage of identity selected from the group consisting of at least 95%, at least 96%, at least 97%, at least 98% and at least 99%.

In an embodiment, though the sequence of the β-galactosidase is different from SEQ ID NO:2, the size of the β-galactosidase variant is the same as the β-galactosidase as defined in SEQ ID NO:2 (1026 amino acid residues).

Comparisons of sequences can be conducted by eye, or more usually, with the aid of readily available sequence comparison programs. These commercially or freely available computer programs can calculate similarity or identity values between two or more sequences.

A percentage of identity may be calculated over aligned, contiguous sequences, i.e. one sequence is aligned with regards to another sequence and each amino acid in one sequence is directly compared with the corresponding amino acid in the other sequence, one residue at a time. This is called an "ungapped" alignment. Typically, such ungapped alignments are performed only over a relatively short number of residues.

Although this is a very simple and consistent method, it fails to take into consideration that, for example, in an otherwise identical pair of sequences, one insertion or deletion will cause the downstream amino acid residues to be put out of alignment, thus potentially resulting in a large reduction of the identity when a global alignment is performed. Consequently, most sequence comparison methods are designed to produce optimal alignments that take into consideration possible insertions and deletions without penalising unduly the overall identity score. This is achieved by inserting "gaps" in the sequence alignment to try to maximise local identity. These more complex methods assign "gap penalties" to each gap that occurs in the alignment so that, for the same number of identical amino acids, a sequence alignment with as few gaps as possible—reflecting higher relatedness between the two compared sequences—will achieve a higher score than one with many gaps. "Affine gap costs" are typically used that charge a relatively high cost for the existence of a gap and a smaller penalty for each subsequent residue in the gap (gap extension penalty). This is the most commonly used gap scoring system. High gap penalties will of course produce optimised alignments with fewer gaps. Most alignment programs allow the gap penalties to be modified. However, it is possible to use the default values when using such software for sequence comparisons, because these default values have been adjusted to provide relevant results in most cases. Calculation of the maximum percentage of identity therefore firstly requires the production of an optimal alignment, taking into consideration gap penalties. A suitable computer program for carrying out such an alignment is Vector NTI (Invitrogen Corp.). An example of software that can perform sequence comparisons includes, but is not limited to, the BLAST package (see Ausubel et al., 1999, Short Protocols in Molecular Biology, 4th Ed—Chapter 18).

Although the alignment quality can be measured in terms of identity, the alignment process itself is typically not based on an all-or-nothing pair comparison. Instead, a scaled similarity score matrix is generally used that assigns scores to each pairwise comparison based on chemical similarity or evolutionary distance. An example of such a matrix commonly used is the BLOSUM62 matrix—the default matrix for the BLAST suite of programs. Vector NTI programs generally use either the public default values or a custom comparison table if supplied (see user manual for further details). Alternatively, percentage of similarity may be calculated using the multiple alignment feature in Vector NTI (Invitrogen Corp.), based on an algorithm, analogous to CLUSTAL (Higgins D G & Sharp P M (1988), Gene 73(1), 237-244).

Once the software has produced an optimal alignment, it is possible to calculate a percentage of sequence similarity, preferably a percentage of sequence identity. The software typically does this as part of the sequence comparison and generates a numerical result.

In an embodiment, the degree of identity with regards to a protein (amino acid) sequence is determined over at least 50 contiguous amino acids, at least 100 contiguous amino acids, at least 150 contiguous amino acids, at least 200 contiguous amino acids or at least 250 contiguous amino acids.

In an embodiment, the degree of identity with regards to an amino acid or protein sequence may be determined over the whole sequence of SEQ ID NO:2.

In an embodiment, the sequences [sequence of the β-galactosidase to be compared and SEQ ID NO:2] are aligned by a global alignment program and the sequence identity is calculated by identifying the number of exact matches identified by the program divided by the length of the sequence of the β-galactosidase to be compared.

In an embodiment, the degree of sequence identity between the sequence of the β-galactosidase to be compared and SEQ ID NO:2 is determined by: 1) aligning the two sequences by any suitable alignment program using the default scoring matrix and default gap penalties, 2) identifying the number of exact matches, where an exact match is where the alignment program has identified an identical amino acid in the two aligned sequences on a given position in the alignment and 3) dividing the number of exact matches with the length of the sequence of the β-galactosidase to be compared.

In an embodiment, the global alignment program is selected from the group consisting of CLUSTAL and BLAST, in particular CLUSTAL, using the default parameters, and the sequence identity is calculated by identifying the number of exact matches identified by the program divided by the length of the subject sequence.

In an embodiment, the global alignment program is CLUSTAL using the default parameters, and the sequence identity is determined with the BioEdit software (http://www.mbio.ncsu.edu/BioEdit/bioedit.html) [selecting the "Sequence" drop-down menu, then selecting the "Pairwise alignment" sub-menu, then selecting the "Calculate identity/similarity for two sequences" menu item].

General Recombinant DNA Methodology Techniques

The present invention employs, unless otherwise indicated, conventional techniques of biochemistry, molecular biology, microbiology and recombinant DNA, which are within the capabilities of a person of ordinary skill in the art. Such techniques are explained in the literature. See, for example, J. Sambrook, E. F. Fritsch, and T. Maniatis, 1989, Molecular Cloning: A Laboratory Manual, Second Edition, Books 1-3, Cold Spring Harbor Laboratory Press; Ausubel, F. M. et al. (1995 and periodic supplements; Current Protocols in Molecular Biology, ch. 9, 13, and 16, John Wiley & Sons, New York, N.Y.); B. Roe, J. Crabtree, and A. Kahn, 1996, DNA Isolation and Sequencing: Essential Techniques, John Wiley & Sons; M. J.

Gait (Editor), 1984, Oligonucleotide Synthesis: A Practical Approach, Irl Press; and, D. M. J. Lilley and J. E. Dahlberg, 1992, Methods of Enzymology: DNA Structure Part A: Synthesis and Physical Analysis of DNA Methods in Enzymology, Academic Press. Each of these general texts is herein incorporated by reference.

The invention will now be further described by way of Examples, which are meant to serve to assist one of ordinary skill in the art in carrying out the invention and are not intended in any way to limit the scope of the invention.

Material and Methods

Strains and Growth Conditions

The S. thermophilus strains (ST) disclosed in the present application were grown at 37° C. in M17 broth (Oxoïd, supplier reference CM0817) supplemented with 30 g/L of lactose and if necessary, with addition of 15 g/L Agar Bacteriologic Type A (Biokar, supplier reference #A1010HA), or at 43° C. in milk (UHT semi-skimmed milk "Le Petit Vendéen"+3% milk powder BBA Lactalis). Autoclaved M17 broth was supplemented with 0.2 μm filtered lactose, sucrose, galactose or glucose. Frozen stocks of ST strains were obtained by half-diluting in M17 with 50% glycerol an overnight culture grown in M17 broth supplemented with 30 g/L sucrose, and stored at −20° C.

Transfer of the lacZ Allele of the DGCC12456 Strain into the Genome of 2 Other S. thermophilus Strains A 1198-bp PCR product bearing the lacZ gene of the DGCC12456 strain was obtained using primers lacZ_F5 (5'-GTAACTTCGTAGGATACAGTG-3') and lacZ_R6 (5'-CAGAGTTACCCATTGTGTGC-3'). The PCR product was then purified using QIAquick PCR Purification Kit (Qiagen) and eluted in DNase free water. The concentration of the PCR product was determined using NanoDrop 2000 spectrophotometer (Thermo Scientific, Wilmington, MA). The size and the purity of the PCR product were verified by gel-based capillary electrophoresis QIAxcel® system (Qiagen, Hilden, Germany). Strains DGCC715 and DGCC11231 were transformed with the 1198-bp PCR product by natural competence accordingly to Dandoy et al. (2011). Mutants having their lacZ gene replaced by the lacZ allele of the DGCC12456 strain were selected (the presence of the lacZ allele of the DGCC12456 strain was checked by sequencing).

Verification by Sequencing of the Presence of the lacZ Allele of the DGCC12456

PCR amplification of the β-galactosidase gene was performed using primers lacS_F1 (5' GTAACTTCGTAGGA-TACAGTG-3') and lacZ_R7 (5'-CAGAGTTACCCAT-TGTGTGC-3'), [incubation step at 98° C., 5 min, followed by 33 cycles of 98° C., 45 s; 58° C., 30 s; 68° C., 3 min, with a final extension step at 72° C., 7 min]. The PCR product of 1198-bp was then treated with Illustra™ ExoProStar™ according to the manufacturer's instructions (GE Healthcare). Sequencing reactions were performed by using the BigDye® Terminator v3.1 Cycle Sequencing kit (Life Technologies) according to the manufacturer's instructions using an AB3500 (Applied Biosystems™), and primers listed in Table 1.

TABLE 1 list of primers used for amplification and sequencing of the fragment of lacZ used for transformation

| Primers | Sequence 5' - - - 3' | SEQ ID |
|---|---|---|
| lacS_F1 | CTTGACTGCAGCTGAACTC | SEQ ID NO 32 |
| lacZ_R7 | CTCGACTACAAAGTTAACTGG | SEQ ID NO 33 |
| lacZ_R6 | CAGAGTTACCCATTGTGTGC | SEQ ID NO 34 |
| qLacZ_R4 | AGGTTGGCTTCATCGATAAC | SEQ ID NO 35 |
| qLacZ_F1 | CATCACCTTCTGTAACGATGC | SEQ ID NO 36 |
| LacZ_F5 | GTAACTTCGTAGGATACAGTG | SEQ ID NO 37 |
| qLacZ_F3 | AGGACGTTGTATCACTGAAG | SEQ ID NO 38 |

LacS Activity [Assay A]

*Streptococcus thermophilus* strains were grown on M17 media containing 30 g/L of sucrose as sole carbon source overnight at 37° C. When cells reached the stationary phase, they were transferred (at 0.05 uDO/mL) in 1 volume of M17 media containing 30 g/L of lactose as sole carbon source and they were incubated for 2 hours at 42° C. Strain cultures were centrifuged at room temperature (3500 g), the supernatant was removed and cells were resuspended in 0.5 volume of 4% (w/v) glycerophosphate. This washing step was applied twice. 1.8 mL of cell suspension in 4% glycerophosphate were incubated for 2 minutes at 42° C. Then, 0.2 mL of lactose solution (70 g/L of lactose+0.1 M potassium phosphate buffer) was added [the lactose solution pH was previously adjusted at pH 4.5 or at pH 6, depending on the measurement needed]. The mix was incubated for 3 additional minutes at 42° C. The reaction was blocked by filtrating on 0.22 µm filter in order to remove cells. Then, the lactose in the filtrated solution was assayed on an HPLC using the following protocol. The solution was diluted 10-fold in water and 10 µL were injected on an Agilent 1200 HPLC (high-performance-liquid-chromatography). The elution was done in isocratic mode with pure water at 0.6 mL/min. Molecules were separated in 40 min onto a $Pb^{2+}$ ion exchange column (SP-0810 Shodex® 300 mm×8 mm×7 µm) column. Sugars were detected with refractometer. Quantification was performed by external calibration.

The activity of lactose importation of the LacS permease is calculated as follows:

$$\text{LacS activity} = ([\text{lactose}]_{initial} - [\text{lactose}]_{3\ min})/(\text{DO} \times \text{time}),\ \text{expressed in } \mu\text{mol}/(\text{uDO} \cdot \text{min}),$$

wherein:

[lactose]$_{initial}$ is the initial concentration in µmol/mL
[lactose]$_{3\ min}$ is the concentration in µmol/mL after 3 minutes at 42° C.
DO is the bacterial density in uDO/mL
time is the experiment duration in minutes (in the present case, 3 minutes).

LacZ Activity [Assay B]

A fresh overnight culture of the *Streptococcus thermophilus* strain to be assayed in M17 containing 30 g/L lactose was obtained and used to inoculate at 1% (v/v) 10 ml of fresh M17 containing 30 g/L lactose. Cells were harvested by centrifugation (6000 g, 10 min, 4° C.) after 3 hours of growth on M17 containing 30 g/L lactose at 42° C., washed in 1.5 ml of cold lysis buffer (KPO4 0.1 M), and resuspended in 300 µl of cold lysis buffer. EDTA-free protease inhibitors "cOmplete™" (Roche, supplier reference 04693132001) was added to the lysis buffer as described by the supplier. Cells were disrupted by the addition of 100 mg glass beads (150-212 µm, Sigma G1145) to 250 µl of resuspended cells and oscillation at a frequency of 30 cycles/s for 6 min in a MM200 oscillating mill (Retsch, Haan, Germany). Cell debris and glass beads were removed by centrifugation (14000 g, 15 min, 4° C.), and the supernatant was transferred into a clean 1.5 mL centrifuge tube kept on ice. Total protein content was determined by using the FLUKA Protein Quantification Kit-Rapid (ref 51254). The beta-galactosidase activity in the cell extracts was determined spectrophotometrically by a monitoring of the hydrolysis of O-nitro-Phenol-Beta-Galactoside (ONPG) into galactose and O-nitro-phenol (ONP). Twenty µL of the cell extract were mixed with 135 µL of React Buffer (NaPO$_4$ 100 mM; KCl 10 mM; MgSO$_4$ 1 mM; ONPG 3 mM+Beta Mercapto Ethanol 60 mM, pH=6). The production of ONP leads to a yellow color into the tube. When the yellow color was appearing, the reaction was blocked by adding 250 µL of Stopping buffer (Na$_2$CO$_3$ 1 M). The optical density at 420 nm was recorded using a Synergy HT multi-detection microplate reader (BIO-TEK). One unit of beta-galactosidase corresponds to the amount of enzyme that catalyzes the production of 1 µmole ONP per minute under the assay conditions. Beta-galactosidase activity was calculated as follows:

$$\text{LacZ activity} = \text{dOD} \times V/[\text{dt} \times l \times \varepsilon \times \text{Qprot}],$$

expressed in mol/(mg of total protein extract·min), wherein:
dOD is the variation of optical density (OD) at 420 nm between the blank and the tested sample
V is the volume of the reaction in which the optical density is measured (herein 250 µL)
dt=represent the duration in minutes between the addition of the 20 µL of bacterial extract and the addition of the 250 µL stopping buffer
l=optical path length (herein 0.73 cm)
ε=molar attenuation coefficient of ONP (herein 4500 cm$^2$/µmol)
Qprot=quantity of protein in the cuvette (in mg)

Milk Acidifying Performance [Assay C]

The acidifying properties of *S. thermophilus* strains were evaluated by recording the pH over time, during milk fermentation as follow: UHT semi-skimmed milk "Le Petit Vendéen ("yoghurt milk") containing 3% (w/v) milk powder (BBA, Lactalis), previously pasteurized 10 min at 90° C., was inoculated at 1% (v/v, about $10^7$ CFU/ml) with a culture of the *S. thermophilus* strain to be assayed (M17-carbohydrate-free resuspended cells from overnight culture grown in M17 supplemented 3% sucrose). The inoculated milk flasks were statically incubated in a water bath at 43° C. during 24 h. The pH was monitored during the incubation using the CINAC system (Alliance Instruments, France; pH electrode Mettler 405 DPAS SC, Toledo, Spain) as previously described. The pH was measured and recorded every 5 minutes.
Results

Example 1: Isolation of a *Streptococcus thermophilus* Displaying a Full-Stop Phenotype Dilutions of a culture of the DGCC7984 strain were plated onto the surface of M17 supplemented with 5 g/L sucrose agar plates. Upon incubation for 48 hours at 37° C., 2 isolated colonies of the DGCC7984 strain were picked and propagated for 24 hours in M17 broth supplemented with 20 g/L sucrose at 37° C. These two subclones of DGCC7984 strain were named DGCC12455 and DGCC12456. Acidification properties of strain DGCC12455 and DGCC12456 were investigated as follow: the 2 strains were inoculated into M17 broth supplemented with lactose 30 g/L and then incubated at 37° C. overnight. The cultures were washed (v/v) in tryptone-salt solution (tryptone 1 g/L, NaCl 8.5 g/L) as follow: the cultures were centrifugated at 4000 rpm for 5 minutes; the pellets were resuspended in 10 mL of tryptone-salt solution. The washed cultures were inoculated at 1% (v/v) into 100 mL of UHT half-skimmed milk containing 3% (w/v) of milk powder and pasteurized at 90° C. for 10 minutes. The flasks were incubated in a water bath at 43° C. and the pH was measured and recorded online using a CINAC system (FIG. 1A). The slope between pH 6.0 and pH 5.3 (–UpH/minute), representing the velocity between pH 6 and pH 5.3, was calculated (as the slope of the linear model deduced from the evolution of the pH as a function of time (ΔpH/Δtime) for value of pH between 6 and 5.3). Moreover, the $pH_{STOP}$ corresponding to the pH value at V0 (corresponding to a velocity which definitively becomes non-detectable, i.e., below 0.1 mupH/minutes (0.0001 UpH/min)] was determined.

Acidification of milk by DGCC12455 and by DGCC7984 were found similar all along the kinetic. On the contrary, DGCC12456 displayed a distinct acidification profile (FIG. 1A).

Indeed, upon about 600 min of fermentation with DGCC12456, the pH tended to stabilize around 4.37 and did not change until the end of the fermentation time ($pH_{STOP}$=4.37), whereas with the DGCC12455 and DGCC7984 strains, the pH kept decreasing after 600 min of fermentation and reached values around 4.1 and 4.2 at the end of the fermentation time. This peculiar acidification profile with a pH stabilization was named full-STOP phenotype. However, despite this peculiar kinetic at the end of the fermentation, the slope of acidification between 6 and 5.3 was 106 mUpH/min which is a speed of acidification that is expected in industrial dairy fermentation.

Example 2: Identification of a Genetic Difference in the lacZ Gene of DGCC12456

Genomes of strains DGCC7984 and DGCC12456 were sequenced and compared. Among others, a difference between the two strains was identified in the lacZ gene. The lacZ gene is described (van den Bogaard et al., 2000; Vaughan et al., 2001) as encoding the β-galactosidase, an enzyme responsible for the hydrolysis of lactose into glucose and galactose. In DGCC12456 genome, a C base was replaced by a T base at position 1060 of the lacZ gene, leading to a non-conservative amino acid change, the substitution of an arginine by a cysteine, at position 354 (R354C substitution) of the β-galactosidase enzyme. Thus, the DGCC7984 has a lacZ allele encoding a β-galactosidase the sequence of which is as defined in SEQ ID NO:2, whereas the DGCC12456 strain has a lacZ allele encoding a β-galactosidase the sequence of which is as defined in SEQ ID NO:4. In contrast, sequencing of the lacZ gene of strain DGCC12455 revealed that its lacZ sequence was identical to that of DGCC7984 (i.e., encoding a β-galactosidase the sequence of which is as defined in SEQ ID NO:2). Altogether, these results suggested that the mutation in the lacZ gene may be responsible for the peculiar acidification profile of DGCC12456.

To further investigate this hypothesis, the β-galactosidase encoded by the lacZ gene of other *S. thermophilus* strains were compared. The R354C substitution found in DGCC12456 was not found in any of the β-galactosidase sequence of the other *S. thermophilus* strains, confirming that this substitution is unique to DGCC12456.

Most of the *S. thermophilus* strains that were tested bears a lacZ allele encoding a β-galactosidase the sequence of which is as defined in SEQ ID NO:2. In some *S. thermophilus* strains, amino acid differences compared to SEQ ID NO:2 have been identified. These identified amino acid differences were conservative substitutions and have led to the identification of 8 different β-galactosidase variant types (as defined herein), the sequence of which is as defined in SEQ ID NO: 6, 9, 12, 15, 18, 21, 24 and 27 [variants 1 to 8—Table 2].

TABLE 2

Comparative amino-acid sequence analysis of β-galactosidases encoded by *S. thermophilus* strains. Numbering of amino-acid position is made accordingly to SEQ ID NO: 2.

| Type | Amino acid position (SEQ ID NO: 2 used for numbering) | | | | | | | | | | | % similarity | SEQ ID |
|---|---|---|---|---|---|---|---|---|---|---|---|---|---|
| | 35 | 237 | 339 | 354* | 542 | 714 | 777 | 951 | 955 | 999 | 1002 | | |
| DGCC7984 | E | A | V | R | Y | E | V | A | A | T | A | 100% | 2 |
| Variant 1 | A | T | V | R | Y | E | V | A | A | T | A | 99.7% | 6 |
| Variant 2 | E | A | V | R | Y | E | I | A | A | S | S | 99.7% | 9 |
| Variant 3 | E | A | V | R | Y | E | V | A | A | S | A | 99.9% | 12 |
| Variant 4 | E | A | V | R | Y | K | V | A | A | T | A | 99.9% | 15 |
| Variant 5 | E | A | V | R | F | E | V | A | A | T | A | 99.9% | 18 |
| Variant 6 | E | A | V | R | Y | E | V | S | A | T | A | 99.9% | 21 |

TABLE 2-continued

Comparative amino-acid sequence analysis of β-galactosidases encoded by S. thermophilus strains. Numbering of amino-acid position is made accordingly to SEQ ID NO: 2.

| Type | Amino acid position (SEQ ID NO: 2 used for numbering) | | | | | | | | | | | % similarity | SEQ ID |
|---|---|---|---|---|---|---|---|---|---|---|---|---|---|
| | 35 | 237 | 339 | 354* | 542 | 714 | 777 | 951 | 955 | 999 | 1002 | | |
| Variant 7 | E | T | I | R | Y | E | V | A | A | T | A | 99.8% | 24 |
| Variant 8 | E | A | V | R | Y | E | V | A | V | T | A | 99.9% | 27 |
| DGCC12456 | E | A | V | C | Y | E | V | A | A | T | A | 99.9% | 4 |

*indicates the position 354 that differs in SEQ ID NO: 4

Example 3: Comparison of the Acidification Profile of S. thermophilus Strain DGCC715 and DGCC11231, and their Derivatives Coding for a β-Galactosidase with the Sequence SEQ ID NO:4 Instead of SEQ ID NO:2 (R354C Substitution)

Derivatives of the strains DGCC715 and DGCC11231, named $715^{R354C}$ and $11231^{R354C}$ respectively, were constructed. The lacZ gene of DGCC12456 (encoding a β-galactosidase with a cysteine (C) at position 354) was inserted in lieu of the lacZ gene of the strains DGCC715 and DGCC11231. Practically, the lacZ gene was PCR amplified from DGCC12456 DNA.

Competent cells of DGCC715 or DGCC11231 were prepared and transformed with the amplified DNA. Transformants were verified by sequencing.

The ability of S. thermophilus strains DGCC715, DGCC11231, $715^{R354C}$ and $11231^{R354C}$ to ferment milk was evaluated as described in materiel and methods section [assay C]. The pH was recorded over time using a CINAC apparatus and the results are displayed in FIGS. 2A, 3A, 4A and 5A. The following descriptors were calculated (Table 3):
the slope between pH 6.0 and pH 5.3 (UpH/minute) [Slope pH6-5.3]; and
the $pH_{STOP}$ corresponding to the pH value at V0 [corresponding to a velocity which definitively becomes non-detectable, i.e., below 0.1 mupH/minutes (0.0001 UpH/min)].

TABLE 3

Descriptors of the acidification kinetic of milk by DGCC715, DGCC11231 and their constructed derivatives calculated from the acidification curves

| Strain | Slope pH 6-5.3 ($10^{-4}$ UpH/min) | $pH_{STOP}$ |
|---|---|---|
| DGCC715 | 109 | 4.19 |
| $715^{R354C}$ | 117 | 4.38 |
| DGCC11231 | 130 | 4.10 |
| $11231^{R354C}$ | 149 | 4.27 |

The results indicated that the acidification profile of the derivatives $715^{R354C}$ and $11231^{R354C}$ (see FIGS. 3A and 5A) differed from that of their respective parental strain (FIGS. 2A and 4A respectively) by a stabilization of the pH after 10 to 12 h of incubation. Stabilization of the pH ($pH_{STOP}$) occurred around pH 4.27 for $11231^{R354C}$ and pH 4.38 for $715^{R354C}$, while the parental strains continued to acidify the milk after 12 hours of incubation to reach a pH of 4.19 and 4.10 respectively at the end of the incubation time. The results also indicated that, despite the substitution of an arginine by a cysteine in position 354 of the β-galactosidase, the slope of acidification between pH 6.0 and 5.3 was not negatively affected. As a consequence, the constructed derivatives were still appropriate to conduct dairy fermentation in industrial set-ups.

A second set of descriptors was also considered to characterize the full-STOP phenotype. This second set of descriptors was also determined for the DGCC12456 strain. For this purpose, the evolution of velocity (speed of acidification) as a function of time was calculated and the results are presented in FIGS. 1B, 2B, 3B, 4B and 5B. From these curves, the following descriptors were determined (Table 4):
the time to the maximal velocity obtained during the fermentation experiment ($T_{Vmax}$), time calculated (in minutes) as from the start of fermentation experiment;
the time to the $pH_{STOP}$ ($TpH_{STOP}$) [the time to reach V0 as defined above], time calculated (in minutes) as from the start of fermentation experiment;
the time difference between $TpH_{STOP}$ and $T_{Vmax}$ (in minutes).

TABLE 4

Descriptors of the velocity kinetic of the fermentation by DGCC715, DGCC11231 and their constructed derivatives and DGCC12456 calculated from the velocity curves

| Strain | $T_{Vmax}$ | $TpH_{STOP}$ | Δ time between $T_{Vmax}$ and $TpH_{STOP}$ |
|---|---|---|---|
| DGCC715 | 95 | 790 | 695 |
| $715^{R354C}$ | 115 | 525 | 410 |
| DGCC11231 | 105 | 945 | 840 |
| $11231^{R354C}$ | 115 | 595 | 480 |
| DGCC12456 | 160 | 610 | 450 |

The results showed that the time difference between $TpH_{STOP}$ and $T_{Vmax}$ was 410 and 480 minutes for the derivatives $715^{R354C}$ and $11231^{R354C}$ as compared to 695 and 840 minutes for their respective parental strains (Table 4). The results also showed that the DGCC12456 strain has the same profile as the derivatives $715^{R354C}$ and $11231^{R354C}$. These results indicated that the time difference between $TpH_{STOP}$ and $T_{Vmax}$ of the derivatives $715^{R354C}$ and $11231^{R354C}$ was significantly decreased as compared to that of their respective parental strain (285 and 360 minute-difference respectively). These data reflected the ability of the derivatives $715^{R354C}$ and $11231^{R354C}$, when used to ferment milk, to achieve a stabilized pH ($pH_{STOP}$), which is higher, in a shorter time (as from the $T_{Vmax}$). These results confirmed that the R354C substitution in the β-galactosidase of DGCC12456 is responsible for the full-STOP phenotype.

Thus, the strains bearing a lacZ allele encoding a β-galactosidase with a cysteine at position 354 open the possibility of manufacturing fermented milks not only reaching their target pH ($pH_{STOP}$) in an acceptable industrial time (around 600 minutes), but also stabilizing their pH at fermentation temperature for up to 24 hours. In contrast, the parental strains continue to acidify milk until 700 to 800 minutes and at a lower pH, thus requiring stopping the fermentation process by a cooling step before the pH decreases too low.

Figure 6:
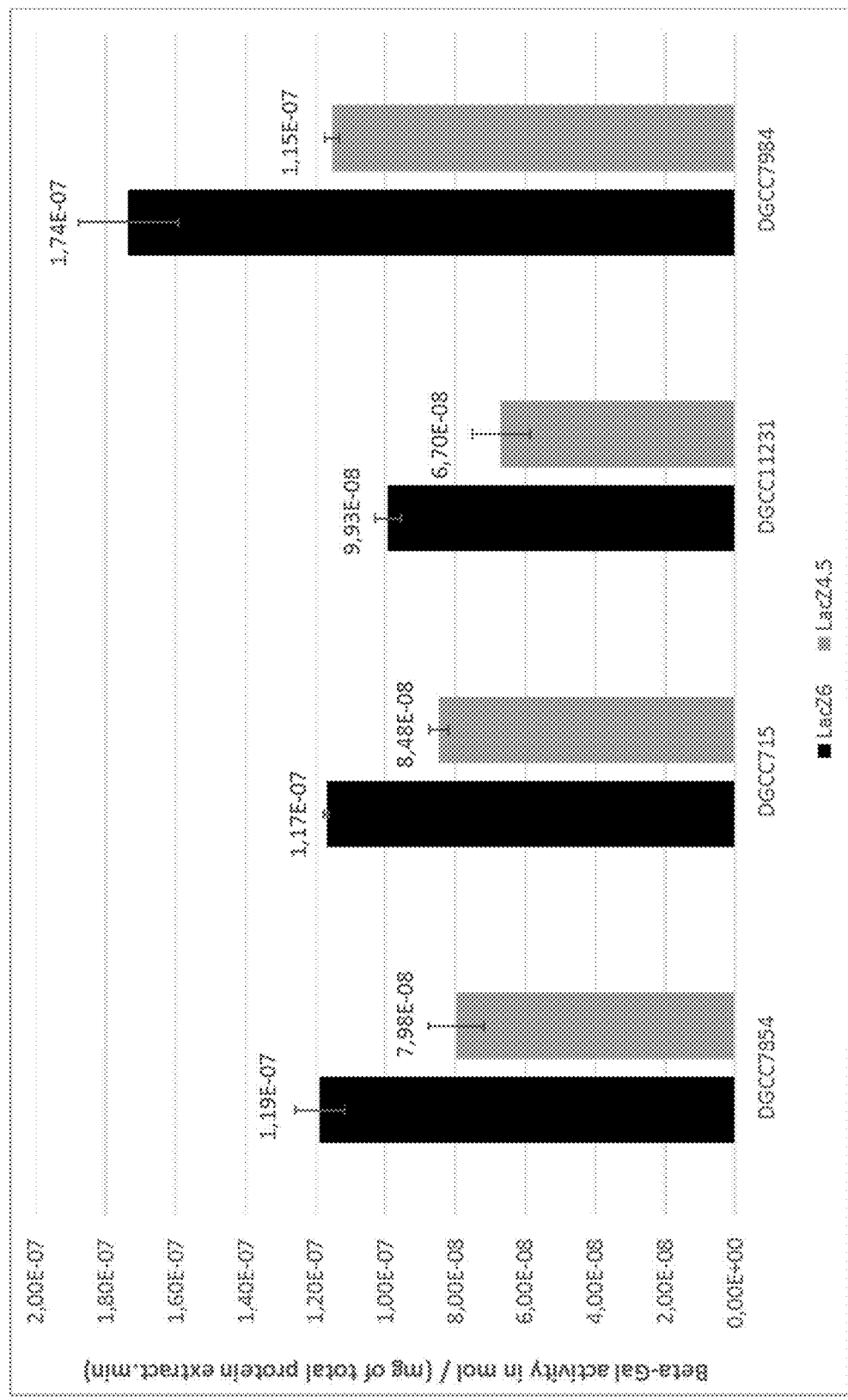
FIG. 6 is a graph representing the beta-galactosidase activity at pH6 and pH 4.5 of four *S. thermophilus* strains

Example 4: Beta-Galactosidase Activities at pH6 and pH 4.5 for a Diversity of *S. thermophilus* Strains The β-galactosidase activities at pH 4.5 and pH 6 of a diversity of *S. thermophilus* strains bearing a lacZ allele encoding a β-galactosidase as defined in SEQ ID NO:2 was determined by assay B (as defined in the material and methods). The results are represented in FIG. 6.

First, these data showed that for a specific strain, its β-galactosidase activity at pH 4.5 is always less than its β-galactosidase activity at pH 6.0, traducing that the β-galactosidase activity decreases with the pH decrease.

Moreover, these data showed that there is an important variability in the β-galactosidase activity between strains bearing the same lacZ allele not only at pH 6.0 [from to $9.93 \times 10^{-8}$ to $1.74 \times 10^{-7}$ mol/(mg of total protein extract·min)] but also at pH 4.5 [from $6.7 \times 10^{-8}$ to $1.15 \times 10^{-7}$ mol/(mg of total protein extract·min)]. This variability can be explained by the genetic background specific to each strain. These data rose doubts on the fact that the β-galactosidase activity alone (at pH 4.5 and/or pH 6) can be used as a reliable descriptor to characterize the strains of the invention (having a full-STOP phenotype).

strains bearing a lacZ allele encoding a β-galactosidase as defined in SEQ ID NO:4 than for the strains bearing a lacZ allele encoding a β-galactosidase as defined in SEQ ID NO:2. Thus, the β-galactosidase activities at pH 4.5 of the strains bearing a lacZ allele encoding a β-galactosidase as defined in SEQ ID NO:4 was lower than the one of the strains bearing a lacZ allele encoding a β-galactosidase as defined in SEQ ID NO:2).

However, the variability in the β-galactosidase activity at pH 4.5 existing between strains bearing the same lacZ allele [from $1.65 \times 10^{-8}$ to $3.94 \times 10^{-8}$ mol/(mg of total protein extract·min) for strains bearing a lacZ allele encoding a β-galactosidase as defined in SEQ ID NO:4] confirmed that the β-galactosidase activity, even at pH4.5, cannot be used as the sole parameter to best characterize the strains of the invention having a full STOP phenotype

Example 6: Investigation of Lactose Permease Activity (LacS)

In *S. thermophilus*, the lacZ gene is part of the lac operon (together with the lacS gene coding a lactose permease), and both the lactose permease and the β-galactosidase are involved in the catabolism of the lactose (by importing the lactose (LacS) and then hydrolysing it into glucose and galactose (lacZ).

The LacS activities at pH 6.0 and pH 4.5 of the strains DGCC715, DGCC11231, their respective derivatives and DGCC7984 and DGCC12456 strains, were determined by assay A (as defined in the material and methods). The results are represented in Table 5 (together with the β-galactosidase activity determined in example 4)

TABLE 5

LacS activity, LacZ activity and ratio at pH 4.5 and pH 6 of the DGCC715, DGCC11231, their constructed derivatives, and DGCC7984 and DGCC12456 strains

| Strain | LacS activity (μmol/uDO · min) | | LacZ activity (mol/mg of total protein extract · min) | | Ratio LacS/ LacZ × $10^{-6}$ | |
|---|---|---|---|---|---|---|
| | pH 6 | pH 4.5 | pH 6 | pH 4.5 | pH 6 | pH 4.5 |
| DGCC715 | 0.3696 | 0.1532 | $1.17 \times 10^{-7}$ | $8.48 \times 10^{-8}$ | 3.16 | 1.81 |
| 715$^{R354C}$ | 0.2846 | 0.5036 | $8.36 \times 10^{-8}$ | $3.68 \times 10^{-8}$ | 3.40 | 13.70 |
| DGCC11231 | 0.7686 | 0.3347 | $9.93 \times 10^{-8}$ | $6.70 \times 10^{-8}$ | 7.74 | 5.00 |
| 11231$^{R354C}$ | 0.5567 | 0.9075 | $8.23 \times 10^{-8}$ | $3.94 \times 10^{-8}$ | 6.77 | 23.05 |
| DGCC7984 | 0.4574 | 0.2943 | $2.10 \times 10^{-7}$ | $1.11 \times 10^{-7}$ | 2.18 | 2.66 |
| DGCC12456 | 0.4568 | 0.4529 | $1.20 \times 10^{-7}$ | $1.65 \times 10^{-8}$ | 3.82 | 27.49 |

Example 5: Comparison of Beta-Galactose Activity at pH6 and pH 4.5 of *S. thermophilus* Strain 715 and ST11231, their Derivatives 715$^{R354C}$ and 11231$^{R354C}$ and Strain DGCC12456

Figure 7:
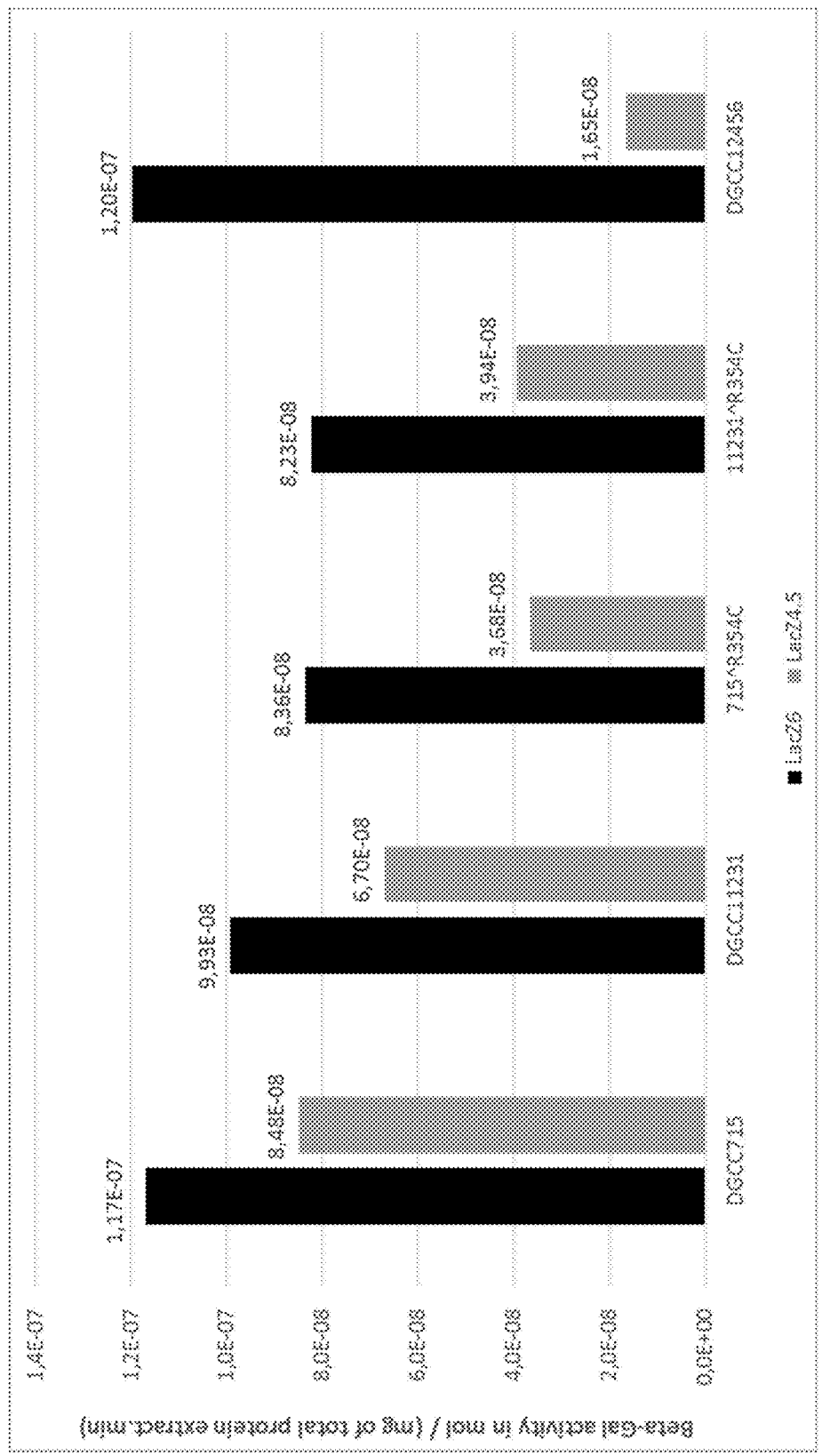
FIG. 7 is a graph representing the beta-galactosidase activity at pH6 and pH 4.5 of strain DGCC715, strain $715^{R354C}$, strain DGCC11231, strain $11231^{R354C}$ and strain DGCC12456

Upon the identification of the R354C substitution in the β-galactosidase and its role in the peculiar kinetic of acidification of milk by DGCC12456 (full-STOP phenotype), the β-galactosidase activity at pH 6 and at pH 4.5 of the strains DGCC715, DGCC11231, their respective constructed derivatives and DGCC12456, was determined by assay B (as defined in the material and methods). The results are represented in FIG. 7.

These data confirmed that the β-galactosidase activity at pH 4.5 of the strains bearing a lacZ allele encoding a β-galactosidase as defined in SEQ ID NO:4 (cysteine at position 354) is less than the β-galactosidase activity at pH 6.0.

It is noteworthy that the difference of β-galactosidase activity between pH 6 and pH4.5 is more important for the While the lactose permease (LacS) activities at pH 4.5 were reduced compared to pH 6.0 for the strains coding for a β-galactosidase as defined in SEQ ID NO:2, these activities were increased (715$^{R354C}$ and 11231$^{R354C}$) or unchanged (DGCC12456) for the strains coding for a β-galactosidase as defined in SEQ ID NO:4. It is hypothesized that to compensate a decrease in lactose hydrolysis by the β-galactosidase$^{FS}$, more lactose is imported by the lactose permease.

Figure 8:
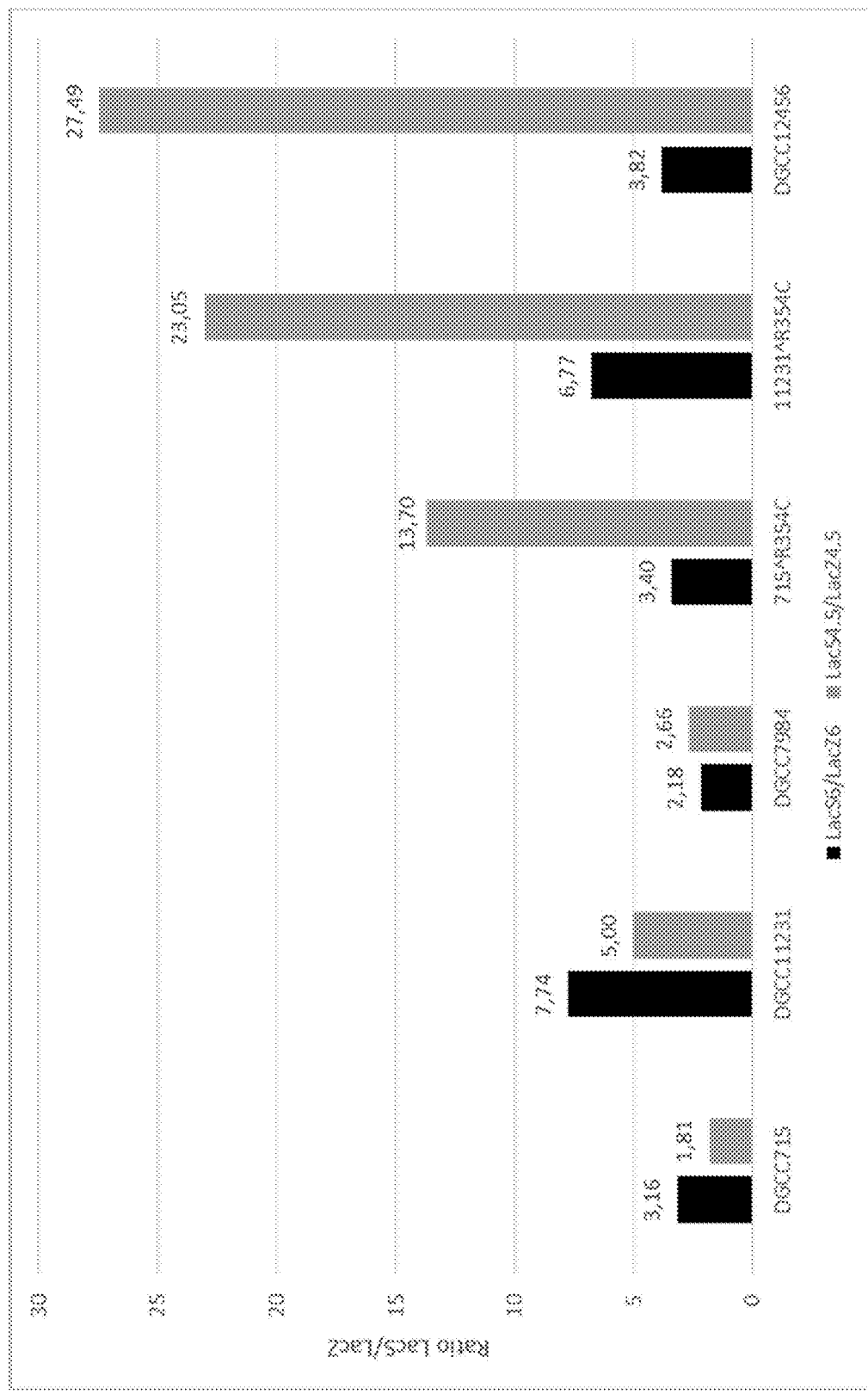
FIG. 8 is a graph representing the ratio LacS over LacZ at pH6 and pH 4.5 of strain DGCC715, strain 715$^{R354C}$, strain DGCC11231, strain 11231$^{R354C}$ and strain DGCC12456.

Therefore, the ratio LacS over LacZ (LacS/LacZ, which represents the efficiency for a strain to hydrolyse imported lactose=EH) at pH 4.5 and pH 6 was calculated (as defined herein) and is given in Table 5 and in FIG. 8. The strains bearing the lacZ allele encoding a β-galactosidase as defined in SEQ ID NO:2 displayed LacS/LacZ ratios of similar or slightly reduced values at pH 4.5 compared to pH 6.0. On the contrary, these ratios were significantly increased at pH 4.5 compared to pH 6.0 for the strains bearing a lacZ allele encoding a β-galactosidase as defined in SEQ ID NO:4.

These results reflect a decrease of the efficiency of the strains of the invention in using the lactose of the medium (i.e., in hydrolysing the imported lactose) at pH 4.5 as compared to strains bearing the lacZ allele encoding a β-galactosidase as defined in SEQ ID NO:2.

The difference between the ratio LacS/LacZ at pH 4.5 of the strains bearing a lacZ allele encoding a β-galactosidase as defined in SEQ ID NO:2 and the ratio of the strains bearing a lacZ allele encoding a β-galactosidase as defined in SEQ ID NO:4 is highly significant, such that this parameter can be reliably used to characterize the strains of the invention.

The ratios LacS/LacZ at pH 4.5 of the strain DGCC715 and its derivative have been shown to be sufficiently discriminating, to use the DGCC715 strain in order to identify additional lacZ alleles encoding a β-galactosidase according to the invention ($lacZ^{FS}$ alleles).

Example 7: Efficiency of Hydrolysis of the Imported Lactose (EH) of S. thermophilus Strain 715 and ST11231, their Derivatives $715^{R354C}$ and $11231^{R354C}$ and Strain DGCC12456

Finally, the inventors have determined an additional descriptor representing the overall behavior of the S. thermophilus strain of the invention with respect to lactose metabolism during the whole process of milk fermentation. Thus, the following formula (I), representing the difference of efficiency of hydrolysis of imported lactose between pH 6.0 and pH 4.5 ($EH_{pH6}-EH_{pH4.5}$), was developed:

$$\Delta EH = \ln\left[\frac{LacS_{pH6}}{LacZ_{pH6}}\right] - \ln\left[\frac{LacS_{pH4.5}}{LacZ_{pH4.5}}\right] \quad (I)$$

In this formula, a ΔEH value around 0 or slightly positive or slightly negative means that the efficiency of hydrolysis of the imported lactose is similar at pH 6.0 and at pH 4.5 (i.e., that the efficiency of hydrolysis is not dependent upon the pH). In contrast, a significantly negative ΔEH value means that the efficiency of hydrolysis of the imported lactose is lower at pH 4.5 than at pH 6.0 (i.e., that the efficiency of hydrolysis significantly decreases with the pH decrease).

This formula was applied to calculate the ΔEH for the strains DGCC715, DGCC11231, their respective derivatives and DGCC12456, based on the β-galactosidase activity and lactose permease activities reported in Table 5. The results are presented in FIG. 9.

Figure 9:
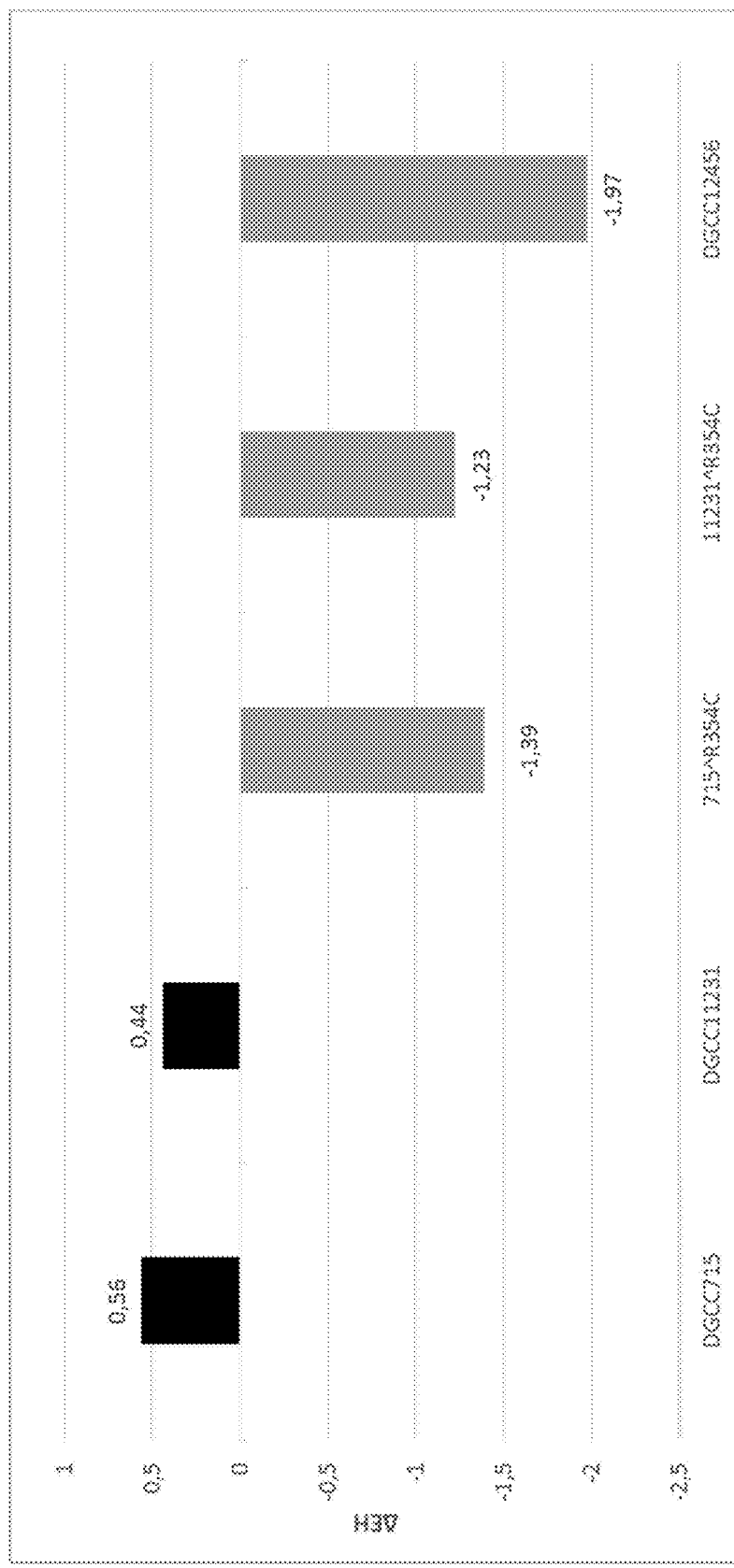
FIG. 9 is a graph representing the difference of efficiency of hydrolysis of lactose between pH6 and pH 4.5 (ΔEH) of strain DGCC715, strain 715$^{R354C}$, strain DGCC11231, strain 11231$^{R354C}$ and strain DGCC12456.

As show in FIG. 9, and as expected, the 2 S. thermophilus strains bearing a lacZ allele encoding a β-galactosidase as defined in SEQ ID NO:2 has a ΔEH value which is slightly positive (0.44 and 0.56). In contrast, the 3 S. thermophilus strains bearing a lacZ allele encoding a β-galactosidase as defined in SEQ ID NO:4 has a ΔEH value which is significantly negative (from −1.23 to −1.97).

In addition to the ratio LacS over LacZ at pH 4.5 defined above, the ΔEH value as defined by the formula (I) is a reliable parameter, enabling to characterize the strains of the invention having a full-STOP phenotype.

Example 8: Impact of the Temperature of Packing During Manufacture of Stirred Yoghurt A stirred yoghurt was prepared by inoculating a milk substrate (protein 3.9%, fat 1.5% and sucrose 6%) with the DGCC12456 strain described previously (at least $10^7$ cfu/ml) and a Lactobacillus bulgaricus (about 103 cfu/ml), and incubating the inoculated milk at 43° C. until pH=4.60 was reached. Right after, the yoghurt was stirred. Then, the stirred yoghurt was cooled and packed either at 20° C. or 35° C., and then stored at 10° C. along shelf-life (45 days).

The pH during shelf-life was measured using single probe portative pH-meter.

The viscosity at day 14 (after end of fermentation) was determined thanks to a Brookfield DV-I™ Prime viscometer (AMETEK Brookfield) using spindle S-05 and speed 10 rpm; after 30 seconds, the value of viscosity (in centipoise; cP) was determined.

Figure 10:
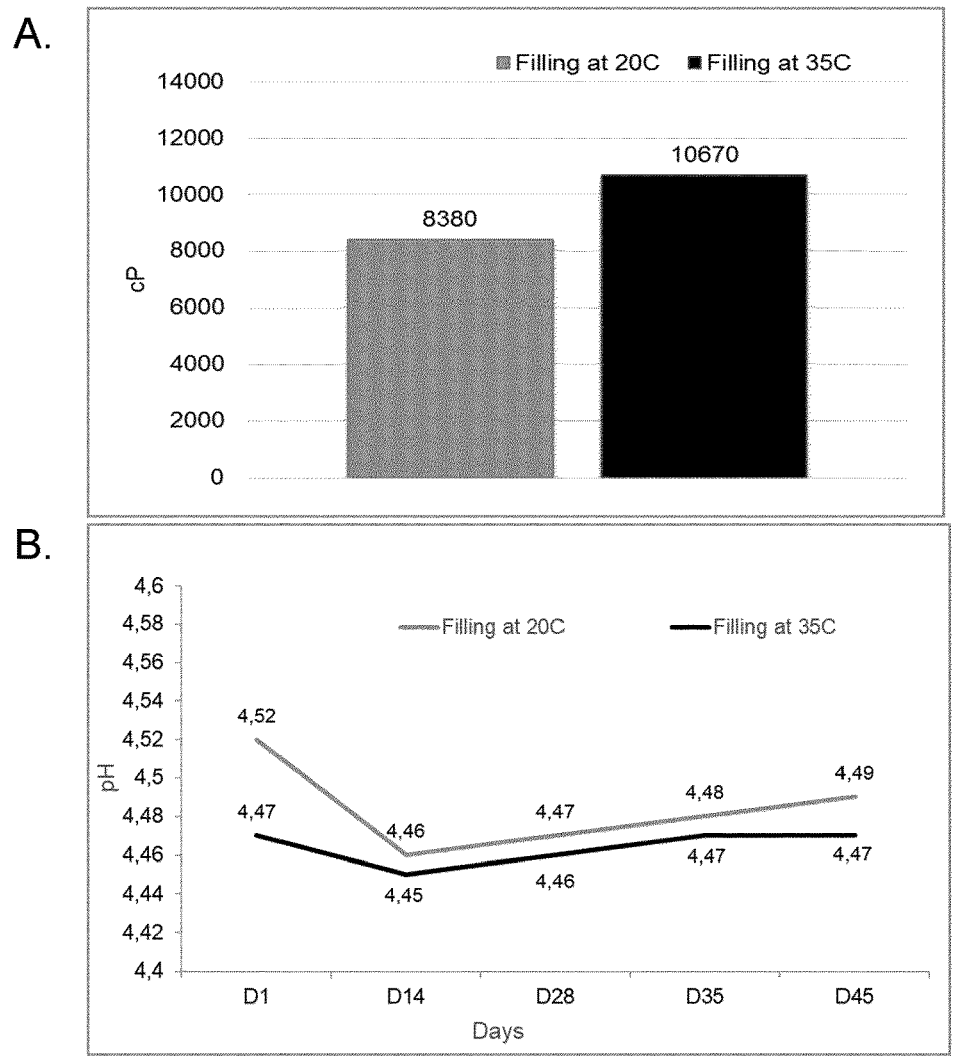
FIG. 10 is a graph representing (A) the viscosity measured on day 14 and (B) the evolution of pH over time, for a stirred yoghurt manufactured with strain DGCC12456 and packed at a temperature of 20° C. or 35° C. (storage at 10° C.).

As shown in FIG. 10A and as expected, packing at 35° C. gave the stirred yoghurt a higher texture at day 14 as compared to packing at 20° C. (FIG. 10A). Interestingly, the pH of the stirred yoghurt was maintained at a high level for at least 45 days whatever the packing temperature (FIG. 10B).

These results confirm that a Streptococcus thermophilus strain of the invention having a full STOP phenotype presents a high interest for stirred yoghurt manufacturers, since enabling to improve the texture of the stirred yoghurt by increasing the temperature of packing while at the same time not compromising on the pH during storage.

Example 9: Yoghurt Post-Acidification at 10° C.

A yoghurt was prepared by inoculating a milk substrate (protein 3.9% and fat 1.5%; no added sugar) with either (A) the DGCC12456 strain described previously (at least $10^7$ cfu/ml) and a Lactobacillus bulgaricus (about 103 cfu/ml) or (B) a reference starter culture with high post-acidification control performance consisting of Streptococcus thermophilus and Lactobacillus bulgaricus strains (the same L. bulgaricus strain as composition A) and by incubating the inoculated milk at 43° C. until pH=4.60 was reached. Right after, the yoghurt was cooled at 22° C. and then stored at 10° C. along shelf-life (45 days). The pH during shelf-life was measured using single probe portative pH-meter.

Figure 11:
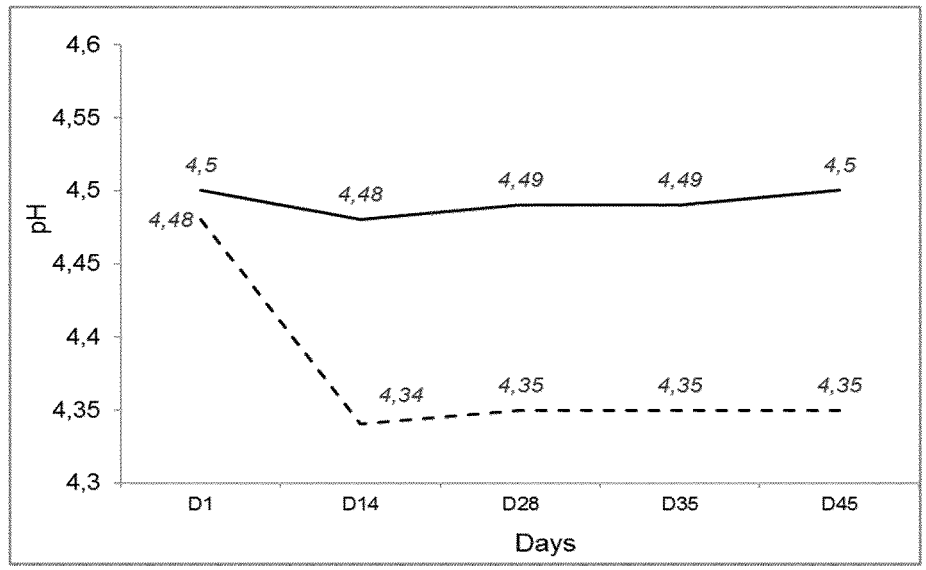
FIG. 11 is a graph representing the evolution of pH over time of a yoghurt manufactured with strain DGCC12456 (plain line) and with a reference culture (dashed line) (stored at 10° C.).

As shown in FIG. 11, both cultures showed a relatively high pH during the shelf-life. The reference starter culture showed a rapid pH decrease down to 4.34 up to day 14 and then a pH stability from day 14 to day 45 (dashed line); in contrast, the culture comprising the DGCC12456 strain showed a stable pH all over the shelf-life from day 1 to day 45 (pH between 4.48 and 4.5) (plain line).

These results confirm that a Streptococcus thermophilus strain of the invention having a full STOP phenotype presents a high interest for fermented milk manufacturers, since enabling to store fermented milks products at a temperature higher than the temperature of conventional cold room (typically less than 8° C.), without impacting the pH.

Altogether, the Streptococcus thermophilus strain of the invention offers fermented milk and yoghurt manufacturers new possibilities to improve their processes and reduce their costs, for example by making use of the pH stability at fermentation temperature for up to 24 hours in the manufacture of set yoghurt, by making use of both the texture improvement and pH stability when packing at high temperature in the manufacture of stirred yoghurt, or by making use of the pH stability at 10° C. for at least 45 days in the storage of their fermented milks.

The invention claimed is:

1. A polynucleotide encoding a β-galactosidase$^{FS}$, which comprises an amino acid sequence which has at least 95% identity with SEQ ID NO:2; and which is defined as a lacZ allele which increases the ratio of the activity of lactose importation of the LacS permease at pH 4.5 over the activity of lactose hydrolysis of the beta-galactosidase at pH 4.5 above 8 in a DGCC715 derivative, said DGCC715 derivative being a strain DGCC715 (deposited at the DSMZ on Feb. 12, 2019 under the accession number DSM33036), into which its lacZ gene was replaced by said polynucleotide encoding a β-galactosidase$^{FS}$.

2. The polynucleotide according to claim 1, encoding a β-galactosidase$^{FS}$ comprising an amino acid suppression, an amino acid addition, an amino acid substitution or an amino acid suppression and addition, relative to a β-galactosidase selected from the group consisting of:
  a) a β-galactosidase having an amino acid sequence as defined in SEQ ID NO:2; and
  b) a β-galactosidase variant comprising an amino acid sequence having at least 95% identity with SEQ ID NO:2, encoded by a lacZ variant allele which does not increase the ratio LacS$_{pH4.5}$ over LacZ$_{pH4.5}$ in a DGCC715 derivative to 5 or more than 5, said DGCC715 derivative being a strain DGCC715 into which its lacZ gene was replaced by said lacZ variant allele.

3. The polynucleotide according to claim 1, wherein the sequence of said β-galactosidase$^{FS}$ does not comprise an arginine at position 354.

4. The polynucleotide according to claim 1, wherein the sequence of said β-galactosidase$^{FS}$ comprises:
  a) an amino acid sequence which is otherwise as defined in SEQ ID NO:2, but which does not comprise an arginine at position 354;
  b) an amino acid sequence which has at least 95% identity with SEQ ID NO:2 and does not comprise an arginine at position 354;
  c) an amino acid sequence which is otherwise as defined as the one of a β-galactosidase variant protein having at least 95% identity with SEQ ID NO:2, but which does not comprise an arginine at position 354.

5. The polynucleotide according to claim 1, wherein the sequence of said β-galactosidase$^{FS}$ comprises:
  a) an amino acid sequence which is otherwise as defined in SEQ ID NO:2, but which comprises a cysteine or an equivalent amino acid thereof at position 354;
  b) an amino acid sequence which has at least 95% identity with SEQ ID NO:2 and comprises a cysteine or an equivalent amino acid thereof at position 354;
  c) an amino acid sequence which is otherwise as defined as the one of a β-galactosidase variant protein having at least 95% identity with SEQ ID NO:2, but which comprises a cysteine or an equivalent amino acid thereof at position 354.

6. A polynucleotide comprising a part of at least 100 nucleotides of the polynucleotide according to claim 1, wherein said nucleotide part encompasses a codon corresponding to the residue 354 of said β-galactosidase$^{FS}$.

7. A *Streptococcus thermophilus* strain comprising an allele of the lacZ gene which is a lacZ$^{FS}$ allele encoding a β-galactosidase$^{FS}$ according to claim 1.

8. A *Streptococcus thermophilus* strain according to claim 7, characterized by a difference of efficiency of hydrolysis (ΔEH) of the imported lactose which is less than −0.5 calculated by the following formula (I):

$$\Delta EH = \ln\left[\frac{LacS_{pH6}}{LacZ_{pH6}}\right] - \ln\left[\frac{LacS_{pH4.5}}{LacZ_{pH4.5}}\right] \quad (I)$$

in which formula (I), LacS$_{pH6}$ and LacS$_{pH4.5}$ represent the activity of lactose importation of the LacS permease at pH 6 and at pH 4.5 respectively, and LacZ$_{pH6}$ and LacZ$_{pH4.5}$ represent the activity of lactose hydrolysis of the beta-galactosidase at pH 6 and at pH 4.5 respectively.

9. A bacterial composition comprising the *Streptococcus thermophilus* strain of claim 7, and one or more further lactic acid bacteria selected from the group consisting of *Streptococcus, Lactococcus, Lactobacillus, Leuconostoc, Pediococcus, Enterococcus, Oenococcus* and *Bifidobacterium*.

10. A food or feed product comprising the *Streptococcus thermophilus* strain of claim 7 or a bacterial composition comprising the *Streptococcus thermophilus* strain of claim 7, wherein the food or feed product is a dairy, meat or cereal food or feed product.

11. A method for manufacturing a fermented product, comprising:
  a) inoculating a substrate with the *Streptococcus thermophilus* strain of claim 7 or a bacterial composition comprising the *Streptococcus thermophilus* strain of claim 7; and
  b) fermenting the inoculated substrate obtained from step a) to obtain a fermented product.

12. A method according to claim 11, for manufacturing stirred yoghurt, comprising:
  a) fermenting a milk substrate inoculated with the *Streptococcus thermophilus* strain of claim 7 or a bacterial composition comprising the *Streptococcus thermophilus* strain of claim 7, to obtain a stirred yoghurt with a pH from 4.2 to 4.7;
  b) cooling the stirred yoghurt;
  c) packing the stirred yoghurt; and
  d) transferring the packages of step c) into a storage cold room;
wherein the temperature of cooling and packing is at least 24° C.

13. A method according to claim 11, for manufacturing stirred yoghurt, comprising:
  a) fermenting a milk substrate inoculated with the *Streptococcus thermophilus* strain of claim 7 or a bacterial composition comprising the *Streptococcus thermophilus* strain of claim 7, to obtain a stirred yoghurt with a pH from 4.2 to 4.7;
  b) packing the stirred yoghurt; and
  c) transferring the packages of step b) into a storage cold room;
wherein the process does not comprise any cooling step between end of fermentation and packing.

14. A method according to claim 11, for manufacturing set yoghurt, comprising:
  a) packing a milk substrate inoculated with the *Streptococcus thermophilus* strain of claim 7 or a bacterial composition comprising the *Streptococcus thermophilus* strain of claim 7;
  b) fermenting the inoculated milk substrate to obtain a set yoghurt with a pH from 4.2 to 4.7; and
  c) directly transferring the packages of step b) into a storage cold room, wherein said process does not comprise a cooling step in a cooling room after the fermentation step b).

15. A method to prepare a *Streptococcus thermophilus* strain with a full STOP phenotype, comprising:
  a) providing a *Streptococcus thermophilus* strain, having a ratio of the activity of lactose importation of the LacS permease at pH 4.5 over the activity of lactose hydrolysis of the beta-galactosidase at pH 4.5 which is less than 5;
  b) replacing the allele of the lacZ gene of said *Streptococcus thermophilus* strain of step a) with a polynucleotide according to claim 1, or replacing a part of the allele of the lacZ gene of said *Streptococcus thermophilus* strain of step a) with a polynucleotide comprising a part of at least 100 nucleotides of the sequence of said β-galactosidase$^{FS}$ comprising or consisting of an amino acid sequence which has at least 95% identity with SEQ ID NO:2, wherein said nucleotide part encompasses the codon corresponding to the residue 354 of said β-galactosidase$^{FS}$, or modifying the sequence of the lacZ gene of said *Streptococcus thermophilus* strain of step a) to have a lacZ$^{FS}$ allele with the same sequence as a polynucleotide according to claim 1; and
  c) recovering the *Streptococcus thermophilus* strain(s) with a full STOP phenotype when used to ferment milk.

16. A method to identify a lacZ$^{FS}$ allele encoding a β-galactosidase$^{FS}$, comprising:
  a) inserting the lacZ allele to be tested in lieu of the allele of the lacZ gene of the strain DGCC715 (deposited at the DSMZ on Feb. 12, 2019 under the accession number DSM33036), to obtain a DGCC715-derivative; and
  b) determining the activity of lactose importation of the LacS permease at pH 4.5 (LacS$_{pH4.5}$) and the activity of lactose hydrolysis of the beta-galactosidase at pH 4.5 (LacZ$_{pH4.5}$);
wherein a ratio LacS$_{pH4.5}$ over LacZ$_{pH4.5}$ which is more than 8 is indicative of a lacZ allele which is a lacZ$^{FS}$ allele encoding a β-galactosidase$^{FS}$.

* * * * *

SEQUENCE LISTING

<160> NUMBER OF SEQ ID NOS: 38

<210> SEQ ID NO 1
<211> LENGTH: 3081
<212> TYPE: DNA
<213> ORGANISM: Streptococcus thermophilus

<400> SEQUENCE: 1

| | | | | | | |
|---|---|---|---|---|---|---|
| atgaacatga | ctgaaaaaat | tcaaacttat | ttaaacgatc | caaagattgt | tagcgttaat | 60 |
| actgttgatg | ctcactcaga | tcataagtat | tttgaatctc | ttgaagaatt | ttctgaaggg | 120 |
| gagatgaagt | taagacaatc | tcttaatgga | aaatggaaaa | ttcactatgc | tcagaataca | 180 |
| aatcaggttt | taaaagactt | ttataaaaca | gaatttgatg | aaactgattt | gaatttcatc | 240 |
| aatgtaccag | gtcatttaga | gcttcaaggt | tttggttctc | cacaatatgt | gaatacccaa | 300 |
| tatccttggg | atggtaaaga | attccttcgt | ccacctcaag | ttcctcaaga | atcaaatgct | 360 |
| gttgcatcat | acgttaaaca | ttttaccttg | aatgatgcat | aaaagataa | aaagtattt | 420 |
| atctcattcc | aaggggttgc | tacttccatc | tttgtatggg | tcaatggtaa | cttcgtagga | 480 |
| tacagtgaag | attcatttac | acctagtgaa | tttgaaatta | gtgattacct | tgttgaaggt | 540 |
| gataacaagt | tggcggtagc | tgtttatcgt | tactctacag | caagctggtt | ggaagaccaa | 600 |
| gacttctgga | gactttacgg | tatttttaga | gatgtttact | tgtatgctat | tccaaaagtt | 660 |
| cacgttcaag | atctctttgt | taagggagat | tatgattacc | aaacaaaagc | aggtcaattg | 720 |
| gatattgatt | tgaagactgt | tggtgattat | gaagacaaga | agattaaata | tgttctttca | 780 |
| gattatgaag | gcatcgttac | agaaggtgat | gcatctgtta | atggtgacgg | tgaactatct | 840 |
| gtaagtcttg | aaaatcttaa | aatcaaacct | tggagtgctg | aaagtcctaa | actttacgat | 900 |
| tgatccttc | atgttttgga | tgatgaccaa | gttgttgaag | tcgttccagt | taaagttgga | 960 |
| ttcagacgct | ttgaaattaa | agataaactt | atgcttttga | atggtaagag | aattgtcttt | 1020 |
| aaaggggtta | acagacacga | atttaacgct | agaacaggac | gttgtatcac | tgaagaagat | 1080 |
| atgctttggg | atatcaaagt | gatgaagcaa | cataacatca | atgctgttcg | tacttcacac | 1140 |
| tatcctaacc | aaacacgttg | gtatgaattg | tgtgatgaat | atggacttta | tgttatcgat | 1200 |
| gaagccaacc | ttgaaacaca | cggtacatgg | caaaaacttg | gtctatgcga | accttcatgg | 1260 |
| aatatcccag | ctagtgaacc | agaatggttg | cctgcttgtt | tggatcgtgc | caataacatg | 1320 |
| ttccaacgcg | ataagaacca | cgctagtgtt | atcatttggt | cttgtggtaa | tgaatcatat | 1380 |
| gctggtaaag | atattgctga | catggctgat | tacttccgta | gtgttgacaa | tactcgtcca | 1440 |
| gttcactatg | aaggtgttgc | atggtgtcgt | gagtttgatt | acattacaga | catcgaaagt | 1500 |
| cgtatgtatg | cgaaaccagc | tgatatcgaa | gaatacctca | caactggtaa | actagttgat | 1560 |
| cttcaagcg | ttagtgataa | acactttgct | tcaggtaacc | taactaacaa | acctcaaaaa | 1620 |
| ccttatattt | catgtgaata | catgcacaca | atgggtaact | ctggtggtgg | attgcaactc | 1680 |
| tacactgact | tagagaaata | tccagaatac | caaggtggat | ttatttggga | cttcattgac | 1740 |
| caagctattt | acaaaacact | tccaaatggt | agcgaattcc | tatcatatgg | tggtgactgg | 1800 |
| catgatagac | cttctgacta | cgaattttgt | ggaaatggta | tcgtctttgc | agatcgtacc | 1860 |
| ctaactccaa | aacttcaaac | agttaaacat | ctttactcta | atattaagat | tgctgttgat | 1920 |
| gaaaaatcag | taactatcaa | gaatgataat | ctcttcgaag | atctttctgc | ttatactttc | 1980 |
| ctagctagag | tttacgaaga | tggtagaaaa | gttagtgaaa | gtgaatatca | ctttgatgtt | 2040 |
| aaaccaggcg | aagaagcaac | attcccagtt | aactttgtag | tcgaggcttc | aaattctgaa | 2100 |

-continued

```
caaatttacg aagttgcttg tgttctgagg gaagcaactg aatgggctcc taaaggtcat    2160
gaaattgttc gtggtcaata tgttgttgaa aagattagca ctgaaacacc agttaaagca    2220
cctttgaatg ttgttgaagg cgacttcaac atcggtattc aaggacaaaa cttctcaatc    2280
ttgctttcac gtgcacaaaa tactttagta tctgctaagt ataatggtgt tgaattcatt    2340
gagaaaggtc ctaaacttag cttcactcgt gcttacactg acaacgatcg tggtgctgga    2400
tatccattcg aaatggcagg ctggaaggtt gctggaaact atagtaaagt tacagatact    2460
caaattcaaa tcgaagacga ctctgttaaa gtgacttatg ttcatgaatt gccaggcttg    2520
tctgatgtcg aagttaaggt aacttatcaa gttgattaca agggtcgaat ctttgttact    2580
gcaaactatg atggtaaagc aggtttgcca aacttccctg aatttggtct agaatttgct    2640
atcggttcac aatttacaaa ccttagctat tatggatacg gtgcagaaga aagctaccgt    2700
gataaacttc ctggtgccta tcttggtcga tatgaaacat ctgttgaaaa gacatttgct    2760
ccatatctaa tgccacaaga atctggtaat cactatggta ctcgtgaatt cacagtatct    2820
gatgataacc ataatggtct taaattcacc gcacttaata aagcattcga attcagtgct    2880
ttgcgtaaca gtactgaaca aattgaaaat gctcgtcacc aatatgagtt gcaagaatct    2940
gatgctacat ggattaaagt tcttgctgct caaatgggtg taggtggtga cgacacatgg    3000
ggtgctccag ttcatgacga attcttgctt agctcagcag atagctatca attaagcttc    3060
atgattgaac cactaaatta g                                              3081
```

<210> SEQ ID NO 2
<211> LENGTH: 1026
<212> TYPE: PRT
<213> ORGANISM: Streptococcus thermophilus

<400> SEQUENCE: 2

```
Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190
```

-continued

```
Thr Ala Ser Trp Leu Glu Asp Gln Asp Phe Trp Arg Leu Tyr Gly Ile
            195                 200                 205

Phe Arg Asp Val Tyr Leu Tyr Ala Ile Pro Lys Val His Val Gln Asp
        210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
```

```
                   610                 615                 620
Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                    645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Ala Thr Phe
            675                 680                 685

Pro Val Asn Phe Val Val Glu Ala Ser Asn Ser Glu Gln Ile Tyr Glu
690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
                740                 745                 750

Ile Gln Gly Gln Asn Phe Ser Ile Leu Leu Ser Arg Ala Gln Asn Thr
            755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025
```

<210> SEQ ID NO 3
<211> LENGTH: 3081
<212> TYPE: DNA
<213> ORGANISM: Streptococcus thermophilus

<400> SEQUENCE: 3

| | |
|---|---|
| atgaacatga ctgaaaaaat tcaaacttat ttaaacgatc caaagattgt tagcgttaat | 60 |
| actgttgatg ctcactcaga tcataagtat tttgaatctc ttgaagaatt ttctgaaggg | 120 |
| gagatgaagt taagacaatc tcttaatgga aaatggaaaa ttcactatgc tcagaataca | 180 |
| aatcaggttt taaaagactt ttataaaaca gaatttgatg aaactgattt gaatttcatc | 240 |
| aatgtaccag gtcatttaga gcttcaaggt tttggttctc cacaatatgt gaatacccaa | 300 |
| tatccttggg atggtaaaga attccttcgt ccacctcaag ttcctcaaga atcaaatgct | 360 |
| gttgcatcat acgttaaaca ttttaccttg aatgatgcat taaaagataa aaaagtattt | 420 |
| atctcattcc aaggggttgc tacttccatc tttgtatggg tcaatggtaa cttcgtagga | 480 |
| tacagtgaag attcatttac acctagtgaa tttgaaatta gtgattacct tgttgaaggt | 540 |
| gataacaagt tggcggtagc tgtttatcgt tattctacag caagctggtt ggaagaccaa | 600 |
| gacttctgga gactttacgg tatttttaga gatgtttact tgtatgctat tccaaaagtt | 660 |
| cacgttcaag atctctttgt taagggagat tatgattacc aaacaaaagc aggtcaattg | 720 |
| gatattgatt tgaagactgt tggtgattat gaagacaaga gattaaaata tgttctttca | 780 |
| gattatgaag catcgttac agaaggtgat gcatctgtta atggtgacgg tgaactatct | 840 |
| gtaagtcttg aaaatcttaa aatcaaacct tggagtgctg aaagtcctaa actttacgat | 900 |
| ttgatccttc atgttttgga tgatgaccaa gttgttgaag tcgttccagt taaagttgga | 960 |
| tttagacgct ttgaaattaa agataaactt atgcttttga atggtaagag aattgtctttt | 1020 |
| aaaggggtta acagacacga atttaacgct agaacaggat gttgtatcac tgaagaagat | 1080 |
| atgctttggg atatcaaagt gatgaaacaa cataacatca atgctgttcg tacttcacac | 1140 |
| tatcctaacc aaacacgttg gtatgaattg tgtgatgaat atggactttta tgttatcgat | 1200 |
| gaagccaacc ttgaaacaca cggtacatgg caaaaacttg gtctatgcga accttcatgg | 1260 |
| aatatcccag ctagtgaacc agaatggttg cctgcttgtt tggatcgtgc aataacatg | 1320 |
| ttccaacgcg ataagaacca cgctagtgtt atcatttggt cttgtggtaa tgaatcatat | 1380 |
| gctggtaaag atattgctga catggctgat tacttccgta gtgttgacaa tactcgtcca | 1440 |
| gttcactatg aaggtgttgc atggtgtcgt gagtttgatt acattacaga catcgaaagt | 1500 |
| cgtatgtatg cgaaaccagc tgatatcgaa gaataccctca caactggtaa actagttgat | 1560 |
| ctttcaagcg ttagtgataa acactttgct tcaggtaacc taactaacaa acctcaaaaa | 1620 |
| ccttatattt catgtgaata catgcacaca atgggtaact ctggtggtgg attgcaactc | 1680 |
| tacactgact tagagaaata tccagaatac caaggtggat ttatttggga cttcattgac | 1740 |
| caagctattt acaaaacact tccaaatggt agcgaattcc tatcatatgg tggtgactgg | 1800 |
| catgatagac cttctgacta cgaattttgt ggaaatggta tcgtctttgc agatcgtacc | 1860 |
| ctaactccaa aacttcaaac agttaaacat ctttactcta atattaagat tgctgttgat | 1920 |
| gaaaaatcag taactatcaa gaatgataat ctcttcgaag atctttctgc ttatactttc | 1980 |
| ctagctagag tttacgaaga tggtagaaaa gttagtgaaa gtgaatatca ctttgatgtt | 2040 |
| aaaccaggcg aagaagcaac attcccagtt aactttgtag tcgaggcttc aaattctgaa | 2100 |

-continued

```
caaatttacg aagttgcttg tgttctgagg aagcaactg aatgggctcc taaaggtcat    2160
gaaattgttc gtggtcaata tgttgttgaa aagattagca ctgaaacacc agttaaagca    2220
cctttgaatg ttgttgaagg cgacttcaac atcggtattc aaggacaaaa cttctcaatc    2280
ttgctttcac gtgcacaaaa tactttagta tctgctaagt ataatggtgt tgaattcatt    2340
gagaaaggtc ctaaacttag cttcactcgt gcttacactg acaacgatcg tggtgctgga    2400
tatccattcg aaatggcagg ctggaaggtt gctggaaact atagtaaagt tacagatact    2460
caaattcaaa tcgaagacga ctctgttaaa gtgacttatg ttcatgaatt gccaggcttg    2520
tctgatgtcg aagttaaggt aacttatcaa gttgattaca agggtcgaat ctttgttact    2580
gcaaactatg atggtaaagc aggtttgcca aacttccctg aatttggtct agaatttgct    2640
atcggttcac aatttacaaa ccttagctat tatggatacg gtgcagaaga aagctaccgt    2700
gataaacttc ctggtgccta tcttggtcga tatgaaacat ctgttgaaaa gacatttgct    2760
ccatatctaa tgccacaaga atctggtaat cactatggta ctcgtgaatt cacagtatct    2820
gatgataacc ataatggtct taaattcacc gcacttaata aagcattcga attcagtgct    2880
ttgcgtaaca gtactgaaca aattgaaaat gctcgtcacc aatatgagtt gcaagaatct    2940
gatgctacat ggattaaagt tcttgctgct caaatgggtg taggtggtga cgacacatgg    3000
ggtgctccag ttcatgacga attcttgctt agctcagcag atagctatca attaagcttc    3060
atgattgaac cactaaatta g    3081
```

<210> SEQ ID NO 4
<211> LENGTH: 1026
<212> TYPE: PRT
<213> ORGANISM: Streptococcus thermophilus
<400> SEQUENCE: 4

```
Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
                20                  25                  30

Ser Leu Glu Glu Phe Ser Glu Gly Glu Met Lys Leu Arg Gln Ser Leu
            35                  40                  45

Asn Gly Lys Trp Lys Ile His Tyr Ala Gln Asn Thr Asn Gln Val Leu
        50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
```

-continued

```
            195                 200                 205
Phe Arg Asp Val Tyr Leu Tyr Ala Ile Pro Lys Val His Val Gln Asp
210                 215                 220
Leu Phe Val Lys Gly Asp Tyr Asp Tyr Gln Thr Lys Ala Gly Gln Leu
225                 230                 235                 240
Asp Ile Asp Leu Lys Thr Val Gly Asp Tyr Glu Asp Lys Lys Ile Lys
                245                 250                 255
Tyr Val Leu Ser Asp Tyr Glu Gly Ile Val Thr Glu Gly Asp Ala Ser
                260                 265                 270
Val Asn Gly Asp Gly Glu Leu Ser Val Ser Leu Glu Asn Leu Lys Ile
            275                 280                 285
Lys Pro Trp Ser Ala Glu Ser Pro Lys Leu Tyr Asp Leu Ile Leu His
290                 295                 300
Val Leu Asp Asp Asp Gln Val Val Glu Val Val Pro Val Lys Val Gly
305                 310                 315                 320
Phe Arg Arg Phe Glu Ile Lys Asp Lys Leu Met Leu Leu Asn Gly Lys
                325                 330                 335
Arg Ile Val Phe Lys Gly Val Asn Arg His Glu Phe Asn Ala Arg Thr
                340                 345                 350
Gly Cys Cys Ile Thr Glu Glu Asp Met Leu Trp Asp Ile Lys Val Met
            355                 360                 365
Lys Gln His Asn Ile Asn Ala Val Arg Thr Ser His Tyr Pro Asn Gln
370                 375                 380
Thr Arg Trp Tyr Glu Leu Cys Asp Glu Tyr Gly Leu Tyr Val Ile Asp
385                 390                 395                 400
Glu Ala Asn Leu Glu Thr His Gly Thr Trp Gln Lys Leu Gly Leu Cys
                405                 410                 415
Glu Pro Ser Trp Asn Ile Pro Ala Ser Glu Pro Glu Trp Leu Pro Ala
                420                 425                 430
Cys Leu Asp Arg Ala Asn Asn Met Phe Gln Arg Asp Lys Asn His Ala
            435                 440                 445
Ser Val Ile Ile Trp Ser Cys Gly Asn Glu Ser Tyr Ala Gly Lys Asp
450                 455                 460
Ile Ala Asp Met Ala Asp Tyr Phe Arg Ser Val Asp Asn Thr Arg Pro
465                 470                 475                 480
Val His Tyr Glu Gly Val Ala Trp Cys Arg Glu Phe Asp Tyr Ile Thr
                485                 490                 495
Asp Ile Glu Ser Arg Met Tyr Ala Lys Pro Ala Asp Ile Glu Glu Tyr
                500                 505                 510
Leu Thr Thr Gly Lys Leu Val Asp Leu Ser Ser Val Ser Asp Lys His
            515                 520                 525
Phe Ala Ser Gly Asn Leu Thr Asn Lys Pro Gln Lys Pro Tyr Ile Ser
530                 535                 540
Cys Glu Tyr Met His Thr Met Gly Asn Ser Gly Gly Gly Leu Gln Leu
545                 550                 555                 560
Tyr Thr Asp Leu Glu Lys Tyr Pro Glu Tyr Gln Gly Gly Phe Ile Trp
                565                 570                 575
Asp Phe Ile Asp Gln Ala Ile Tyr Lys Thr Leu Pro Asn Gly Ser Glu
                580                 585                 590
Phe Leu Ser Tyr Gly Gly Asp Trp His Asp Arg Pro Ser Asp Tyr Glu
            595                 600                 605
Phe Cys Gly Asn Gly Ile Val Phe Ala Asp Arg Thr Leu Thr Pro Lys
                610                 615                 620
```

```
Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
            645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Ala Thr Phe
            675                 680                 685

Pro Val Asn Phe Val Val Glu Ala Ser Asn Ser Glu Gln Ile Tyr Glu
            690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
                755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
                835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
            930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
            965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025
```

```
<210> SEQ ID NO 5
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 5

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Xaa Cys Ile Thr Glu Glu Asp Met Leu Trp Asp Ile Lys Val Met
```

-continued

```
            355                 360                 365
Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
                420                 425                 430

Cys Leu Asp Arg Ala Asn Asn Met Phe Gln Arg Asp Lys Asn His Ala
                435                 440                 445

Ser Val Ile Ile Trp Ser Cys Gly Asn Glu Ser Tyr Ala Gly Lys Asp
            450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
                515                 520                 525

Phe Ala Ser Gly Asn Leu Thr Asn Lys Pro Gln Lys Pro Tyr Ile Ser
530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
                580                 585                 590

Phe Leu Ser Tyr Gly Gly Asp Trp His Asp Arg Pro Ser Asp Tyr Glu
                595                 600                 605

Phe Cys Gly Asn Gly Ile Val Phe Ala Asp Arg Thr Leu Thr Pro Lys
                610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Glu Ala Thr Phe
                675                 680                 685

Pro Val Asn Phe Val Val Glu Ala Ser Asn Ser Glu Gln Ile Tyr Glu
                690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Glu Gly Asp Phe Asn Ile Gly
                740                 745                 750

Ile Gln Gly Gln Asn Phe Ser Ile Leu Leu Ser Arg Ala Gln Asn Thr
                755                 760                 765

Leu Val Ser Ala Lys Tyr Asn Gly Val Glu Phe Ile Glu Lys Gly Pro
                770                 775                 780
```

```
Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
            805                 810                 815

Val Thr Asp Thr Gln Ile Gln Ile Glu Asp Ser Val Lys Val Thr
        820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
                900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
        930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 6
<211> LENGTH: 1026
<212> TYPE: PRT
<213> ORGANISM: Streptococcus thermophilus

<400> SEQUENCE: 6

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Ala Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
```

-continued

```
            115                 120                 125
Thr Leu Asn Asp Ala Leu Lys Asp Lys Lys Val Phe Ile Ser Phe Gln
    130                 135                 140
Gly Val Ala Thr Ser Ile Phe Val Trp Val Asn Gly Asn Phe Val Gly
145                 150                 155                 160
Tyr Ser Glu Asp Ser Phe Thr Pro Ser Glu Phe Glu Ile Ser Asp Tyr
            165                 170                 175
Leu Val Glu Gly Asp Asn Lys Leu Ala Val Ala Val Tyr Arg Tyr Ser
            180                 185                 190
Thr Ala Ser Trp Leu Glu Asp Gln Asp Phe Trp Arg Leu Tyr Gly Ile
            195                 200                 205
Phe Arg Asp Val Tyr Leu Tyr Ala Ile Pro Lys Val His Val Gln Asp
    210                 215                 220
Leu Phe Val Lys Gly Asp Tyr Asp Tyr Gln Thr Lys Thr Gly Gln Leu
225                 230                 235                 240
Asp Ile Asp Leu Lys Thr Val Gly Asp Tyr Glu Asp Lys Lys Ile Lys
            245                 250                 255
Tyr Val Leu Ser Asp Tyr Glu Gly Ile Val Thr Glu Gly Asp Ala Ser
            260                 265                 270
Val Asn Gly Asp Gly Glu Leu Ser Val Ser Leu Glu Asn Leu Lys Ile
            275                 280                 285
Lys Pro Trp Ser Ala Glu Ser Pro Lys Leu Tyr Asp Leu Ile Leu His
    290                 295                 300
Val Leu Asp Asp Gln Val Val Glu Val Val Pro Val Lys Val Gly
305                 310                 315                 320
Phe Arg Arg Phe Glu Ile Lys Asp Lys Leu Met Leu Leu Asn Gly Lys
            325                 330                 335
Arg Ile Ile Phe Lys Gly Val Asn Arg His Glu Phe Asn Ala Arg Thr
            340                 345                 350
Gly Arg Cys Ile Thr Glu Glu Asp Met Leu Trp Asp Ile Lys Val Met
            355                 360                 365
Lys Gln His Asn Ile Asn Ala Val Arg Thr Ser His Tyr Pro Asn Gln
    370                 375                 380
Thr Arg Trp Tyr Glu Leu Cys Asp Glu Tyr Gly Leu Tyr Val Ile Asp
385                 390                 395                 400
Glu Ala Asn Leu Glu Thr His Gly Thr Trp Gln Lys Leu Gly Leu Cys
            405                 410                 415
Glu Pro Ser Trp Asn Ile Pro Ala Ser Glu Pro Glu Trp Leu Pro Ala
            420                 425                 430
Cys Leu Asp Arg Ala Asn Asn Met Phe Gln Arg Asp Lys Asn His Ala
    435                 440                 445
Ser Val Ile Ile Trp Ser Cys Gly Asn Glu Ser Tyr Ala Gly Lys Asp
    450                 455                 460
Ile Ala Asp Met Ala Asp Tyr Phe Arg Ser Val Asp Asn Thr Arg Pro
465                 470                 475                 480
Val His Tyr Glu Gly Val Ala Trp Cys Arg Glu Phe Asp Tyr Ile Thr
            485                 490                 495
Asp Ile Glu Ser Arg Met Tyr Ala Lys Pro Ala Asp Ile Glu Glu Tyr
            500                 505                 510
Leu Thr Thr Gly Lys Leu Val Asp Leu Ser Ser Val Ser Asp Lys His
            515                 520                 525
Phe Ala Ser Gly Asn Leu Thr Asn Lys Pro Gln Lys Pro Tyr Ile Ser
            530                 535                 540
```

```
Cys Glu Tyr Met His Thr Met Gly Asn Ser Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Ala Thr Phe
        675                 680                 685

Pro Val Asn Phe Val Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960
```

```
Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp  Gly Ala Pro Val His  Asp Glu Phe
            995                 1000                1005

Leu Leu  Ser Ser Ala Asp Ser  Tyr Gln Leu Ser Phe  Met Ile Glu
    1010                 1015                 1020

Pro Leu  Asn
    1025

<210> SEQ ID NO 7
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 7

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Ala Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Thr Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
```

```
            275                 280                 285
Lys Pro Trp Ser Ala Glu Ser Pro Lys Leu Tyr Asp Leu Ile Leu His
290                 295                 300

Val Leu Asp Asp Gln Val Glu Val Val Pro Val Lys Val Gly
305                 310                 315                 320

Phe Arg Arg Phe Glu Ile Lys Asp Lys Leu Met Leu Asn Gly Lys
                325                 330                 335

Arg Ile Ile Phe Lys Gly Val Asn Arg His Glu Phe Asn Ala Arg Thr
                340                 345                 350

Gly Xaa Cys Ile Thr Glu Glu Asp Met Leu Trp Asp Ile Lys Val Met
            355                 360                 365

Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
            435                 440                 445

Ser Val Ile Ile Trp Ser Cys Gly Asn Glu Ser Tyr Ala Gly Lys Asp
450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
            515                 520                 525

Phe Ala Ser Gly Asn Leu Thr Asn Lys Pro Gln Lys Pro Tyr Ile Ser
530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
            595                 600                 605

Phe Cys Gly Asn Gly Ile Val Phe Ala Asp Arg Thr Leu Thr Pro Lys
            610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Glu Ala Thr Phe
            675                 680                 685

Pro Val Asn Phe Val Val Glu Ala Ser Asn Ser Glu Gln Ile Tyr Glu
            690                 695                 700
```

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
        995                 1000                1005

Leu Leu Ser Ser Ala Asp Ser Tyr Gln Leu Ser Phe Met Ile Glu
   1010                1015                1020

Pro Leu Asn
   1025

<210> SEQ ID NO 8
<211> LENGTH: 1026
<212> TYPE: PRT
<213> ORGANISM: Streptococcus thermophilus

<400> SEQUENCE: 8

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Ala Glu Phe Ser Glu Gly Glu Met Lys Leu Arg Gln Ser Leu

-continued

```
                35                  40                  45
Asn Gly Lys Trp Lys Ile His Tyr Ala Gln Asn Thr Asn Gln Val Leu
 50                  55                  60
Lys Asp Phe Tyr Lys Thr Glu Phe Asp Glu Thr Asp Leu Asn Phe Ile
 65                  70                  75                  80
Asn Val Pro Gly His Leu Glu Leu Gln Gly Phe Gly Ser Pro Gln Tyr
                 85                  90                  95
Val Asn Thr Gln Tyr Pro Trp Asp Gly Lys Glu Phe Leu Arg Pro Pro
                100                 105                 110
Gln Val Pro Gln Glu Ser Asn Ala Val Ala Ser Tyr Val Lys His Phe
                115                 120                 125
Thr Leu Asn Asp Ala Leu Lys Asp Lys Val Phe Ile Ser Phe Gln
                130                 135                 140
Gly Val Ala Thr Ser Ile Phe Val Trp Val Asn Gly Asn Phe Val Gly
145                 150                 155                 160
Tyr Ser Glu Asp Ser Phe Thr Pro Ser Glu Phe Glu Ile Ser Asp Tyr
                165                 170                 175
Leu Val Glu Gly Asp Asn Lys Leu Ala Val Ala Val Tyr Arg Tyr Ser
                180                 185                 190
Thr Ala Ser Trp Leu Glu Asp Gln Asp Phe Trp Arg Leu Tyr Gly Ile
                195                 200                 205
Phe Arg Asp Val Tyr Leu Tyr Ala Ile Pro Lys Val His Val Gln Asp
210                 215                 220
Leu Phe Val Lys Gly Asp Tyr Asp Tyr Gln Thr Lys Thr Gly Gln Leu
225                 230                 235                 240
Asp Ile Asp Leu Lys Thr Val Gly Asp Tyr Glu Asp Lys Lys Ile Lys
                245                 250                 255
Tyr Val Leu Ser Asp Tyr Glu Gly Ile Val Thr Glu Gly Asp Ala Ser
                260                 265                 270
Val Asn Gly Asp Gly Glu Leu Ser Val Ser Leu Glu Asn Leu Lys Ile
                275                 280                 285
Lys Pro Trp Ser Ala Glu Ser Pro Lys Leu Tyr Asp Leu Ile Leu His
                290                 295                 300
Val Leu Asp Asp Asp Gln Val Val Glu Val Val Pro Val Lys Val Gly
305                 310                 315                 320
Phe Arg Arg Phe Glu Ile Lys Asp Lys Leu Met Leu Leu Asn Gly Lys
                325                 330                 335
Arg Ile Ile Phe Lys Gly Val Asn Arg His Glu Phe Asn Ala Arg Thr
                340                 345                 350
Gly Cys Cys Ile Thr Glu Glu Asp Met Leu Trp Asp Ile Lys Val Met
                355                 360                 365
Lys Gln His Asn Ile Asn Ala Val Arg Thr Ser His Tyr Pro Asn Gln
                370                 375                 380
Thr Arg Trp Tyr Glu Leu Cys Asp Glu Tyr Gly Leu Tyr Val Ile Asp
385                 390                 395                 400
Glu Ala Asn Leu Glu Thr His Gly Thr Trp Gln Lys Leu Gly Leu Cys
                405                 410                 415
Glu Pro Ser Trp Asn Ile Pro Ala Ser Glu Pro Glu Trp Leu Pro Ala
                420                 425                 430
Cys Leu Asp Arg Ala Asn Asn Met Phe Gln Arg Asp Lys Asn His Ala
                435                 440                 445
Ser Val Ile Ile Trp Ser Cys Gly Asn Glu Ser Tyr Ala Gly Lys Asp
                450                 455                 460
```

-continued

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
530                 535                 540

Cys Glu Tyr Met His Thr Met Gly Asn Ser Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Ala Thr Phe
        675                 680                 685

Pro Val Asn Phe Val Val Glu Ala Ser Asn Ser Glu Gln Ile Tyr Glu
690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

```
Ile Gly Ser Gln Phe Thr Asn Leu Ser Tyr Tyr Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
            930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 9
<211> LENGTH: 1026
<212> TYPE: PRT
<213> ORGANISM: Streptococcus thermophilus

<400> SEQUENCE: 9

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220
```

```
Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
            245                 250                 255

Tyr Val Leu Ser Asp Tyr Glu Gly Ile Val Thr Glu Gly Asp Ala Ser
                260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
        290                 295                 300

Val Leu Asp Asp Gln Val Val Glu Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
                340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
                420                 425                 430

Cys Leu Asp Arg Ala Asn Asn Met Phe Gln Arg Asp Lys Asn His Ala
                435                 440                 445

Ser Val Ile Ile Trp Ser Cys Gly Asn Glu Ser Tyr Ala Gly Lys Asp
        450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Tyr Ile Thr
                485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
        530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
                580                 585                 590

Phe Leu Ser Tyr Gly Gly Asp Trp His Asp Arg Pro Ser Asp Tyr Glu
                595                 600                 605

Phe Cys Gly Asn Gly Ile Val Phe Ala Asp Arg Thr Leu Thr Pro Lys
        610                 615                 620

Leu Gln Thr Val Lys His Leu Tyr Ser Asn Ile Lys Ile Ala Val Asp
625                 630                 635                 640
```

-continued

Glu Lys Ser Val Thr Ile Lys Asn Asp Asn Leu Phe Glu Asp Leu Ser
             645                 650                 655

Ala Tyr Thr Phe Leu Ala Arg Val Tyr Glu Asp Gly Arg Lys Val Ser
        660                 665                 670

Glu Ser Glu Tyr His Phe Asp Val Lys Pro Gly Glu Ala Thr Phe
    675                 680                 685

Pro Val Asn Phe Val Val Glu Ala Ser Asn Ser Glu Gln Ile Tyr Glu
690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Ile Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Ser Trp Gly Ser Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 10
<211> LENGTH: 1026
<212> TYPE: PRT

```
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 10
```

| | | | | | | | | | | | | | | | |
|---|---|---|---|---|---|---|---|---|---|---|---|---|---|---|---|
| Met | Asn | Met | Thr | Glu | Lys | Ile | Gln | Thr | Tyr | Leu | Asn | Asp | Pro | Lys | Ile |
| 1 | | | | 5 | | | | | 10 | | | | | 15 | |
| Val | Ser | Val | Asn | Thr | Val | Asp | Ala | His | Ser | Asp | His | Lys | Tyr | Phe | Glu |
| | | | 20 | | | | | 25 | | | | | 30 | | |
| Ser | Leu | Glu | Glu | Phe | Ser | Glu | Gly | Glu | Met | Lys | Leu | Arg | Gln | Ser | Leu |
| | | 35 | | | | | 40 | | | | | 45 | | | |
| Asn | Gly | Lys | Trp | Lys | Ile | His | Tyr | Ala | Gln | Asn | Thr | Asn | Gln | Val | Leu |
| 50 | | | | | 55 | | | | | 60 | | | | | |
| Lys | Asp | Phe | Tyr | Lys | Thr | Glu | Phe | Asp | Glu | Thr | Asp | Leu | Asn | Phe | Ile |
| 65 | | | | | 70 | | | | | 75 | | | | | 80 |
| Asn | Val | Pro | Gly | His | Leu | Glu | Leu | Gln | Gly | Phe | Gly | Ser | Pro | Gln | Tyr |
| | | | | 85 | | | | | 90 | | | | | 95 | |
| Val | Asn | Thr | Gln | Tyr | Pro | Trp | Asp | Gly | Lys | Glu | Phe | Leu | Arg | Pro | Pro |
| | | | 100 | | | | | 105 | | | | | 110 | | |
| Gln | Val | Pro | Gln | Glu | Ser | Asn | Ala | Val | Ala | Ser | Tyr | Val | Lys | His | Phe |
| | | 115 | | | | | 120 | | | | | 125 | | | |
| Thr | Leu | Asn | Asp | Ala | Leu | Lys | Asp | Lys | Lys | Val | Phe | Ile | Ser | Phe | Gln |
| | 130 | | | | | 135 | | | | | 140 | | | | |
| Gly | Val | Ala | Thr | Ser | Ile | Phe | Val | Trp | Val | Asn | Gly | Asn | Phe | Val | Gly |
| 145 | | | | | 150 | | | | | 155 | | | | | 160 |
| Tyr | Ser | Glu | Asp | Ser | Phe | Thr | Pro | Ser | Glu | Phe | Glu | Ile | Ser | Asp | Tyr |
| | | | | 165 | | | | | 170 | | | | | 175 | |
| Leu | Val | Glu | Gly | Asp | Asn | Lys | Leu | Ala | Val | Ala | Val | Tyr | Arg | Tyr | Ser |
| | | | 180 | | | | | 185 | | | | | 190 | | |
| Thr | Ala | Ser | Trp | Leu | Glu | Asp | Gln | Asp | Phe | Trp | Arg | Leu | Tyr | Gly | Ile |
| | | 195 | | | | | 200 | | | | | 205 | | | |
| Phe | Arg | Asp | Val | Tyr | Leu | Tyr | Ala | Ile | Pro | Lys | Val | His | Val | Gln | Asp |
| | 210 | | | | | 215 | | | | | 220 | | | | |
| Leu | Phe | Val | Lys | Gly | Asp | Tyr | Asp | Tyr | Gln | Thr | Lys | Ala | Gly | Gln | Leu |
| 225 | | | | | 230 | | | | | 235 | | | | | 240 |
| Asp | Ile | Asp | Leu | Lys | Thr | Val | Gly | Asp | Tyr | Glu | Asp | Lys | Lys | Ile | Lys |
| | | | | 245 | | | | | 250 | | | | | 255 | |
| Tyr | Val | Leu | Ser | Asp | Tyr | Glu | Gly | Ile | Val | Thr | Glu | Gly | Asp | Ala | Ser |
| | | | 260 | | | | | 265 | | | | | 270 | | |
| Val | Asn | Gly | Asp | Gly | Glu | Leu | Ser | Val | Ser | Leu | Glu | Asn | Leu | Lys | Ile |
| | | 275 | | | | | 280 | | | | | 285 | | | |
| Lys | Pro | Trp | Ser | Ala | Glu | Ser | Pro | Lys | Leu | Tyr | Asp | Leu | Ile | Leu | His |
| | 290 | | | | | 295 | | | | | 300 | | | | |
| Val | Leu | Asp | Asp | Asp | Gln | Val | Val | Glu | Val | Pro | Val | Lys | Val | Gly |
| 305 | | | | | 310 | | | | | 315 | | | | | 320 |
| Phe | Arg | Arg | Phe | Glu | Ile | Lys | Asp | Lys | Leu | Met | Leu | Leu | Asn | Gly | Lys |
| | | | | 325 | | | | | 330 | | | | | 335 | |
| Arg | Ile | Val | Phe | Lys | Gly | Val | Asn | Arg | His | Glu | Phe | Asn | Ala | Arg | Thr |
| | | | 340 | | | | | 345 | | | | | 350 | | |
| Gly | Xaa | Cys | Ile | Thr | Glu | Glu | Asp | Met | Leu | Trp | Asp | Ile | Lys | Val | Met |
| | 355 | | | | | 360 | | | | | 365 | | | | |
| Lys | Gln | His | Asn | Ile | Asn | Ala | Val | Arg | Thr | Ser | His | Tyr | Pro | Asn | Gln |
| | 370 | | | | | 375 | | | | | 380 | | | | |

```
Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
        405                 410                 415

Glu Pro Ser Trp Asn Ile Pro Ala Ser Glu Pro Glu Trp Leu Pro Ala
        420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
        485                 490                 495

Asp Ile Glu Ser Arg Met Tyr Ala Lys Pro Ala Asp Ile Glu Glu Tyr
        500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
        565                 570                 575

Asp Phe Ile Asp Gln Ala Ile Tyr Lys Thr Leu Pro Asn Gly Ser Glu
        580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
        610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
        690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
        740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Ile Glu Phe Ile Glu Lys Gly Pro
        770                 775                 780

Lys Leu Ser Phe Thr Arg Ala Tyr Thr Asp Asn Asp Arg Gly Ala Gly
785                 790                 795                 800
```

Tyr Pro Phe Glu Met Ala Gly Trp Lys Val Ala Gly Asn Tyr Ser Lys
            805                 810                 815

Val Thr Asp Thr Gln Ile Gln Ile Glu Asp Asp Ser Val Lys Val Thr
        820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
            885                 890                 895

Glu Ser Tyr Arg Asp Lys Leu Pro Gly Ala Tyr Leu Gly Arg Tyr Glu
        900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
            965                 970                 975

Leu Gln Glu Ser Asp Ala Thr Trp Ile Lys Val Leu Ala Ala Gln Met
        980                 985                 990

Gly Val Gly Gly Asp Asp Ser Trp Gly Ser Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 11
<211> LENGTH: 1026
<212> TYPE: PRT
<213> ORGANISM: Streptococcus thermophilus

<400> SEQUENCE: 11

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
            85                  90                  95

Val Asn Thr Gln Tyr Pro Trp Asp Gly Lys Glu Phe Leu Arg Pro Pro
        100                 105                 110

Gln Val Pro Gln Glu Ser Asn Ala Val Ala Ser Tyr Val Lys His Phe
    115                 120                 125

Thr Leu Asn Asp Ala Leu Lys Asp Lys Lys Val Phe Ile Ser Phe Gln
130                 135                 140

```
Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
                260                 265                 270

Val Asn Gly Asp Gly Glu Leu Ser Val Ser Leu Glu Asn Leu Lys Ile
            275                 280                 285

Lys Pro Trp Ser Ala Glu Ser Pro Lys Leu Tyr Asp Leu Ile Leu His
        290                 295                 300

Val Leu Asp Asp Asp Gln Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
                340                 345                 350

Gly Cys Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
        370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
                420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
        450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
            485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
        530                 535                 540

Cys Glu Tyr Met His Thr Met Gly Asn Ser Gly Gly Gly Leu Gln Leu
545                 550                 555                 560
```

```
Tyr Thr Asp Leu Glu Lys Tyr Pro Glu Tyr Gln Gly Gly Phe Ile Trp
            565                 570                 575

Asp Phe Ile Asp Gln Ala Ile Tyr Lys Thr Leu Pro Asn Gly Ser Glu
        580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
        610                 615                 620

Leu Gln Thr Val Lys His Leu Tyr Ser Asn Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Ala Thr Phe
            675                 680                 685

Pro Val Asn Phe Val Val Glu Ala Ser Asn Ser Glu Gln Ile Tyr Glu
        690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
                740                 745                 750

Ile Gln Gly Gln Asn Phe Ser Ile Leu Leu Ser Arg Ala Gln Asn Thr
                755                 760                 765

Leu Val Ser Ala Lys Tyr Asn Gly Ile Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
                835                 840                 845

Tyr Gln Val Asp Tyr Lys Gly Arg Ile Phe Val Thr Ala Asn Tyr Asp
            850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
```

```
                980             985             990
Gly Val Gly Gly Asp Ser Trp Gly Ser Pro Val His Asp Glu Phe
            995             1000            1005

Leu Leu Ser Ser Ala Asp Ser Tyr Gln Leu Ser Phe Met Ile Glu
            1010            1015            1020

Pro Leu Asn
        1025

<210> SEQ ID NO 12
<211> LENGTH: 1026
<212> TYPE: PRT
<213> ORGANISM: Streptococcus thermophilus

<400> SEQUENCE: 12

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
                20                  25                  30

Ser Leu Glu Glu Phe Ser Gly Glu Met Lys Leu Arg Gln Ser Leu
            35                  40                  45

Asn Gly Lys Trp Lys Ile His Tyr Ala Gln Asn Thr Asn Gln Val Leu
50                  55                  60

Lys Asp Phe Tyr Lys Thr Glu Phe Asp Glu Thr Asp Leu Asn Phe Ile
65              70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
        290                 295                 300

Val Leu Asp Asp Asp Gln Val Val Glu Val Val Pro Val Lys Val Gly
305                 310                 315                 320
```

```
Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
```

```
                   740                 745                 750
Ile Gln Gly Gln Asn Phe Ser Ile Leu Leu Ser Arg Ala Gln Asn Thr
                755                 760                 765

Leu Val Ser Ala Lys Tyr Asn Gly Val Glu Phe Ile Glu Lys Gly Pro
            770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
                835                 840                 845

Tyr Gln Val Asp Tyr Lys Gly Arg Ile Phe Val Thr Ala Asn Tyr Asp
            850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
                915                 920                 925

Gly Asn His Tyr Gly Thr Arg Glu Phe Thr Val Ser Asp Asp Asn His
            930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Ser Trp  Gly Ala Pro Val His  Asp Glu Phe
                995                 1000                1005

Leu Leu  Ser Ser Ala Asp Ser  Tyr Gln Leu Ser Phe  Met Ile Glu
    1010                1015                1020

Pro Leu  Asn
    1025

<210> SEQ ID NO 13
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 13

Met Asn Met Thr Glu Lys Ile Gln Thr Tyr Leu Asn Asp Pro Lys Ile
1                 5                  10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60
```

```
Lys Asp Phe Tyr Lys Thr Glu Phe Asp Glu Thr Asp Leu Asn Phe Ile
 65                  70                  75                  80

Asn Val Pro Gly His Leu Glu Leu Gln Gly Phe Gly Ser Pro Gln Tyr
                 85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
290                 295                 300

Val Leu Asp Asp Asp Gln Val Val Glu Val Val Pro Val Lys Val Gly
305                 310                 315                 320

Phe Arg Arg Phe Glu Ile Lys Asp Lys Leu Met Leu Asn Gly Lys
                325                 330                 335

Arg Ile Val Phe Lys Gly Val Asn Arg His Glu Phe Asn Ala Arg Thr
            340                 345                 350

Gly Xaa Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
450                 455                 460

Ile Ala Asp Met Ala Asp Tyr Phe Arg Ser Val Asp Asn Thr Arg Pro
465                 470                 475                 480
```

```
Val His Tyr Glu Gly Val Ala Trp Cys Arg Glu Phe Asp Tyr Ile Thr
                485                 490                 495
Asp Ile Glu Ser Arg Met Tyr Ala Lys Pro Ala Asp Ile Glu Glu Tyr
            500                 505                 510
Leu Thr Thr Gly Lys Leu Val Asp Leu Ser Ser Val Ser Asp Lys His
        515                 520                 525
Phe Ala Ser Gly Asn Leu Thr Asn Lys Pro Gln Lys Pro Tyr Ile Ser
    530                 535                 540
Cys Glu Tyr Met His Thr Met Gly Asn Ser Gly Gly Leu Gln Leu
545                 550                 555                 560
Tyr Thr Asp Leu Glu Lys Tyr Pro Glu Tyr Gln Gly Gly Phe Ile Trp
                565                 570                 575
Asp Phe Ile Asp Gln Ala Ile Tyr Lys Thr Leu Pro Asn Gly Ser Glu
            580                 585                 590
Phe Leu Ser Tyr Gly Gly Asp Trp His Asp Arg Pro Ser Asp Tyr Glu
        595                 600                 605
Phe Cys Gly Asn Gly Ile Val Phe Ala Asp Arg Thr Leu Thr Pro Lys
    610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
                645                 650                 655
Ala Tyr Thr Phe Leu Ala Arg Val Tyr Glu Asp Gly Arg Lys Val Ser
            660                 665                 670
Glu Ser Glu Tyr His Phe Asp Val Lys Pro Gly Glu Glu Ala Thr Phe
        675                 680                 685
Pro Val Asn Phe Val Val Glu Ala Ser Asn Ser Glu Gln Ile Tyr Glu
    690                 695                 700
Val Ala Cys Val Leu Arg Glu Ala Thr Glu Trp Ala Pro Lys Gly His
705                 710                 715                 720
Glu Ile Val Arg Gly Gln Tyr Val Val Glu Lys Ile Ser Thr Glu Thr
                725                 730                 735
Pro Val Lys Ala Pro Leu Asn Val Val Glu Gly Asp Phe Asn Ile Gly
            740                 745                 750
Ile Gln Gly Gln Asn Phe Ser Ile Leu Leu Ser Arg Ala Gln Asn Thr
        755                 760                 765
Leu Val Ser Ala Lys Tyr Asn Gly Val Glu Phe Ile Glu Lys Gly Pro
    770                 775                 780
Lys Leu Ser Phe Thr Arg Ala Tyr Thr Asp Asn Asp Arg Gly Ala Gly
785                 790                 795                 800
Tyr Pro Phe Glu Met Ala Gly Trp Lys Val Ala Gly Asn Tyr Ser Lys
                805                 810                 815
Val Thr Asp Thr Gln Ile Gln Ile Glu Asp Asp Ser Val Lys Val Thr
            820                 825                 830
Tyr Val His Glu Leu Pro Gly Leu Ser Asp Val Glu Val Lys Val Thr
        835                 840                 845
Tyr Gln Val Asp Tyr Lys Gly Arg Ile Phe Val Thr Ala Asn Tyr Asp
    850                 855                 860
Gly Lys Ala Gly Leu Pro Asn Phe Pro Glu Phe Gly Leu Glu Phe Ala
865                 870                 875                 880
Ile Gly Ser Gln Phe Thr Asn Leu Ser Tyr Tyr Gly Tyr Gly Ala Glu
                885                 890                 895
Glu Ser Tyr Arg Asp Lys Leu Pro Gly Ala Tyr Leu Gly Arg Tyr Glu
```

```
                900               905                910
Thr Ser Val Glu Lys Thr Phe Ala Pro Tyr Leu Met Pro Gln Glu Ser
            915               920                925

Gly Asn His Tyr Gly Thr Arg Glu Phe Thr Val Ser Asp Asp Asn His
        930               935                940

Asn Gly Leu Lys Phe Thr Ala Leu Asn Lys Ala Phe Glu Phe Ser Ala
945               950               955                960

Leu Arg Asn Ser Thr Glu Gln Ile Glu Asn Ala Arg His Gln Tyr Glu
                965               970                975

Leu Gln Glu Ser Asp Ala Thr Trp Ile Lys Val Leu Ala Ala Gln Met
            980               985                990

Gly Val Gly Gly Asp Asp Ser Trp  Gly Ala Pro Val His  Asp Glu Phe
        995               1000               1005

Leu Leu  Ser Ser Ala Asp Ser  Tyr Gln Leu Ser Phe  Met Ile Glu
    1010              1015              1020

Pro Leu  Asn
    1025

<210> SEQ ID NO 14
<211> LENGTH: 1026
<212> TYPE: PRT
<213> ORGANISM: Streptococcus thermophilus

<400> SEQUENCE: 14

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240
```

-continued

```
Asp Ile Asp Leu Lys Thr Val Gly Asp Tyr Glu Asp Lys Lys Ile Lys
            245                 250                 255

Tyr Val Leu Ser Asp Tyr Glu Gly Ile Val Thr Glu Gly Asp Ala Ser
        260                 265                 270

Val Asn Gly Asp Gly Glu Leu Ser Val Ser Leu Glu Asn Leu Lys Ile
    275                 280                 285

Lys Pro Trp Ser Ala Glu Ser Pro Lys Leu Tyr Asp Leu Ile Leu His
290                 295                 300

Val Leu Asp Asp Asp Gln Val Val Glu Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Cys Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
```

```
                660                 665                 670
Glu Ser Glu Tyr His Phe Asp Val Lys Pro Gly Glu Ala Thr Phe
        675                 680                 685

Pro Val Asn Phe Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
    770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Ser Trp Gly Ala Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 15
<211> LENGTH: 1026
<212> TYPE: PRT
<213> ORGANISM: Streptococcus thermophilus

<400> SEQUENCE: 15
```

```
Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
290                 295                 300

Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
```

```
                420             425             430
Cys Leu Asp Arg Ala Asn Asn Met Phe Gln Arg Asp Lys Asn His Ala
            435             440             445
Ser Val Ile Ile Trp Ser Cys Gly Asn Glu Ser Tyr Ala Gly Lys Asp
            450             455             460
Ile Ala Asp Met Ala Asp Tyr Phe Arg Ser Val Asp Asn Thr Arg Pro
465             470             475             480
Val His Tyr Glu Gly Val Ala Trp Cys Arg Glu Phe Asp Tyr Ile Thr
                485             490             495
Asp Ile Glu Ser Arg Met Tyr Ala Lys Pro Ala Asp Ile Glu Glu Tyr
            500             505             510
Leu Thr Thr Gly Lys Leu Val Asp Leu Ser Ser Val Ser Asp Lys His
            515             520             525
Phe Ala Ser Gly Asn Leu Thr Asn Lys Pro Gln Lys Pro Tyr Ile Ser
            530             535             540
Cys Glu Tyr Met His Thr Met Gly Asn Ser Gly Gly Leu Gln Leu
545             550             555             560
Tyr Thr Asp Leu Glu Lys Tyr Pro Glu Tyr Gln Gly Gly Phe Ile Trp
                565             570             575
Asp Phe Ile Asp Gln Ala Ile Tyr Lys Thr Leu Pro Asn Gly Ser Glu
            580             585             590
Phe Leu Ser Tyr Gly Gly Asp Trp His Asp Arg Pro Ser Asp Tyr Glu
            595             600             605
Phe Cys Gly Asn Gly Ile Val Phe Ala Asp Arg Thr Leu Thr Pro Lys
            610             615             620
Leu Gln Thr Val Lys His Leu Tyr Ser Asn Ile Lys Ile Ala Val Asp
625             630             635             640
Glu Lys Ser Val Thr Ile Lys Asn Asp Asn Leu Phe Glu Asp Leu Ser
                645             650             655
Ala Tyr Thr Phe Leu Ala Arg Val Tyr Glu Asp Gly Arg Lys Val Ser
            660             665             670
Glu Ser Glu Tyr His Phe Asp Val Lys Pro Gly Glu Glu Ala Thr Phe
            675             680             685
Pro Val Asn Phe Val Val Glu Ala Ser Asn Ser Glu Gln Ile Tyr Glu
            690             695             700
Val Ala Cys Val Leu Arg Glu Ala Thr Lys Trp Ala Pro Lys Gly His
705             710             715             720
Glu Ile Val Arg Gly Gln Tyr Val Val Glu Lys Ile Ser Thr Glu Thr
                725             730             735
Pro Val Lys Ala Pro Leu Asn Val Val Glu Gly Asp Phe Asn Ile Gly
            740             745             750
Ile Gln Gly Gln Asn Phe Ser Ile Leu Leu Ser Arg Ala Gln Asn Thr
            755             760             765
Leu Val Ser Ala Lys Tyr Asn Gly Val Glu Phe Ile Glu Lys Gly Pro
            770             775             780
Lys Leu Ser Phe Thr Arg Ala Tyr Thr Asp Asn Asp Arg Gly Ala Gly
785             790             795             800
Tyr Pro Phe Glu Met Ala Gly Trp Lys Val Ala Gly Asn Tyr Ser Lys
                805             810             815
Val Thr Asp Thr Gln Ile Gln Ile Glu Asp Asp Ser Val Lys Val Thr
            820             825             830
Tyr Val His Glu Leu Pro Gly Leu Ser Asp Val Glu Val Lys Val Thr
            835             840             845
```

-continued

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp  Gly Ala Pro Val His  Asp Glu Phe
            995                 1000                1005

Leu Leu  Ser Ser Ala Asp Ser  Tyr Gln Leu Ser Phe  Met Ile Glu
    1010                1015                1020

Pro Leu  Asn
    1025

<210> SEQ ID NO 16
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 16

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
165                     170                     175

Leu Val Glu Gly Asp Asn Lys Leu Ala Val Ala Val Tyr Arg Tyr Ser
        180                     185                     190

Thr Ala Ser Trp Leu Glu Asp Gln Asp Phe Trp Arg Leu Tyr Gly Ile
        195                     200                     205

Phe Arg Asp Val Tyr Leu Tyr Ala Ile Pro Lys Val His Val Gln Asp
210                     215                     220

Leu Phe Val Lys Gly Tyr Asp Tyr Gln Thr Lys Ala Gly Gln Leu
225                     230                     235                     240

Asp Ile Asp Leu Lys Thr Val Gly Asp Tyr Glu Asp Lys Lys Ile Lys
                245                     250                     255

Tyr Val Leu Ser Asp Tyr Glu Gly Ile Val Thr Glu Gly Asp Ala Ser
                260                     265                     270

Val Asn Gly Asp Gly Glu Leu Ser Val Ser Leu Glu Asn Leu Lys Ile
        275                     280                     285

Lys Pro Trp Ser Ala Glu Ser Pro Lys Leu Tyr Asp Leu Ile Leu His
        290                     295                     300

Val Leu Asp Asp Asp Gln Val Val Glu Val Val Pro Val Lys Val Gly
305                     310                     315                     320

Phe Arg Arg Phe Glu Ile Lys Asp Lys Leu Met Leu Asn Gly Lys
                325                     330                     335

Arg Ile Val Phe Lys Gly Val Asn Arg His Glu Phe Asn Ala Arg Thr
                340                     345                     350

Gly Xaa Cys Ile Thr Glu Glu Asp Met Leu Trp Asp Ile Lys Val Met
        355                     360                     365

Lys Gln His Asn Ile Asn Ala Val Arg Thr Ser His Tyr Pro Asn Gln
        370                     375                     380

Thr Arg Trp Tyr Glu Leu Cys Asp Glu Tyr Gly Leu Tyr Val Ile Asp
385                     390                     395                     400

Glu Ala Asn Leu Glu Thr His Gly Thr Trp Gln Lys Leu Gly Leu Cys
                405                     410                     415

Glu Pro Ser Trp Asn Ile Pro Ala Ser Glu Pro Glu Trp Leu Pro Ala
                420                     425                     430

Cys Leu Asp Arg Ala Asn Asn Met Phe Gln Arg Asp Lys Asn His Ala
        435                     440                     445

Ser Val Ile Ile Trp Ser Cys Gly Asn Glu Ser Tyr Ala Gly Lys Asp
        450                     455                     460

Ile Ala Asp Met Ala Asp Tyr Phe Arg Ser Val Asp Asn Thr Arg Pro
465                     470                     475                     480

Val His Tyr Glu Gly Val Ala Trp Cys Arg Glu Phe Asp Tyr Ile Thr
                485                     490                     495

Asp Ile Glu Ser Arg Met Tyr Ala Lys Pro Ala Asp Ile Glu Glu Tyr
                500                     505                     510

Leu Thr Thr Gly Lys Leu Val Asp Leu Ser Ser Val Ser Asp Lys His
        515                     520                     525

Phe Ala Ser Gly Asn Leu Thr Asn Lys Pro Gln Lys Pro Tyr Ile Ser
        530                     535                     540

Cys Glu Tyr Met His Thr Met Gly Asn Ser Gly Gly Gly Leu Gln Leu
545                     550                     555                     560

Tyr Thr Asp Leu Glu Lys Tyr Pro Glu Tyr Gln Gly Gly Phe Ile Trp
                565                     570                     575

Asp Phe Ile Asp Gln Ala Ile Tyr Lys Thr Leu Pro Asn Gly Ser Glu

-continued

```
            580                 585                 590
Phe Leu Ser Tyr Gly Gly Asp Trp His Asp Arg Pro Ser Asp Tyr Glu
            595                 600                 605
Phe Cys Gly Asn Gly Ile Val Phe Ala Asp Arg Thr Leu Thr Pro Lys
            610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
                645                 650                 655
Ala Tyr Thr Phe Leu Ala Arg Val Tyr Glu Asp Gly Arg Lys Val Ser
            660                 665                 670
Glu Ser Glu Tyr His Phe Asp Val Lys Pro Gly Glu Ala Thr Phe
            675                 680                 685
Pro Val Asn Phe Val Val Glu Ala Ser Asn Ser Glu Gln Ile Tyr Glu
            690                 695                 700
Val Ala Cys Val Leu Arg Glu Ala Thr Lys Trp Ala Pro Lys Gly His
705                 710                 715                 720
Glu Ile Val Arg Gly Gln Tyr Val Val Glu Lys Ile Ser Thr Glu Thr
                725                 730                 735
Pro Val Lys Ala Pro Leu Asn Val Val Glu Gly Asp Phe Asn Ile Gly
            740                 745                 750
Ile Gln Gly Gln Asn Phe Ser Ile Leu Leu Ser Arg Ala Gln Asn Thr
                755                 760                 765
Leu Val Ser Ala Lys Tyr Asn Gly Val Glu Phe Ile Glu Lys Gly Pro
770                 775                 780
Lys Leu Ser Phe Thr Arg Ala Tyr Thr Asp Asn Asp Arg Gly Ala Gly
785                 790                 795                 800
Tyr Pro Phe Glu Met Ala Gly Trp Lys Val Ala Gly Asn Tyr Ser Lys
                805                 810                 815
Val Thr Asp Thr Gln Ile Gln Ile Glu Asp Asp Ser Val Lys Val Thr
                820                 825                 830
Tyr Val His Glu Leu Pro Gly Leu Ser Asp Val Glu Val Lys Val Thr
                835                 840                 845
Tyr Gln Val Asp Tyr Lys Gly Arg Ile Phe Val Thr Ala Asn Tyr Asp
            850                 855                 860
Gly Lys Ala Gly Leu Pro Asn Phe Pro Glu Phe Gly Leu Glu Phe Ala
865                 870                 875                 880
Ile Gly Ser Gln Phe Thr Asn Leu Ser Tyr Tyr Gly Tyr Gly Ala Glu
                885                 890                 895
Glu Ser Tyr Arg Asp Lys Leu Pro Gly Ala Tyr Leu Gly Arg Tyr Glu
            900                 905                 910
Thr Ser Val Glu Lys Thr Phe Ala Pro Tyr Leu Met Pro Gln Glu Ser
            915                 920                 925
Gly Asn His Tyr Gly Thr Arg Glu Phe Thr Val Ser Asp Asp Asn His
            930                 935                 940
Asn Gly Leu Lys Phe Thr Ala Leu Asn Lys Ala Phe Glu Phe Ser Ala
945                 950                 955                 960
Leu Arg Asn Ser Thr Glu Gln Ile Glu Asn Ala Arg His Gln Tyr Glu
                965                 970                 975
Leu Gln Glu Ser Asp Ala Thr Trp Ile Lys Val Leu Ala Ala Gln Met
            980                 985                 990
Gly Val Gly Gly Asp Asp Thr Trp  Gly Ala Pro Val His  Asp Glu Phe
            995                     1000                    1005
```

-continued

Leu Leu Ser Ser Ala Asp Ser Tyr Gln Leu Ser Phe Met Ile Glu
    1010            1015                1020

Pro Leu Asn
    1025

<210> SEQ ID NO 17
<211> LENGTH: 1026
<212> TYPE: PRT
<213> ORGANISM: Streptococcus thermophilus

<400> SEQUENCE: 17

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr

```
               340           345           350
Gly Cys Cys Ile Thr Glu Glu Asp Met Leu Trp Asp Ile Lys Val Met
            355               360               365
Lys Gln His Asn Ile Asn Ala Val Arg Thr Ser His Tyr Pro Asn Gln
        370               375               380
Thr Arg Trp Tyr Glu Leu Cys Asp Glu Tyr Gly Leu Tyr Val Ile Asp
385               390               395               400
Glu Ala Asn Leu Glu Thr His Gly Thr Trp Gln Lys Leu Gly Leu Cys
                405               410               415
Glu Pro Ser Trp Asn Ile Pro Ala Ser Glu Pro Glu Trp Leu Pro Ala
            420               425               430
Cys Leu Asp Arg Ala Asn Asn Met Phe Gln Arg Asp Lys Asn His Ala
        435               440               445
Ser Val Ile Ile Trp Ser Cys Gly Asn Glu Ser Tyr Ala Gly Lys Asp
    450               455               460
Ile Ala Asp Met Ala Asp Tyr Phe Arg Ser Val Asp Asn Thr Arg Pro
465               470               475               480
Val His Tyr Glu Gly Val Ala Trp Cys Arg Glu Phe Asp Tyr Ile Thr
                485               490               495
Asp Ile Glu Ser Arg Met Tyr Ala Lys Pro Ala Asp Ile Glu Glu Tyr
            500               505               510
Leu Thr Thr Gly Lys Leu Val Asp Leu Ser Ser Val Ser Asp Lys His
        515               520               525
Phe Ala Ser Gly Asn Leu Thr Asn Lys Pro Gln Lys Pro Tyr Ile Ser
    530               535               540
Cys Glu Tyr Met His Thr Met Gly Asn Ser Gly Gly Gly Leu Gln Leu
545               550               555               560
Tyr Thr Asp Leu Glu Lys Tyr Pro Glu Tyr Gln Gly Gly Phe Ile Trp
                565               570               575
Asp Phe Ile Asp Gln Ala Ile Tyr Lys Thr Leu Pro Asn Gly Ser Glu
            580               585               590
Phe Leu Ser Tyr Gly Gly Asp Trp His Asp Arg Pro Ser Asp Tyr Glu
        595               600               605
Phe Cys Gly Asn Gly Ile Val Phe Ala Asp Arg Thr Leu Thr Pro Lys
    610               615               620
Leu Gln Thr Val Lys His Leu Tyr Ser Asn Ile Lys Ile Ala Val Asp
625               630               635               640
Glu Lys Ser Val Thr Ile Lys Asn Asp Asn Leu Phe Glu Asp Leu Ser
                645               650               655
Ala Tyr Thr Phe Leu Ala Arg Val Tyr Glu Asp Gly Arg Lys Val Ser
            660               665               670
Glu Ser Glu Tyr His Phe Asp Val Lys Pro Gly Glu Glu Ala Thr Phe
        675               680               685
Pro Val Asn Phe Val Val Glu Ala Ser Asn Ser Glu Gln Ile Tyr Glu
    690               695               700
Val Ala Cys Val Leu Arg Glu Ala Thr Lys Trp Ala Pro Lys Gly His
705               710               715               720
Glu Ile Val Arg Gly Gln Tyr Val Glu Lys Ile Ser Thr Glu Thr
                725               730               735
Pro Val Lys Ala Pro Leu Asn Val Val Glu Gly Asp Phe Asn Ile Gly
            740               745               750
Ile Gln Gly Gln Asn Phe Ser Ile Leu Leu Ser Arg Ala Gln Asn Thr
        755               760               765
```

```
Leu Val Ser Ala Lys Tyr Asn Gly Val Glu Phe Ile Glu Lys Gly Pro
    770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                    805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
                900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
                980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 18
<211> LENGTH: 1026
<212> TYPE: PRT
<213> ORGANISM: Streptococcus thermophilus

<400> SEQUENCE: 18

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
                20                  25                  30

Ser Leu Glu Glu Phe Ser Glu Gly Glu Met Lys Leu Arg Gln Ser Leu
            35                  40                  45

Asn Gly Lys Trp Lys Ile His Tyr Ala Gln Asn Thr Asn Gln Val Leu
        50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
```

```
                100              105                 110
        Gln Val Pro Gln Glu Ser Asn Ala Val Ala Ser Tyr Val Lys His Phe
                    115                 120                 125
        Thr Leu Asn Asp Ala Leu Lys Asp Lys Lys Val Phe Ile Ser Phe Gln
                    130                 135                 140
        Gly Val Ala Thr Ser Ile Phe Val Trp Val Asn Gly Asn Phe Val Gly
        145                 150                 155                 160
        Tyr Ser Glu Asp Ser Phe Thr Pro Ser Glu Phe Glu Ile Ser Asp Tyr
                            165                 170                 175
        Leu Val Glu Gly Asp Asn Lys Leu Ala Val Ala Val Tyr Arg Tyr Ser
                        180                 185                 190
        Thr Ala Ser Trp Leu Glu Asp Gln Asp Phe Trp Arg Leu Tyr Gly Ile
                        195                 200                 205
        Phe Arg Asp Val Tyr Leu Tyr Ala Ile Pro Lys Val His Val Gln Asp
                    210                 215                 220
        Leu Phe Val Lys Gly Asp Tyr Asp Tyr Gln Thr Lys Ala Gly Gln Leu
        225                 230                 235                 240
        Asp Ile Asp Leu Lys Thr Val Gly Asp Tyr Glu Asp Lys Lys Ile Lys
                            245                 250                 255
        Tyr Val Leu Ser Asp Tyr Glu Gly Ile Val Thr Glu Gly Asp Ala Ser
                        260                 265                 270
        Val Asn Gly Asp Gly Glu Leu Ser Val Ser Leu Glu Asn Leu Lys Ile
                        275                 280                 285
        Lys Pro Trp Ser Ala Glu Ser Pro Lys Leu Tyr Asp Leu Ile Leu His
                    290                 295                 300
        Val Leu Asp Asp Asp Gln Val Glu Val Val Pro Val Lys Val Gly
        305                 310                 315                 320
        Phe Arg Arg Phe Glu Ile Lys Asp Lys Leu Met Leu Leu Asn Gly Lys
                            325                 330                 335
        Arg Ile Val Phe Lys Gly Val Asn Arg His Glu Phe Asn Ala Arg Thr
                        340                 345                 350
        Gly Arg Cys Ile Thr Glu Glu Asp Met Leu Trp Asp Ile Lys Val Met
                        355                 360                 365
        Lys Gln His Asn Ile Asn Ala Val Arg Thr Ser His Tyr Pro Asn Gln
                    370                 375                 380
        Thr Arg Trp Tyr Glu Leu Cys Asp Glu Tyr Gly Leu Tyr Val Ile Asp
        385                 390                 395                 400
        Glu Ala Asn Leu Glu Thr His Gly Thr Trp Gln Lys Leu Gly Leu Cys
                            405                 410                 415
        Glu Pro Ser Trp Asn Ile Pro Ala Ser Glu Pro Glu Trp Leu Pro Ala
                        420                 425                 430
        Cys Leu Asp Arg Ala Asn Asn Met Phe Gln Arg Asp Lys Asn His Ala
                        435                 440                 445
        Ser Val Ile Ile Trp Ser Cys Gly Asn Glu Ser Tyr Ala Gly Lys Asp
                    450                 455                 460
        Ile Ala Asp Met Ala Asp Tyr Phe Arg Ser Val Asp Asn Thr Arg Pro
        465                 470                 475                 480
        Val His Tyr Glu Gly Val Ala Trp Cys Arg Glu Phe Tyr Ile Thr
                            485                 490                 495
        Asp Ile Glu Ser Arg Met Tyr Ala Lys Pro Ala Asp Ile Glu Glu Tyr
                        500                 505                 510
        Leu Thr Thr Gly Lys Leu Val Asp Leu Ser Ser Val Ser Asp Lys His
                        515                 520                 525
```

```
Phe Ala Ser Gly Asn Leu Thr Asn Lys Pro Gln Lys Pro Phe Ile Ser
            530                 535                 540
Cys Glu Tyr Met His Thr Met Gly Asn Ser Gly Gly Gly Leu Gln Leu
545                 550                 555                 560
Tyr Thr Asp Leu Glu Lys Tyr Pro Glu Tyr Gln Gly Gly Phe Ile Trp
            565                 570                 575
Asp Phe Ile Asp Gln Ala Ile Tyr Lys Thr Leu Pro Asn Gly Ser Glu
            580                 585                 590
Phe Leu Ser Tyr Gly Gly Asp Trp His Asp Arg Pro Ser Asp Tyr Glu
            595                 600                 605
Phe Cys Gly Asn Gly Ile Val Phe Ala Asp Arg Thr Leu Thr Pro Lys
            610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
            645                 650                 655
Ala Tyr Thr Phe Leu Ala Arg Val Tyr Glu Asp Gly Arg Lys Val Ser
            660                 665                 670
Glu Ser Glu Tyr His Phe Asp Val Lys Pro Gly Glu Glu Ala Thr Phe
            675                 680                 685
Pro Val Asn Phe Val Val Glu Ala Ser Asn Ser Glu Gln Ile Tyr Glu
            690                 695                 700
Val Ala Cys Val Leu Arg Glu Ala Thr Glu Trp Ala Pro Lys Gly His
705                 710                 715                 720
Glu Ile Val Arg Gly Gln Tyr Val Val Glu Lys Ile Ser Thr Glu Thr
            725                 730                 735
Pro Val Lys Ala Pro Leu Asn Val Val Glu Gly Asp Phe Asn Ile Gly
            740                 745                 750
Ile Gln Gly Gln Asn Phe Ser Ile Leu Leu Ser Arg Ala Gln Asn Thr
            755                 760                 765
Leu Val Ser Ala Lys Tyr Asn Gly Val Glu Phe Ile Glu Lys Gly Pro
770                 775                 780
Lys Leu Ser Phe Thr Arg Ala Tyr Thr Asp Asn Asp Arg Gly Ala Gly
785                 790                 795                 800
Tyr Pro Phe Glu Met Ala Gly Trp Lys Val Ala Gly Asn Tyr Ser Lys
            805                 810                 815
Val Thr Asp Thr Gln Ile Gln Ile Glu Asp Asp Ser Val Lys Val Thr
            820                 825                 830
Tyr Val His Glu Leu Pro Gly Leu Ser Asp Val Glu Val Lys Val Thr
            835                 840                 845
Tyr Gln Val Asp Tyr Lys Gly Arg Ile Phe Val Thr Ala Asn Tyr Asp
            850                 855                 860
Gly Lys Ala Gly Leu Pro Asn Phe Pro Glu Phe Gly Leu Glu Phe Ala
865                 870                 875                 880
Ile Gly Ser Gln Phe Thr Asn Leu Ser Tyr Tyr Gly Tyr Gly Ala Glu
            885                 890                 895
Glu Ser Tyr Arg Asp Lys Leu Pro Gly Ala Tyr Leu Gly Arg Tyr Glu
            900                 905                 910
Thr Ser Val Glu Lys Thr Phe Ala Pro Tyr Leu Met Pro Gln Glu Ser
            915                 920                 925
Gly Asn His Tyr Gly Thr Arg Glu Phe Thr Val Ser Asp Asp Asn His
            930                 935                 940
```

```
Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
            965                 970                 975

Leu Gln Glu Ser Asp Ala Thr Trp Ile Lys Val Leu Ala Ala Gln Met
        980                 985                 990

Gly Val Gly Gly Asp Asp Thr Trp Gly Ala Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 19
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 19

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
                20                  25                  30

Ser Leu Glu Glu Phe Ser Glu Gly Glu Met Lys Leu Arg Gln Ser Leu
            35                  40                  45

Asn Gly Lys Trp Lys Ile His Tyr Ala Gln Asn Thr Asn Gln Val Leu
        50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
                100                 105                 110

Gln Val Pro Gln Glu Ser Asn Ala Val Ala Ser Tyr Val Lys His Phe
            115                 120                 125

Thr Leu Asn Asp Ala Leu Lys Asp Lys Val Phe Ile Ser Phe Gln
        130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
```

```
                    260                 265                 270
Val Asn Gly Asp Gly Glu Leu Ser Val Ser Leu Glu Asn Leu Lys Ile
                275                 280                 285
Lys Pro Trp Ser Ala Glu Ser Pro Lys Leu Tyr Asp Leu Ile Leu His
            290                 295                 300
Val Leu Asp Asp Asp Gln Val Val Glu Val Pro Val Lys Val Gly
305                 310                 315                 320
Phe Arg Arg Phe Glu Ile Lys Asp Lys Leu Met Leu Leu Asn Gly Lys
                325                 330                 335
Arg Ile Val Phe Lys Gly Val Asn Arg His Glu Phe Asn Ala Arg Thr
            340                 345                 350
Gly Xaa Cys Ile Thr Glu Glu Asp Met Leu Trp Asp Ile Lys Val Met
        355                 360                 365
Lys Gln His Asn Ile Asn Ala Val Arg Thr Ser His Tyr Pro Asn Gln
    370                 375                 380
Thr Arg Trp Tyr Glu Leu Cys Asp Glu Tyr Gly Leu Tyr Val Ile Asp
385                 390                 395                 400
Glu Ala Asn Leu Glu Thr His Gly Thr Trp Gln Lys Leu Gly Leu Cys
                405                 410                 415
Glu Pro Ser Trp Asn Ile Pro Ala Ser Glu Pro Glu Trp Leu Pro Ala
            420                 425                 430
Cys Leu Asp Arg Ala Asn Asn Met Phe Gln Arg Asp Lys Asn His Ala
        435                 440                 445
Ser Val Ile Ile Trp Ser Cys Gly Asn Glu Ser Tyr Ala Gly Lys Asp
    450                 455                 460
Ile Ala Asp Met Ala Asp Tyr Phe Arg Ser Val Asp Asn Thr Arg Pro
465                 470                 475                 480
Val His Tyr Glu Gly Val Ala Trp Cys Arg Glu Phe Asp Tyr Ile Thr
                485                 490                 495
Asp Ile Glu Ser Arg Met Tyr Ala Lys Pro Ala Asp Ile Glu Glu Tyr
            500                 505                 510
Leu Thr Thr Gly Lys Leu Val Asp Leu Ser Ser Val Ser Asp Lys His
        515                 520                 525
Phe Ala Ser Gly Asn Leu Thr Asn Lys Pro Gln Lys Pro Phe Ile Ser
    530                 535                 540
Cys Glu Tyr Met His Thr Met Gly Asn Ser Gly Gly Gly Leu Gln Leu
545                 550                 555                 560
Tyr Thr Asp Leu Glu Lys Tyr Pro Glu Tyr Gln Gly Gly Phe Ile Trp
                565                 570                 575
Asp Phe Ile Asp Gln Ala Ile Tyr Lys Thr Leu Pro Asn Gly Ser Glu
            580                 585                 590
Phe Leu Ser Tyr Gly Gly Asp Trp His Asp Arg Pro Ser Asp Tyr Glu
        595                 600                 605
Phe Cys Gly Asn Gly Ile Val Phe Ala Asp Arg Thr Leu Thr Pro Lys
    610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
                645                 650                 655
Ala Tyr Thr Phe Leu Ala Arg Val Tyr Glu Asp Gly Arg Lys Val Ser
            660                 665                 670
Glu Ser Glu Tyr His Phe Asp Val Lys Pro Gly Glu Glu Ala Thr Phe
        675                 680                 685
```

Pro Val Asn Phe Val Glu Ala Ser Asn Ser Glu Gln Ile Tyr Glu
    690             695                 700

Val Ala Cys Val Leu Arg Glu Ala Thr Glu Trp Ala Pro Lys Gly His
705             710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
    770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 20
<211> LENGTH: 1026
<212> TYPE: PRT
<213> ORGANISM: Streptococcus thermophilus

<400> SEQUENCE: 20

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu

-continued

```
                20                  25                  30
Ser Leu Glu Glu Phe Ser Glu Gly Glu Met Lys Leu Arg Gln Ser Leu
                35                  40                  45
Asn Gly Lys Trp Lys Ile His Tyr Ala Gln Asn Thr Asn Gln Val Leu
            50                  55                  60
Lys Asp Phe Tyr Lys Thr Glu Phe Asp Glu Thr Asp Leu Asn Phe Ile
65                  70                  75                  80
Asn Val Pro Gly His Leu Glu Leu Gln Gly Phe Gly Ser Pro Gln Tyr
                85                  90                  95
Val Asn Thr Gln Tyr Pro Trp Asp Gly Lys Glu Phe Leu Arg Pro Pro
            100                 105                 110
Gln Val Pro Gln Glu Ser Asn Ala Val Ala Ser Tyr Val Lys His Phe
        115                 120                 125
Thr Leu Asn Asp Ala Leu Lys Asp Lys Val Phe Ile Ser Phe Gln
        130                 135                 140
Gly Val Ala Thr Ser Ile Phe Val Trp Val Asn Gly Asn Phe Val Gly
145                 150                 155                 160
Tyr Ser Glu Asp Ser Phe Thr Pro Ser Glu Phe Glu Ile Ser Asp Tyr
                165                 170                 175
Leu Val Glu Gly Asp Asn Lys Leu Ala Val Ala Val Tyr Arg Tyr Ser
            180                 185                 190
Thr Ala Ser Trp Leu Glu Asp Gln Asp Phe Trp Arg Leu Tyr Gly Ile
        195                 200                 205
Phe Arg Asp Val Tyr Leu Tyr Ala Ile Pro Lys Val His Val Gln Asp
        210                 215                 220
Leu Phe Val Lys Gly Asp Tyr Asp Tyr Gln Thr Lys Ala Gly Gln Leu
225                 230                 235                 240
Asp Ile Asp Leu Lys Thr Val Gly Asp Tyr Glu Asp Lys Lys Ile Lys
                245                 250                 255
Tyr Val Leu Ser Asp Tyr Glu Gly Ile Val Thr Glu Gly Asp Ala Ser
            260                 265                 270
Val Asn Gly Asp Gly Glu Leu Ser Val Ser Leu Glu Asn Leu Lys Ile
        275                 280                 285
Lys Pro Trp Ser Ala Glu Ser Pro Lys Leu Tyr Asp Leu Ile Leu His
        290                 295                 300
Val Leu Asp Asp Gln Val Val Glu Val Val Pro Val Lys Val Gly
305                 310                 315                 320
Phe Arg Arg Phe Glu Ile Lys Asp Lys Leu Met Leu Asn Gly Lys
                325                 330                 335
Arg Ile Val Phe Lys Gly Val Asn Arg His Glu Phe Asn Ala Arg Thr
            340                 345                 350
Gly Cys Cys Ile Thr Glu Glu Asp Met Leu Trp Asp Ile Lys Val Met
        355                 360                 365
Lys Gln His Asn Ile Asn Ala Val Arg Thr Ser His Tyr Pro Asn Gln
        370                 375                 380
Thr Arg Trp Tyr Glu Leu Cys Asp Glu Tyr Gly Leu Tyr Val Ile Asp
385                 390                 395                 400
Glu Ala Asn Leu Glu Thr His Gly Thr Trp Gln Lys Leu Gly Leu Cys
                405                 410                 415
Glu Pro Ser Trp Asn Ile Pro Ala Ser Glu Pro Glu Trp Leu Pro Ala
            420                 425                 430
Cys Leu Asp Arg Ala Asn Asn Met Phe Gln Arg Asp Lys Asn His Ala
        435                 440                 445
```

```
Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
                515                 520                 525

Phe Ala Ser Gly Asn Leu Thr Asn Lys Pro Gln Lys Pro Phe Ile Ser
530                 535                 540

Cys Glu Tyr Met His Thr Met Gly Asn Ser Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
                580                 585                 590

Phe Leu Ser Tyr Gly Gly Asp Trp His Asp Arg Pro Ser Asp Tyr Glu
                595                 600                 605

Phe Cys Gly Asn Gly Ile Val Phe Ala Asp Arg Thr Leu Thr Pro Lys
                610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Ala Thr Phe
                675                 680                 685

Pro Val Asn Phe Val Val Glu Ala Ser Asn Ser Glu Gln Ile Tyr Glu
                690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
                740                 745                 750

Ile Gln Gly Gln Asn Phe Ser Ile Leu Leu Ser Arg Ala Gln Asn Thr
                755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
                835                 840                 845

Tyr Gln Val Asp Tyr Lys Gly Arg Ile Phe Val Thr Ala Asn Tyr Asp
                850                 855                 860
```

```
Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
        995                1000                1005

Leu Leu Ser Ser Ala Asp Ser Tyr Gln Leu Ser Phe Met Ile Glu
   1010                1015                1020

Pro Leu Asn
   1025

<210> SEQ ID NO 21
<211> LENGTH: 1026
<212> TYPE: PRT
<213> ORGANISM: Streptococcus thermophilus

<400> SEQUENCE: 21

Met Asn Met Thr Glu Lys Ile Gln Thr Tyr Leu Asn Asp Pro Lys Ile
1               5                  10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205
```

-continued

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

```
Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
            645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Ala Thr Phe
        675                 680                 685

Pro Val Asn Phe Val Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
                740                 745                 750

Ile Gln Gly Gln Asn Phe Ser Ile Leu Leu Ser Arg Ala Gln Asn Thr
            755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
                835                 840                 845

Tyr Gln Val Asp Tyr Lys Gly Arg Ile Phe Val Thr Ala Asn Tyr Asp
                850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
                900                 905                 910

Thr Ser Val Glu Lys Thr Phe Ala Pro Tyr Leu Met Pro Gln Glu Ser
                915                 920                 925

Gly Asn His Tyr Gly Thr Arg Glu Phe Thr Val Ser Asp Asp Asn His
                930                 935                 940

Asn Gly Leu Lys Phe Thr Ser Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025
```

```
<210> SEQ ID NO 22
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 22

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Xaa Cys Ile Thr Glu Glu Asp Met Leu Trp Asp Ile Lys Val Met
        355                 360                 365
```

```
Lys Gln His Asn Ile Asn Ala Val Arg Thr Ser His Tyr Pro Asn Gln
    370                 375                 380
Thr Arg Trp Tyr Glu Leu Cys Asp Glu Tyr Gly Leu Tyr Val Ile Asp
385                 390                 395                 400
Glu Ala Asn Leu Glu Thr His Gly Thr Trp Gln Lys Leu Gly Leu Cys
                    405                 410                 415
Glu Pro Ser Trp Asn Ile Pro Ala Ser Glu Pro Glu Trp Leu Pro Ala
                420                 425                 430
Cys Leu Asp Arg Ala Asn Asn Met Phe Gln Arg Asp Lys Asn His Ala
            435                 440                 445
Ser Val Ile Ile Trp Ser Cys Gly Asn Glu Ser Tyr Ala Gly Lys Asp
    450                 455                 460
Ile Ala Asp Met Ala Asp Tyr Phe Arg Ser Val Asp Asn Thr Arg Pro
465                 470                 475                 480
Val His Tyr Glu Gly Val Ala Trp Cys Arg Glu Phe Asp Tyr Ile Thr
                    485                 490                 495
Asp Ile Glu Ser Arg Met Tyr Ala Lys Pro Ala Asp Ile Glu Glu Tyr
                500                 505                 510
Leu Thr Thr Gly Lys Leu Val Asp Leu Ser Ser Val Ser Asp Lys His
            515                 520                 525
Phe Ala Ser Gly Asn Leu Thr Asn Lys Pro Gln Lys Pro Tyr Ile Ser
    530                 535                 540
Cys Glu Tyr Met His Thr Met Gly Asn Ser Gly Gly Gly Leu Gln Leu
545                 550                 555                 560
Tyr Thr Asp Leu Glu Lys Tyr Pro Glu Tyr Gln Gly Gly Phe Ile Trp
                    565                 570                 575
Asp Phe Ile Asp Gln Ala Ile Tyr Lys Thr Leu Pro Asn Gly Ser Glu
                580                 585                 590
Phe Leu Ser Tyr Gly Gly Asp Trp His Asp Arg Pro Ser Asp Tyr Glu
            595                 600                 605
Phe Cys Gly Asn Gly Ile Val Phe Ala Asp Arg Thr Leu Thr Pro Lys
    610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
                    645                 650                 655
Ala Tyr Thr Phe Leu Ala Arg Val Tyr Glu Asp Gly Arg Lys Val Ser
                660                 665                 670
Glu Ser Glu Tyr His Phe Asp Val Lys Pro Gly Glu Glu Ala Thr Phe
            675                 680                 685
Pro Val Asn Phe Val Val Glu Ala Ser Asn Ser Glu Gln Ile Tyr Glu
    690                 695                 700
Val Ala Cys Val Leu Arg Glu Ala Thr Glu Trp Ala Pro Lys Gly His
705                 710                 715                 720
Glu Ile Val Arg Gly Gln Tyr Val Val Glu Lys Ile Ser Thr Glu Thr
                    725                 730                 735
Pro Val Lys Ala Pro Leu Asn Val Val Glu Gly Asp Phe Asn Ile Gly
                740                 745                 750
Ile Gln Gly Gln Asn Phe Ser Ile Leu Leu Ser Arg Ala Gln Asn Thr
            755                 760                 765
Leu Val Ser Ala Lys Tyr Asn Gly Val Glu Phe Ile Glu Lys Gly Pro
    770                 775                 780
```

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
            805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
930                 935                 940

Asn Gly Leu Lys Phe Thr Ser Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 23
<211> LENGTH: 1026
<212> TYPE: PRT
<213> ORGANISM: Streptococcus thermophilus

<400> SEQUENCE: 23

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

```
Thr Leu Asn Asp Ala Leu Lys Asp Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
            165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
            195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
    275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Cys Cys Ile Thr Glu Glu Asp Met Leu Trp Asp Ile Lys Val Met
            355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
            405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
            435                 440                 445

Ser Val Ile Ile Trp Ser Cys Gly Asn Glu Ser Tyr Ala Gly Lys Asp
450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
            485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
            515                 520                 525

Phe Ala Ser Gly Asn Leu Thr Asn Lys Pro Gln Lys Pro Tyr Ile Ser
530                 535                 540
```

```
Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
            565                 570                 575

Asp Phe Ile Asp Gln Ala Ile Tyr Lys Thr Leu Pro Asn Gly Ser Glu
                580                 585                 590

Phe Leu Ser Tyr Gly Gly Asp Trp His Asp Arg Pro Ser Asp Tyr Glu
            595                 600                 605

Phe Cys Gly Asn Gly Ile Val Phe Ala Asp Arg Thr Leu Thr Pro Lys
        610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
930                 935                 940

Asn Gly Leu Lys Phe Thr Ser Leu Asn Lys Ala Phe Glu Phe Ser Ala
945                 950                 955                 960

Leu Arg Asn Ser Thr Glu Gln Ile Glu Asn Ala Arg His Gln Tyr Glu
```

```
                    965                 970                 975
Leu Gln Glu Ser Asp Ala Thr Trp Ile Lys Val Leu Ala Ala Gln Met
                980                 985                 990

Gly Val Gly Gly Asp Asp Thr Trp Gly Ala Pro Val His Asp Glu Phe
            995                1000                1005

Leu Leu Ser Ser Ala Asp Ser Tyr Gln Leu Ser Phe Met Ile Glu
   1010                1015                1020

Pro Leu Asn
    1025

<210> SEQ ID NO 24
<211> LENGTH: 1026
<212> TYPE: PRT
<213> ORGANISM: Streptococcus thermophilus

<400> SEQUENCE: 24

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Thr Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300
```

```
Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Ile Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
```

```
            725                 730                 735
Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
            755                 760                 765

Leu Val Ser Ala Lys Tyr Asn Gly Val Glu Phe Ile Glu Lys Gly Pro
    770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
    915                 920                 925

Gly Asn His Tyr Gly Thr Arg Glu Phe Thr Val Ser Asp Asp Asn His
930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
            965                 970                 975

Leu Gln Glu Ser Asp Ala Thr Trp Ile Lys Val Leu Ala Ala Gln Met
    980                 985                 990

Gly Val Gly Gly Asp Asp Thr Trp Gly Ala Pro Val His Asp Glu Phe
    995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 25
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 25

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45
```

-continued

```
Asn Gly Lys Trp Lys Ile His Tyr Ala Gln Asn Thr Asn Gln Val Leu
 50                  55                  60

Lys Asp Phe Tyr Lys Thr Glu Phe Asp Glu Thr Asp Leu Asn Phe Ile
 65                  70                  75                  80

Asn Val Pro Gly His Leu Glu Leu Gln Gly Phe Gly Ser Pro Gln Tyr
                 85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Thr Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
290                 295                 300

Val Leu Asp Asp Asp Gln Val Val Glu Val Val Pro Lys Val Gly
305                 310                 315                 320

Phe Arg Arg Phe Glu Ile Lys Asp Lys Leu Met Leu Asn Gly Lys
                325                 330                 335

Arg Ile Ile Phe Lys Gly Val Asn Arg His Glu Phe Asn Ala Arg Thr
            340                 345                 350

Gly Xaa Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
450                 455                 460
```

```
Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Leu Gln Leu
545                 550                 555                 560

Tyr Thr Asp Leu Glu Lys Tyr Pro Glu Tyr Gln Gly Gly Phe Ile Trp
            565                 570                 575

Asp Phe Ile Asp Gln Ala Ile Tyr Lys Thr Leu Pro Asn Gly Ser Glu
        580                 585                 590

Phe Leu Ser Tyr Gly Gly Asp Trp His Asp Arg Pro Ser Asp Tyr Glu
    595                 600                 605

Phe Cys Gly Asn Gly Ile Val Phe Ala Asp Arg Thr Leu Thr Pro Lys
610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
    770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
```

885                 890                 895
Glu Ser Tyr Arg Asp Lys Leu Pro Gly Ala Tyr Leu Gly Arg Tyr Glu
                900                 905                 910
Thr Ser Val Glu Lys Thr Phe Ala Pro Tyr Leu Met Pro Gln Glu Ser
                915                 920                 925
Gly Asn His Tyr Gly Thr Arg Glu Phe Thr Val Ser Asp Asp Asn His
            930                 935                 940
Asn Gly Leu Lys Phe Thr Ala Leu Asn Lys Ala Phe Glu Phe Ser Ala
945                 950                 955                 960
Leu Arg Asn Ser Thr Glu Gln Ile Glu Asn Ala Arg His Gln Tyr Glu
                965                 970                 975
Leu Gln Glu Ser Asp Ala Thr Trp Ile Lys Val Leu Ala Ala Gln Met
            980                 985                 990
Gly Val Gly Gly Asp Asp Thr Trp Gly Ala Pro Val His Asp Glu Phe
            995                 1000                1005
Leu Leu Ser Ser Ala Asp Ser Tyr Gln Leu Ser Phe Met Ile Glu
        1010                1015                1020
Pro Leu Asn
    1025

<210> SEQ ID NO 26
<211> LENGTH: 1026
<212> TYPE: PRT
<213> ORGANISM: Streptococcus thermophilus

<400> SEQUENCE: 26

Met Asn Met Thr Glu Lys Ile Gln Thr Tyr Leu Asn Asp Pro Lys Ile
1               5                   10                  15
Val Ser Val Asn Thr Val Asp Ala His Ser Asp His Lys Tyr Phe Glu
                20                  25                  30
Ser Leu Glu Glu Phe Ser Glu Gly Glu Met Lys Leu Arg Gln Ser Leu
            35                  40                  45
Asn Gly Lys Trp Lys Ile His Tyr Ala Gln Asn Thr Asn Gln Val Leu
    50                  55                  60
Lys Asp Phe Tyr Lys Thr Glu Phe Asp Glu Thr Asp Leu Asn Phe Ile
65                  70                  75                  80
Asn Val Pro Gly His Leu Glu Leu Gln Gly Phe Gly Ser Pro Gln Tyr
                85                  90                  95
Val Asn Thr Gln Tyr Pro Trp Asp Gly Lys Glu Phe Leu Arg Pro Pro
                100                 105                 110
Gln Val Pro Gln Glu Ser Asn Ala Val Ala Ser Tyr Val Lys His Phe
            115                 120                 125
Thr Leu Asn Asp Ala Leu Lys Asp Lys Lys Val Phe Ile Ser Phe Gln
    130                 135                 140
Gly Val Ala Thr Ser Ile Phe Val Trp Val Asn Gly Asn Phe Val Gly
145                 150                 155                 160
Tyr Ser Glu Asp Ser Phe Thr Pro Ser Glu Phe Glu Ile Ser Asp Tyr
                165                 170                 175
Leu Val Glu Gly Asp Asn Lys Leu Ala Val Ala Val Tyr Arg Tyr Ser
                180                 185                 190
Thr Ala Ser Trp Leu Glu Asp Gln Asp Phe Trp Arg Leu Tyr Gly Ile
            195                 200                 205
Phe Arg Asp Val Tyr Leu Tyr Ala Ile Pro Lys Val His Val Gln Asp
    210                 215                 220

```
Leu Phe Val Lys Gly Asp Tyr Asp Tyr Gln Thr Lys Thr Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
                260                 265                 270

Val Asn Gly Asp Gly Glu Leu Ser Val Ser Leu Glu Asn Leu Lys Ile
            275                 280                 285

Lys Pro Trp Ser Ala Glu Ser Pro Lys Leu Tyr Asp Leu Ile Leu His
        290                 295                 300

Val Leu Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Ile Phe Lys Gly Val Asn Arg His Glu Phe Asn Ala Arg Thr
                340                 345                 350

Gly Cys Cys Ile Thr Glu Glu Asp Met Leu Trp Asp Ile Lys Val Met
            355                 360                 365

Lys Gln His Asn Ile Asn Ala Val Arg Thr Ser His Tyr Pro Asn Gln
370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
            515                 520                 525

Phe Ala Ser Gly Asn Leu Thr Asn Lys Pro Gln Lys Pro Tyr Ile Ser
530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
```

```
                   645                 650                 655
Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Ala Thr Phe
            675                 680                 685

Pro Val Asn Phe Val Val Glu Ala Ser Asn Ser Glu Gln Ile Tyr Glu
        690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
        835                 840                 845

Tyr Gln Val Asp Tyr Lys Gly Arg Ile Phe Val Thr Ala Asn Tyr Asp
850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
        915                 920                 925

Gly Asn His Tyr Gly Thr Arg Glu Phe Thr Val Ser Asp Asp Asn His
930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
        995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 27
<211> LENGTH: 1026
<212> TYPE: PRT
<213> ORGANISM: Streptococcus thermophilus
```

<400> SEQUENCE: 27

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
    130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys

-continued

```
                405                 410                 415
Glu Pro Ser Trp Asn Ile Pro Ala Ser Glu Pro Glu Trp Leu Pro Ala
            420                 425                 430
Cys Leu Asp Arg Ala Asn Asn Met Phe Gln Arg Asp Lys Asn His Ala
            435                 440                 445
Ser Val Ile Ile Trp Ser Cys Gly Asn Glu Ser Tyr Ala Gly Lys Asp
            450                 455                 460
Ile Ala Asp Met Ala Asp Tyr Phe Arg Ser Val Asp Asn Thr Arg Pro
465                 470                 475                 480
Val His Tyr Glu Gly Val Ala Trp Cys Arg Glu Phe Asp Tyr Ile Thr
                485                 490                 495
Asp Ile Glu Ser Arg Met Tyr Ala Lys Pro Ala Asp Ile Glu Glu Tyr
                500                 505                 510
Leu Thr Thr Gly Lys Leu Val Asp Leu Ser Ser Val Ser Asp Lys His
                515                 520                 525
Phe Ala Ser Gly Asn Leu Thr Asn Lys Pro Gln Lys Pro Tyr Ile Ser
            530                 535                 540
Cys Glu Tyr Met His Thr Met Gly Asn Ser Gly Gly Leu Gln Leu
545                 550                 555                 560
Tyr Thr Asp Leu Glu Lys Tyr Pro Glu Tyr Gln Gly Phe Ile Trp
                565                 570                 575
Asp Phe Ile Asp Gln Ala Ile Tyr Lys Thr Leu Pro Asn Gly Ser Glu
                580                 585                 590
Phe Leu Ser Tyr Gly Gly Asp Trp His Asp Arg Pro Ser Asp Tyr Glu
            595                 600                 605
Phe Cys Gly Asn Gly Ile Val Phe Ala Asp Arg Thr Leu Thr Pro Lys
            610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
                645                 650                 655
Ala Tyr Thr Phe Leu Ala Arg Val Tyr Glu Asp Gly Arg Lys Val Ser
                660                 665                 670
Glu Ser Glu Tyr His Phe Asp Val Lys Pro Gly Glu Ala Thr Phe
            675                 680                 685
Pro Val Asn Phe Val Val Glu Ala Ser Asn Ser Glu Gln Ile Tyr Glu
            690                 695                 700
Val Ala Cys Val Leu Arg Glu Ala Thr Glu Trp Ala Pro Lys Gly His
705                 710                 715                 720
Glu Ile Val Arg Gly Gln Tyr Val Val Glu Lys Ile Ser Thr Glu Thr
                725                 730                 735
Pro Val Lys Ala Pro Leu Asn Val Val Glu Gly Asp Phe Asn Ile Gly
                740                 745                 750
Ile Gln Gly Gln Asn Phe Ser Ile Leu Leu Ser Arg Ala Gln Asn Thr
            755                 760                 765
Leu Val Ser Ala Lys Tyr Asn Gly Val Glu Phe Ile Glu Lys Gly Pro
            770                 775                 780
Lys Leu Ser Phe Thr Arg Ala Tyr Thr Asp Asn Asp Arg Gly Ala Gly
785                 790                 795                 800
Tyr Pro Phe Glu Met Ala Gly Trp Lys Val Ala Gly Asn Tyr Ser Lys
                805                 810                 815
Val Thr Asp Thr Gln Ile Gln Ile Glu Asp Asp Ser Val Lys Val Thr
                820                 825                 830
```

```
Tyr Val His Glu Leu Pro Gly Leu Ser Asp Val Glu Val Lys Val Thr
        835                 840                 845
Tyr Gln Val Asp Tyr Lys Gly Arg Ile Phe Val Thr Ala Asn Tyr Asp
    850                 855                 860
Gly Lys Ala Gly Leu Pro Asn Phe Pro Glu Phe Gly Leu Glu Phe Ala
865                 870                 875                 880
Ile Gly Ser Gln Phe Thr Asn Leu Ser Tyr Tyr Gly Tyr Gly Ala Glu
            885                 890                 895
Glu Ser Tyr Arg Asp Lys Leu Pro Gly Ala Tyr Leu Gly Arg Tyr Glu
        900                 905                 910
Thr Ser Val Glu Lys Thr Phe Ala Pro Tyr Leu Met Pro Gln Glu Ser
        915                 920                 925
Gly Asn His Tyr Gly Thr Arg Glu Phe Thr Val Ser Asp Asp Asn His
        930                 935                 940
Asn Gly Leu Lys Phe Thr Ala Leu Asn Lys Val Phe Glu Phe Ser Ala
945                 950                 955                 960
Leu Arg Asn Ser Thr Glu Gln Ile Glu Asn Ala Arg His Gln Tyr Glu
                965                 970                 975
Leu Gln Glu Ser Asp Ala Thr Trp Ile Lys Val Leu Ala Ala Gln Met
            980                 985                 990
Gly Val Gly Gly Asp Asp Thr Trp  Gly Ala Pro Val His  Asp Glu Phe
        995                 1000                1005
Leu Leu  Ser Ser Ala Asp Ser  Tyr Gln Leu Ser Phe  Met Ile Glu
    1010                 1015                 1020
Pro Leu  Asn
    1025

<210> SEQ ID NO 28
<211> LENGTH: 1026
<212> TYPE: PRT
<213> ORGANISM: Streptococcus thermophilus
<220> FEATURE:
<221> NAME/KEY: VARIANT
<222> LOCATION: (354)..(354)
<223> OTHER INFORMATION: "Xaa" is any amino acid except Arg

<400> SEQUENCE: 28

Met Asn Met Thr Glu Lys Ile Gln Thr Tyr Leu Asn Asp Pro Lys Ile
1               5                   10                  15
Val Ser Val Asn Thr Val Asp Ala His Ser Asp His Lys Tyr Phe Glu
            20                  25                  30
Ser Leu Glu Glu Phe Ser Glu Gly Glu Met Lys Leu Arg Gln Ser Leu
        35                  40                  45
Asn Gly Lys Trp Lys Ile His Tyr Ala Gln Asn Thr Asn Gln Val Leu
    50                  55                  60
Lys Asp Phe Tyr Lys Thr Glu Phe Asp Glu Thr Asp Leu Asn Phe Ile
65                  70                  75                  80
Asn Val Pro Gly His Leu Glu Leu Gln Gly Phe Gly Ser Pro Gln Tyr
                85                  90                  95
Val Asn Thr Gln Tyr Pro Trp Asp Gly Lys Glu Phe Leu Arg Pro Pro
            100                 105                 110
Gln Val Pro Gln Glu Ser Asn Ala Val Ala Ser Tyr Val Lys His Phe
        115                 120                 125
Thr Leu Asn Asp Ala Leu Lys Asp Lys Lys Val Phe Ile Ser Phe Gln
    130                 135                 140
```

```
Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
            165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
            195                 200                 205

Phe Arg Asp Val Tyr Leu Tyr Ala Ile Pro Lys Val His Val Gln Asp
            210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
                260                 265                 270

Val Asn Gly Asp Gly Glu Leu Ser Val Ser Leu Glu Asn Leu Lys Ile
            275                 280                 285

Lys Pro Trp Ser Ala Glu Ser Pro Lys Leu Tyr Asp Leu Ile Leu His
            290                 295                 300

Val Leu Asp Asp Asp Gln Val Glu Val Val Pro Val Lys Val Gly
305                 310                 315                 320

Phe Arg Arg Phe Glu Ile Lys Asp Lys Leu Met Leu Asn Gly Lys
                325                 330                 335

Arg Ile Val Phe Lys Gly Val Asn Arg His Glu Phe Asn Ala Arg Thr
            340                 345                 350

Gly Xaa Cys Ile Thr Glu Glu Asp Met Leu Trp Asp Ile Lys Val Met
            355                 360                 365

Lys Gln His Asn Ile Asn Ala Val Arg Thr Ser His Tyr Pro Asn Gln
            370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
            435                 440                 445

Ser Val Ile Ile Trp Ser Cys Gly Asn Glu Ser Tyr Ala Gly Lys Asp
            450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
            515                 520                 525

Phe Ala Ser Gly Asn Leu Thr Asn Lys Pro Gln Lys Pro Tyr Ile Ser
            530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
```

-continued

```
                565                 570                 575
Asp Phe Ile Asp Gln Ala Ile Tyr Lys Thr Leu Pro Asn Gly Ser Glu
            580                 585                 590
Phe Leu Ser Tyr Gly Gly Asp Trp His Asp Arg Pro Ser Asp Tyr Glu
            595                 600                 605
Phe Cys Gly Asn Gly Ile Val Phe Ala Asp Arg Thr Leu Thr Pro Lys
            610                 615                 620
Leu Gln Thr Val Lys His Leu Tyr Ser Asn Lys Ile Ala Val Asp
625                 630                 635                 640
Glu Lys Ser Val Thr Ile Lys Asn Asp Asn Leu Phe Glu Asp Leu Ser
                645                 650                 655
Ala Tyr Thr Phe Leu Ala Arg Val Tyr Glu Asp Gly Arg Lys Val Ser
            660                 665                 670
Glu Ser Glu Tyr His Phe Asp Val Lys Pro Gly Glu Ala Thr Phe
            675                 680                 685
Pro Val Asn Phe Val Val Glu Ala Ser Asn Ser Glu Gln Ile Tyr Glu
            690                 695                 700
Val Ala Cys Val Leu Arg Glu Ala Thr Glu Trp Ala Pro Lys Gly His
705                 710                 715                 720
Glu Ile Val Arg Gly Gln Tyr Val Val Glu Lys Ile Ser Thr Glu Thr
                725                 730                 735
Pro Val Lys Ala Pro Leu Asn Val Val Glu Gly Asp Phe Asn Ile Gly
            740                 745                 750
Ile Gln Gly Gln Asn Phe Ser Ile Leu Leu Ser Arg Ala Gln Asn Thr
            755                 760                 765
Leu Val Ser Ala Lys Tyr Asn Gly Val Glu Phe Ile Glu Lys Gly Pro
770                 775                 780
Lys Leu Ser Phe Thr Arg Ala Tyr Thr Asp Asn Asp Arg Gly Ala Gly
785                 790                 795                 800
Tyr Pro Phe Glu Met Ala Gly Trp Lys Val Ala Gly Asn Tyr Ser Lys
                805                 810                 815
Val Thr Asp Thr Gln Ile Gln Ile Glu Asp Asp Ser Val Lys Val Thr
            820                 825                 830
Tyr Val His Glu Leu Pro Gly Leu Ser Asp Val Glu Val Lys Val Thr
            835                 840                 845
Tyr Gln Val Asp Tyr Lys Gly Arg Ile Phe Val Thr Ala Asn Tyr Asp
            850                 855                 860
Gly Lys Ala Gly Leu Pro Asn Phe Pro Glu Phe Gly Leu Glu Phe Ala
865                 870                 875                 880
Ile Gly Ser Gln Phe Thr Asn Leu Ser Tyr Tyr Gly Tyr Gly Ala Glu
                885                 890                 895
Glu Ser Tyr Arg Asp Lys Leu Pro Gly Ala Tyr Leu Gly Arg Tyr Glu
            900                 905                 910
Thr Ser Val Glu Lys Thr Phe Ala Pro Tyr Leu Met Pro Gln Glu Ser
            915                 920                 925
Gly Asn His Tyr Gly Thr Arg Glu Phe Thr Val Ser Asp Asp Asn His
            930                 935                 940
Asn Gly Leu Lys Phe Thr Ala Leu Asn Lys Val Phe Glu Phe Ser Ala
945                 950                 955                 960
Leu Arg Asn Ser Thr Glu Gln Ile Glu Asn Ala Arg His Gln Tyr Glu
                965                 970                 975
Leu Gln Glu Ser Asp Ala Thr Trp Ile Lys Val Leu Ala Ala Gln Met
            980                 985                 990
```

-continued

```
Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu
    1010                1015                1020

Pro Leu Asn
    1025

<210> SEQ ID NO 29
<211> LENGTH: 1026
<212> TYPE: PRT
<213> ORGANISM: Streptococcus thermophilus

<400> SEQUENCE: 29

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
                20                  25                  30

Ser Leu Glu Glu Phe Ser Glu Gly Glu Met Lys Leu Arg Gln Ser Leu
            35                  40                  45

Asn Gly Lys Trp Lys Ile His Tyr Ala Gln Asn Thr Asn Gln Val Leu
50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Lys Val Phe Ile Ser Phe Gln
130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
```

-continued

```
                325                 330                 335
Arg Ile Val Phe Lys Gly Val Asn Arg His Glu Phe Asn Ala Arg Thr
                340                 345                 350

Gly Cys Cys Ile Thr Glu Glu Asp Met Leu Trp Asp Ile Lys Val Met
                355                 360                 365

Lys Gln His Asn Ile Asn Ala Val Arg Thr Ser His Tyr Pro Asn Gln
        370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
                420                 425                 430

Cys Leu Asp Arg Ala Asn Asn Met Phe Gln Arg Asp Lys Asn His Ala
                435                 440                 445

Ser Val Ile Ile Trp Ser Cys Gly Asn Glu Ser Tyr Ala Gly Lys Asp
        450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
                500                 505                 510

Leu Thr Thr Gly Lys Leu Val Asp Leu Ser Ser Val Ser Asp Lys His
                515                 520                 525

Phe Ala Ser Gly Asn Leu Thr Asn Lys Pro Gln Lys Pro Tyr Ile Ser
        530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
                580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
        610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
                660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
        690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
                740                 745                 750
```

Ile Gln Gly Gln Asn Phe Ser Ile Leu Leu Ser Arg Ala Gln Asn Thr
                755                 760                 765

Leu Val Ser Ala Lys Tyr Asn Gly Val Glu Phe Ile Glu Lys Gly Pro
        770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
                805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
                835                 840                 845

Tyr Gln Val Asp Tyr Lys Gly Arg Ile Phe Val Thr Ala Asn Tyr Asp
        850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
                885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
                915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Val Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
        995                 1000                 1005

Leu Leu Ser Ser Ala Asp Ser Tyr Gln Leu Ser Phe Met Ile Glu
    1010                1015                 1020

Pro Leu Asn
    1025

<210> SEQ ID NO 30
<211> LENGTH: 1905
<212> TYPE: DNA
<213> ORGANISM: Streptococcus thermophilus

<400> SEQUENCE: 30
atggaaaaat ctaaaggtca gatgaagtct cgtttatcct acgcagctgg tgcttttggt      60
aacgacgtct ctatgcaac cttgtcaaca tactttatca tgtttgtgac aactcacttg     120
tttaacacag gtgatccaaa gcaaaatagt cactacgtac tattaatcac taacattatc     180
tctattttgc gtatcttgga agtatttatc gatccattga tcggtaatat gattgataac     240
actaatacta gtatggtaa attcaaacca tgggtagttg gtggtggtat catcagttct     300
atcaccttgt tgcttctctt caccgattta ggtggtttga ataaaacaaa tccttttcttg    360 taccttgtac ttttttggaat tatctacctt ataatggatg tcttctactc gattaaagat    420
atcggtttct ggtcaatgct tcctgccttg tctcttgaca gtcacgaacg tgaaaaaatg    480

-continued

| | |
|---|---|
| gcaactttg cccgtattgg ttctacgatt ggtgccaata ttgtaggtgt tgccatcatg | 540 |
| ccaatcgttt tgttcttctc tatgacgaac agtagtggct ctggagataa atctggatgg | 600 |
| ttctggtttg catttatcgt tgcactcatt ggtgtgatta catcaattgc tgttggtatt | 660 |
| ggtacacgtg aagttgagtc aaaacttcgt gataacaatg aaaaaactag ccttaaacaa | 720 |
| gtctttaaag ttcttggtaa aaacgaccaa ttgatgtggc tgtctctcgg atattggttc | 780 |
| tatggtcttg gtattaatac acttaatgct cttcaacttt attacttcac atttatcctt | 840 |
| ggtgattcag ggaaatactc aatcctttac ggattgaata cagttgttgg tttggtttca | 900 |
| gtttcactgt tccctagtct tgctggtaaa ttcaaccgta aacgtttgtt ctatggatgt | 960 |
| attgcagtaa tgctcggtgg tatcggaatc tttagtattg caggtacttc acttccaatg | 1020 |
| atcttgactg cagctgaact cttcttcatt ccacaacctc ttgtgttcct tgttatcctt | 1080 |
| atgattatct ctgactcagt agaatatggt caatggaaat gggacaccg tgatgaatca | 1140 |
| cttactttgt cagttcgtcc acttgttgat aaacttggtg gtgcgatgtc aaactggctt | 1200 |
| gtttctacaa ttgccgtagc tgccggtatg acaacaggtg cctcagcatc aacaattaca | 1260 |
| acacatcaac agtctatttt taagcttagc atgtttggtt cccagcagc agcaatgctt | 1320 |
| atcggtgcct tcattattgc tcgtaaaatc actttgactg aagcacgtca cgctaaaatt | 1380 |
| gttgaagaat tggaacatcg ctttagcgta gcaacttctg aaaatgaagt taaagctaac | 1440 |
| gtcgtatctc ttgtaacccc tacaactggt tatttggttg atctctcaag tgttaatgat | 1500 |
| gaacactttg cttcaggtag catgggtaaa ggtttcgcca ttaaacctac tgatggagct | 1560 |
| gtctttgcac caattagtgg taccattcgt caaattcttc ctactcgcca tgcagttggt | 1620 |
| attgaaagtg aagatggtgt cattgttctt atccacgttg gcatcggaac agttaaactt | 1680 |
| aatggtgaag gattcattag ttacgtagaa caaggtgatc gtgttgaagt tggacaaaaa | 1740 |
| cttcttgagt tctggtcacc aattattgag aaaaatggtc ttgatgacac agtacttgtc | 1800 |
| actgtaacta attcagaaaa attcagtgct ttccatcttg aacaaaaagt tggagaaaag | 1860 |
| gtagaagctt tgtctgaagt tattaccttc aaaaaaggag aataa | 1905 |

<210> SEQ ID NO 31
<211> LENGTH: 634
<212> TYPE: PRT
<213> ORGANISM: Streptococcus thermophilus

<400> SEQUENCE: 31

```
Met Glu Lys Ser Lys Gly Gln Met Lys Ser Arg Leu Ser Tyr Ala Ala
1               5                   10                  15

Gly Ala Phe Gly Asn Asp Val Phe Tyr Ala Thr Leu Ser Thr Tyr Phe
            20                  25                  30

Ile Met Phe Val Thr Thr His Leu Phe Asn Thr Gly Asp Pro Lys Gln
        35                  40                  45

Asn Ser His Tyr Val Leu Leu Ile Thr Asn Ile Ser Ile Leu Arg
    50                  55                  60

Ile Leu Glu Val Phe Ile Asp Pro Leu Ile Gly Asn Met Ile Asp Asn
65                  70                  75                  80

Thr Asn Thr Lys Tyr Gly Lys Pro Trp Val Val Gly Gly
                85                  90                  95

Ile Ile Ser Ser Ile Thr Leu Leu Leu Phe Thr Asp Leu Gly Gly
            100                 105                 110

Leu Asn Lys Thr Asn Pro Phe Leu Tyr Leu Val Leu Phe Gly Ile Ile
        115                 120                 125
```

```
Tyr Leu Ile Met Asp Val Phe Tyr Ser Ile Lys Asp Ile Gly Phe Trp
    130                 135                 140

Ser Met Leu Pro Ala Leu Ser Leu Asp Ser His Glu Arg Glu Lys Met
145                 150                 155                 160

Ala Thr Phe Ala Arg Ile Gly Ser Thr Ile Gly Ala Asn Ile Val Gly
                165                 170                 175

Val Ala Ile Met Pro Ile Val Leu Phe Phe Ser Met Thr Asn Ser Ser
            180                 185                 190

Gly Ser Gly Asp Lys Ser Gly Trp Phe Trp Phe Ala Phe Ile Val Ala
        195                 200                 205

Leu Ile Gly Val Ile Thr Ser Ile Ala Val Gly Ile Gly Thr Arg Glu
    210                 215                 220

Val Glu Ser Lys Leu Arg Asp Asn Asn Glu Lys Thr Ser Leu Lys Gln
225                 230                 235                 240

Val Phe Lys Val Leu Gly Lys Asn Asp Gln Leu Met Trp Leu Ser Leu
                245                 250                 255

Gly Tyr Trp Phe Tyr Gly Leu Gly Ile Asn Thr Leu Asn Ala Leu Gln
            260                 265                 270

Leu Tyr Tyr Phe Thr Phe Ile Leu Gly Asp Ser Gly Lys Tyr Ser Ile
        275                 280                 285

Leu Tyr Gly Leu Asn Thr Val Val Gly Leu Val Ser Val Ser Leu Phe
    290                 295                 300

Pro Ser Leu Ala Gly Lys Phe Asn Arg Lys Arg Leu Phe Tyr Gly Cys
305                 310                 315                 320

Ile Ala Val Met Leu Gly Gly Ile Gly Ile Phe Ser Ile Ala Gly Thr
                325                 330                 335

Ser Leu Pro Met Ile Leu Thr Ala Ala Glu Leu Phe Phe Ile Pro Gln
            340                 345                 350

Pro Leu Val Phe Leu Val Ile Leu Met Ile Ile Ser Asp Ser Val Glu
        355                 360                 365

Tyr Gly Gln Trp Lys Leu Gly His Arg Asp Glu Ser Leu Thr Leu Ser
    370                 375                 380

Val Arg Pro Leu Val Asp Lys Leu Gly Gly Ala Met Ser Asn Trp Leu
385                 390                 395                 400

Val Ser Thr Ile Ala Val Ala Ala Gly Met Thr Thr Gly Ala Ser Ala
                405                 410                 415

Ser Thr Ile Thr Thr His Gln Gln Ser Ile Phe Lys Leu Ser Met Phe
            420                 425                 430

Gly Phe Pro Ala Ala Met Leu Ile Gly Ala Phe Ile Ile Ala Arg
        435                 440                 445

Lys Ile Thr Leu Thr Glu Ala Arg His Ala Lys Ile Val Glu Glu Leu
    450                 455                 460

Glu His Arg Phe Ser Val Ala Thr Ser Glu Asn Glu Val Lys Ala Asn
465                 470                 475                 480

Val Val Ser Leu Val Thr Pro Thr Thr Gly Tyr Leu Val Asp Leu Ser
                485                 490                 495

Ser Val Asn Asp Glu His Phe Ala Ser Gly Ser Met Gly Lys Gly Phe
            500                 505                 510

Ala Ile Lys Pro Thr Asp Gly Ala Val Phe Ala Pro Ile Ser Gly Thr
        515                 520                 525

Ile Arg Gln Ile Leu Pro Thr Arg His Ala Val Gly Ile Glu Ser Glu
    530                 535                 540
```

```
Asp Gly Val Ile Val Leu Ile His Val Gly Ile Gly Thr Val Lys Leu
545                 550                 555                 560

Asn Gly Glu Gly Phe Ile Ser Tyr Val Glu Gln Gly Asp Arg Val Glu
            565                 570                 575

Val Gly Gln Lys Leu Leu Glu Phe Trp Ser Pro Ile Ile Glu Lys Asn
        580                 585                 590

Gly Leu Asp Asp Thr Val Leu Val Thr Val Thr Asn Ser Glu Lys Phe
        595                 600                 605

Ser Ala Phe His Leu Glu Gln Lys Val Gly Glu Lys Val Glu Ala Leu
    610                 615                 620

Ser Glu Val Ile Thr Phe Lys Lys Gly Glu
625                 630

<210> SEQ ID NO 32
<211> LENGTH: 19
<212> TYPE: DNA
<213> ORGANISM: Artificial Sequence
<220> FEATURE:
<223> OTHER INFORMATION: Oligonucleotide primer

<400> SEQUENCE: 32
cttgactgca gctgaactc                                              19

<210> SEQ ID NO 33
<211> LENGTH: 21
<212> TYPE: DNA
<213> ORGANISM: Artificial Sequence
<220> FEATURE:
<223> OTHER INFORMATION: Oligonucleotide primer

<400> SEQUENCE: 33
ctcgactaca aagttaactg g                                           21

<210> SEQ ID NO 34
<211> LENGTH: 20
<212> TYPE: DNA
<213> ORGANISM: Artificial Sequence
<220> FEATURE:
<223> OTHER INFORMATION: Oligonucleotide primer

<400> SEQUENCE: 34
cagagttacc cattgtgtgc                                             20

<210> SEQ ID NO 35
<211> LENGTH: 20
<212> TYPE: DNA
<213> ORGANISM: Artificial Sequence
<220> FEATURE:
<223> OTHER INFORMATION: Oligonucleotide primer

<400> SEQUENCE: 35
aggttggctt catcgataac                                             20

<210> SEQ ID NO 36
<211> LENGTH: 21
<212> TYPE: DNA
<213> ORGANISM: Artificial Sequence
<220> FEATURE:
<223> OTHER INFORMATION: Oligonucleotide primer

<400> SEQUENCE: 36
catcaccttc tgtaacgatg c                                           21
```

```
<210> SEQ ID NO 37
<211> LENGTH: 21
<212> TYPE: DNA
<213> ORGANISM: Artificial Sequence
<220> FEATURE:
<223> OTHER INFORMATION: Oligonucleotide primer

<400> SEQUENCE: 37
gtaacttcgt aggatacagt g                                              21

<210> SEQ ID NO 38
<211> LENGTH: 20
<212> TYPE: DNA
<213> ORGANISM: Artificial Sequence
<220> FEATURE:
<223> OTHER INFORMATION: Oligonucleotide primer

<400> SEQUENCE: 38
aggacgttgt atcactgaag                                                20
```